(12) United States Patent
Karube

(10) Patent No.: US 9,690,089 B2
(45) Date of Patent: Jun. 27, 2017

(54) MAGNIFYING OBSERVATION APPARATUS, MAGNIFIED IMAGE OBSERVING METHOD AND COMPUTER-READABLE RECORDING MEDIUM

(71) Applicant: Keyence Corporation, Osaka (JP)

(72) Inventor: Takuya Karube, Osaka (JP)

(73) Assignee: Keyence Corporation, Osaka (JP)

( * ) Notice: Subject to any disclaimer, the term of this patent is extended or adjusted under 35 U.S.C. 154(b) by 296 days.

(21) Appl. No.: 14/551,106

(22) Filed: Nov. 24, 2014

(65) Prior Publication Data

US 2015/0185465 A1 Jul. 2, 2015

(30) Foreign Application Priority Data

Dec. 27, 2013 (JP) ................. 2013-273615

(51) Int. Cl.
*G02B 21/36* (2006.01)
*G02B 21/00* (2006.01)
(Continued)

(52) U.S. Cl.
CPC ....... *G02B 21/367* (2013.01); *G02B 21/0016* (2013.01); *G02B 21/025* (2013.01); *G02B 21/06* (2013.01); *G02B 21/082* (2013.01); *G02B 21/084* (2013.01); *G02B 21/361* (2013.01); *G02B 21/368* (2013.01)

(58) Field of Classification Search
CPC G02B 21/367; G02B 21/0016; G02B 21/025; G02B 21/06; G02B 21/082; G02B 21/084; G02B 21/361; G02B 21/368
See application file for complete search history.

(56) References Cited

U.S. PATENT DOCUMENTS 6,259,473 B1 * 7/2001 Iko .................. G01N 23/04
348/80
2005/0237604 A1 * 10/2005 Kawano ............ G02B 21/0012
359/368
(Continued)

FOREIGN PATENT DOCUMENTS

JP 2001-059599 3/2001
JP 2004-151303 5/2004
(Continued)

*Primary Examiner* — Thai Tran
*Assistant Examiner* — Christopher T Braniff
(74) *Attorney, Agent, or Firm* — Kilyk & Bowersox, P.L.L.C.

(57) ABSTRACT

A synthetic image can be generated by a simple operation in a short time. A magnifying observation apparatus includes: a z-axis movement unit capable of automatically adjusting a working distance to an observation surface of an observation target placed on a placement section; an xy-axis movement mechanism capable of changing relative positions of the placement section and a microscope lens section; and an image synthesizing unit for generating a synthetic image obtained by synthesizing a plurality of images each captured at a relative distance made different by the z-axis movement unit, wherein image synthesis processing by the image synthesizing unit and processing of moving the microscope lens section by the z-axis movement unit and capturing an image by the camera section are asynchronously executed.

16 Claims, 37 Drawing Sheets

(51) Int. Cl.
*G02B 21/06* (2006.01)
*G02B 21/02* (2006.01)
*G02B 21/08* (2006.01)

(56) References Cited

U.S. PATENT DOCUMENTS

| | | |
|---|---|---|
| 2008/0297596 A1 | 12/2008 | Inomata et al. |
| 2008/0297597 A1 | 12/2008 | Inomata et al. |
| 2010/0149362 A1 | 6/2010 | Kang |
| 2010/0149363 A1 | 6/2010 | Inomata et al. |
| 2010/0149364 A1 | 6/2010 | Kang |
| 2012/0236120 A1* | 9/2012 | Kramer .............. G02B 21/0004 348/46 |
| 2013/0050464 A1 | 2/2013 | Kang |
| 2013/0088586 A1 | 4/2013 | Sekiya et al. |
| 2013/0093872 A1 | 4/2013 | Kang |
| 2013/0100170 A1 | 4/2013 | Matsumura et al. |

FOREIGN PATENT DOCUMENTS

| | | |
|---|---|---|
| JP | 2004-153462 | 5/2004 |
| JP | 2004-170574 | 6/2004 |
| JP | 2006-030969 | 2/2006 |
| JP | 2006-308808 | 11/2006 |
| JP | 2006-337470 | 12/2006 |
| JP | 2006-337471 | 12/2006 |
| JP | 2008-299711 | 12/2008 |
| JP | 2008-301331 | 12/2008 |
| JP | 2008-301332 | 12/2008 |
| JP | 2009-128726 | 6/2009 |
| JP | 2009-128881 | 6/2009 |
| JP | 2010-130408 | 6/2010 |
| JP | 2010-139890 | 6/2010 |
| JP | 2010-141697 | 6/2010 |
| JP | 2010-141698 | 6/2010 |
| JP | 2010-141699 | 6/2010 |
| JP | 2010-141700 | 6/2010 |
| JP | 2011-259502 | 12/2011 |
| JP | 2011-259503 | 12/2011 |
| JP | 2011-259504 | 12/2011 |
| JP | 2012-145722 | 8/2012 |
| JP | 2013-050594 | 3/2013 |
| JP | 2013-083743 | 5/2013 |
| JP | 2013-088530 | 5/2013 |
| JP | 2013-088676 | 5/2013 |

* cited by examiner

FIG. 12

| R |  | G |  | R |  | G |
|---|---|---|---|---|---|---|
|   |   |   |   |   |   |   |
| G |  | B |  | G |  | B |
|   |   |   |   |   |   |   |
| R |  | G |  | R |  | G |
|   |   |   |   |   |   |   |
| G |  | B |  | G |  | R |

FIG. 13

| RGBG |  | GRGB |  | RGBG |  | GRGB |
|------|---|------|---|------|---|------|
|      |   |      |   |      |   |      |
| GBGR |  | BGRG |  | GBGR |  | BGRG |
|      |   |      |   |      |   |      |
| RGBG |  | GRGB |  | RGBG |  | GRGB |
|      |   |      |   |      |   |      |
| GBGR |  | BGRG |  | GBGR |  | BGRG |

FIG. 14

| RGBG | RGBG | GRGB | GRGB | RGBG | RGBG | GRGB |
|------|------|------|------|------|------|------|
| RGBG | RGBG | GRGB | GRGB | RGBG | RGBG | GRGB |
| GBGR | GBGR | BGRG | BGRG | GBGR | GBGR | BGRG |
| GBGR | GBGR | BGRG | BGRG | GBGR | GBGR | BGRG |
| RGBG | RGBG | GRGB | GRGB | RGBG | RGBG | GRGB |
| RGBG | RGBG | GRGB | GRGB | RGBG | RGBG | GRGB |
| GBGR | GBGR | BGRG | BGRG | GBGR | GBGR | BGRG |

FIG. 19A
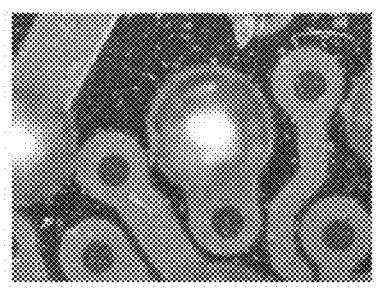
FIG. 19B
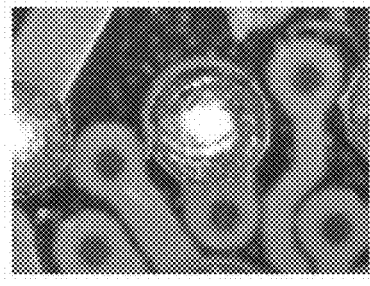
FIG. 19C
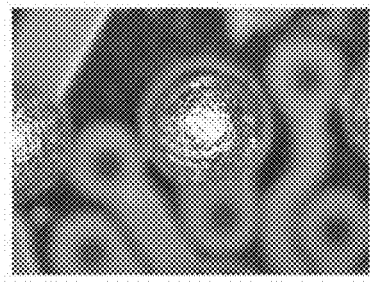
FIG. 19D
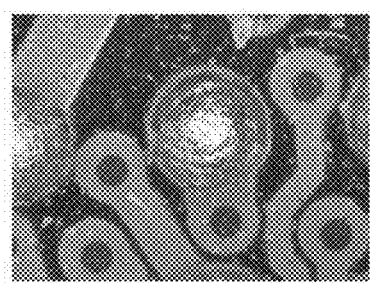

FIG. 24A
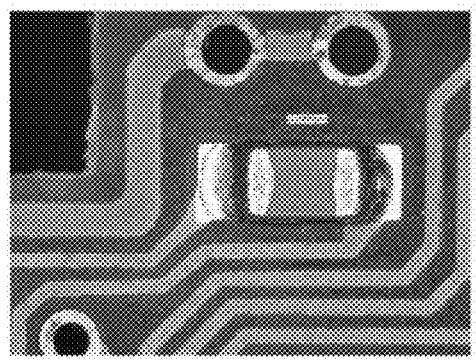
FIG. 24B
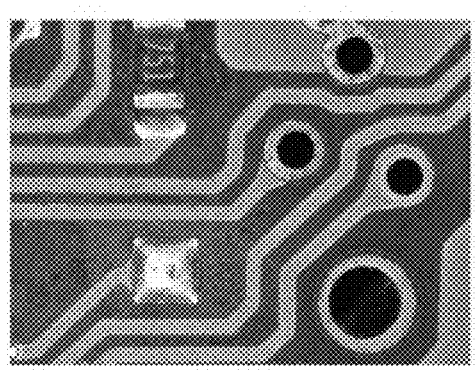
FIG. 24C
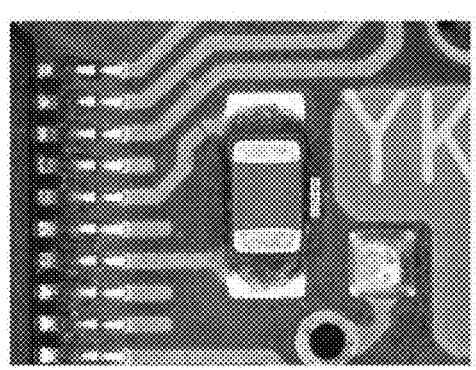

MAGNIFYING OBSERVATION APPARATUS, MAGNIFIED IMAGE OBSERVING METHOD AND COMPUTER-READABLE RECORDING MEDIUM

CROSS-REFERENCE TO RELATED APPLICATIONS

The present application claims foreign priority based on Japanese Patent Application No. 2013-273615, filed Dec. 27, 2013, the contents of which is incorporated herein by reference.

BACKGROUND OF THE INVENTION

1. Field of the Invention

The present invention relates to a magnifying observation apparatus such as a digital microscope or a microscope which captures and displays a magnified image, a magnified image observing method, a magnified image observing program, and a computer-readable recording medium.

2. Description of Related Art

As a magnifying observation apparatus that magnifies and displays an image of a subject being a specimen such as a micro-object, a workpiece or the like, there has been used an optical microscope, a digital microscope or the like which uses an optical lens. In the digital microscope, a specimen as an observation target placed on a stage is irradiated with illumination light via an optical system, reflected light or transmitted light from the specimen is received in an imaging element such as a CCD or a CMOS where the light is electrically read at each of two-dimensionally arranged pixels, and the electrically read image is displayed on a display section such as a display (e.g., JP 2012-145722 A). In such a magnifying observation apparatus, an optical lens, made opposed to the stage, is moved in a z-axis (height) direction to adjust a focus. Generally, the movement in the z-axis direction is performed by a head section integrally formed by the lens and a camera.

In such a magnifying observation apparatus, there is known depth synthetic processing (also called "focus synthesis", "multi-focus", etc.) where a plurality of images are photographed as positions of the lens and the specimen are changed in the z-axis direction with respect to an image with a small depth of focus, and pixels in focus are extracted from the obtained images, to synthesize one image (depth synthetic image). However, for performing the depth synthetic processing on images with more than 1 million pixels in order to obtain such a depth synthetic image (also called "focused image", "multi-focus image", etc.), a processing load becomes large and required storage regions also increase, to make specifications for hardware strict. Accordingly, as shown in a flowchart of FIG. 36, the processing has hitherto been subdivided to serially repeat operations of movement of a z-position of the lens, photographing and synthesis, thereby controlling the z-position movement, the photographing and the synthesis such that they are synchronously performed.

According to this method, the z-position of the lens does not move until completion of the synthesis processing. Further, with this method, as shown on a user interface screen of FIG. 37, a user needs to previously specify an upper limit position and a lower limit position of a range where the lens is moved in the z-direction, which has caused a problem of taking time.

Alternatively, there is also a method where depth synthesis is started after movement of the z-position of the lens to a depth synthesis start position (initial position), the z-position is moved by a predetermined distance in one direction, the user checks a synthesis progress image, and at the point of completion of desired synthesis, the processing is specified to be completed. With this method, however, when a setting of a synthesis range is failed, for example when the upper limit of the synthesis range is erroneously set lower than a correct position, it is of necessity to re-set the upper limit position and the lower limit position and repeat the synthetic photographing processing from the start, which is inefficient.

Further, in these methods, for example when a synthetic image is to be captured at each position, as shown in FIG. 38, the camera at a certain position is first moved in the height direction, namely the z-direction, to capture images with different heights, these images are then synthesized to extract pixels at focused positions, the stage is moved to a next position, and the camera is similarly moved in the z-axis direction to synthesize images. By repeating these operations, synthetic images which are in focus even at portions with different heights have been generated. With this method, however, the stage is moved after a focused image is obtained at each position, which has caused a problem of taking extremely a long time. Since the image synthesis processing especially takes a long time, even when the photographing operation itself is completed in a short time, the waiting time during the imaging and movement for the synthesis processing occurs, which has caused a problem of taking still a longer time.

SUMMARY OF THE INVENTION

The present invention has been made for solving the conventional problems as described above. A principal object of the present invention is to provide a magnifying observation apparatus, a magnified image observing method, a magnified image observing program, and a computer-readable recording medium, each of which is capable of generating a synthetic image even in a short time.

In order to achieve the above object, according to one embodiment of the present invention, there is provided a magnifying observation apparatus including: a placement section for placing an observation target; a camera section for capturing an image of the observation target placed on the placement section; a microscope lens section which is optically bonded with the camera section by matching an optical axis thereof with an optical axis of the camera section; an imaging condition setting section for setting an imaging condition at the time of capturing an image by the camera section; a display section for displaying an image obtained by capturing an image of the observation target on an imaging condition set by the imaging condition setting section; a z-axis movement unit capable of automatically adjusting a working distance to an observation surface of the observation target placed on the placement section; an xy-axis movement mechanism capable of changing relative positions of the placement section and the microscope lens section; and an image synthesizing unit for generating a synthetic image obtained by synthesizing a plurality of images each captured at a relative distance made different by the z-axis movement unit. Image synthesis processing by the image synthesizing unit and processing of moving the microscope lens section by the z-axis movement unit and capturing an image by the camera section may be asynchronously executed. With the above configuration, it is possible to perform image synthesis processing not by a successive operation of changing only the height of the microscope lens section at a position of certain xy-coordinates to capture an image and thereafter moving it to a next height to similarly generate an image, as has hitherto been done, but by synthesizing captured images in parallel and simultaneously with movement of the microscope lens section in the z-axis direction. It is thus possible to generate a synthetic image without receiving restrictions due to the waiting time during processing required for the image synthesis and a processing speed thereof, so as to obtain an advantage of being able to significantly reduce the time required to obtain the synthetic image.

Moreover, the magnifying observation apparatus according to another embodiment of the present invention may further include a height range setting unit for setting a height range where the relative height of the microscope lens section with respect to the observation target placed on the placement section is changed by the z-axis movement unit. The z-axis movement unit may move the microscope lens section in a range beyond a height range specified in the height range setting unit, and an image may be captured by the camera section while the microscope lens section is moved by the z-axis movement unit. With the above configuration, at the time of capturing an image, imaging is not performed by moving the microscope lens section to a height position for imaging and capturing an image in the state of making the microscope lens section once stand still, as has hitherto been performed, but imaging is performed while the microscope lens is moved. It is thus possible to complete imaging in a shorter time than by the operation of repeating movement and suspension in the height direction.

Moreover, in the magnifying observation apparatus according to still another embodiment of the present invention, the z-axis movement unit may move the microscope lens section beyond a height range specified in the height range setting unit, to allow imaging of an additional image in a range beyond the height range, and the image synthesizing unit may perform image synthesis by use of the additional image. With the above configuration, the z-axis movement unit does not stop the placement section or the microscope lens section at the limit position of the height range, but moves the microscope lens section beyond this, and hence it is possible to accurately perform photographing at the limit position while moving the microscope lens section. It is further possible to acquire an additional image even at a position beyond the height range, so as to perform finer image synthesis by use of this additional image.

Moreover, in the magnifying observation apparatus according to still another embodiment of the present invention, the image synthesizing unit may perform image synthesis by use of the additional image in a case where the additional image achieves quality beyond a predetermined reference value. With the above configuration, only when an additional image significant for image synthesis has been obtained, high-resolution image synthesis may be performed by use of this additional image, and when an additional image does not have significant data, this is not used for image synthesis. It is thus possible to prevent the quality of the synthetic image from being adversely affected, so as to contribute to improvement in quality.

Moreover, in the magnifying observation apparatus according to still another embodiment of the present invention, the image synthesizing unit may perform image synthesis by use of the additional image in a case where the number of pixels in focus out of pixels included in the additional image goes beyond a predetermined threshold.

Moreover, in the magnifying observation apparatus according to still another embodiment of the present invention, the z-axis movement unit may move a height range from a side where the relative distance between the placement section and the microscope lens section is shorter to a side where the relative distance is longer. With the above configuration, it is possible to reduce a risk of the tip of the microscope lens section coming into contact with the observation target.

Moreover, in the magnifying observation apparatus according to still another embodiment of the present invention, the z-axis movement unit may adjust the relative distance between the placement section and the microscope lens section by moving the microscope lens section side.

Moreover, in the magnifying observation apparatus according to still another embodiment of the present invention, the microscope lens section and the camera section may integrally constitute a head section, and the z-axis movement unit may adjust the relative distance between the placement section and the microscope lens section by moving the head section. With the above configuration, it is possible to adjust the relative height by vertically moving the head section by the z-axis movement unit.

Moreover, in the magnifying observation apparatus according to still another embodiment of the present invention, based on information of an optical lens system included in the microscope lens section, the height range setting unit may automatically set a height range as a predetermined range previously set based on a depth of focus of the optical lens system. With the above configuration, the range where the microscope lens section is vertically moved is not previously specified by the user, but the range is specified by a predetermined value set by the optical lens system to be used, and hence it is possible to save the time of the user specifying the range, so as to obtain an advantage of being able to execute image synthesis in a short time.

Moreover, in the magnifying observation apparatus according to still another embodiment of the present invention, the height range setting unit may arbitrarily adjust a height range. With the above configuration, in a case where the obtained synthetic image is not a desired image, or some other case, it is possible for the user to manually adjust the height range to an appropriate range with reference to the synthetic image and perform image synthesis again, so as to efficiently set the height range to an optimal range as compared to the method where the user specifies the height range from the start.

Moreover, in the magnifying observation apparatus according to still another embodiment of the present invention, the z-axis movement unit may start moving the camera section from a position beyond a height range, specified in the height range setting unit, into the height range. With the above configuration, in regard to a problem where, when movement of the camera section starts from a start position within the height range, the timing for imaging cannot become uniform in an acceleration period until a speed of the camera section reaches a fixed speed, imaging at a fixed speed is possible by once moving the camera section out of the height range to provide an approach segment, starting movement of the camera, increasing its speed to a fixed speed, moving the camera section into the height range, and starting imaging.

Moreover, the magnifying observation apparatus according to still another embodiment of the present invention may further include an illumination unit for irradiating the observation target with illumination light.

Moreover, according to still another embodiment of the present invention, there is provided a magnified image observing method for displaying an image obtained by capturing an image of an observation target. The method may include the steps of: setting a height range where a microscope lens section, whose optical axis is matched with an optical axis of a camera section for capturing an image of the observation target placed on a placement section, is moved in a height direction by adjusting a distance to an observation surface of the observation target; capturing a plurality of images with different heights by the camera section while moving the microscope lens section within the height range from one limit position toward another limit position; continuing the movement even when the microscope lens section reaches the other limit position of the height range, to further capture an additional image at a position out of the height range; determining whether or not quality of the additional image captured out of the height range goes beyond a predetermined reference value, and performing image synthesis by use of the additional image and an image captured within the height range when the quality goes beyond the predetermined reference value; and displaying a synthetic image obtained by the image synthesis on a display unit. Herewith, it is possible to perform image synthesis processing not by a successive operation of changing only the height of the microscope lens section at a position of certain xy-coordinates to capture an image and thereafter moving it to a next height position to similarly generate an image, as has hitherto been done, but by synthesizing captured images in parallel and simultaneously with movement of the microscope lens section in the z-axis direction. It is thus possible to generate a synthetic image without receiving restrictions due to the waiting time during processing required for the image synthesis and a processing speed thereof, so as to obtain an advantage of being able to significantly reduce the time required to obtain the synthetic image.

Moreover, in the magnified image observing method according to still another embodiment of the present invention, the step of setting a height range may set a height range as a predetermined range previously set based on a depth of focus of an optical lens system included in the microscope lens section. Herewith, the range where the microscope lens section is vertically moved is not previously specified by the user, but the range is specified by a predetermined value set by the optical lens system to be used, and hence it is possible to save the time of the user specifying the range, so as to obtain an advantage of being able to execute image synthesis in a short time.

Moreover, the magnified image observing method according to still another embodiment of the present invention may further include a step of urging re-setting of a height range with reference to a synthetic image displayed on the display unit. Herewith, in a case where the obtained synthetic image is not a desired image, or some other case, it is possible for the user to manually adjust the height range to an appropriate range with reference to the synthetic image and perform image synthesis again, so as to efficiently set the height range to an optimal range as compared to the method where the user specifies the height range from the start.

Moreover, according to still another embodiment of the present invention, there is provided a magnified image observing program for displaying an image obtained by capturing an image of an observation target. The program may cause a computer to realize functions of: setting a height range where a microscope lens section, whose optical axis is matched with an optical axis of an imaging unit for capturing an image of the observation target placed on a placement section, is moved in a height direction by adjusting a distance to an observation surface of the observation target; capturing images with different heights by the imaging unit while moving the microscope lens section within the height range from one limit position toward another limit position; continuing the movement even when the microscope lens section reaches the other limit position of the height range, to further capture additional images at a position out of the height range; determining whether or not quality of the additional image captured out of the height range goes beyond a predetermined reference value, and performing image synthesis by use of the additional image and an image captured within the height range when the quality goes beyond the predetermined reference value; and displaying a synthetic image obtained by the image synthesis on a display unit. With the above configuration, it is possible to perform image synthesis processing not by a successive operation of changing only the height of the microscope lens section at a position of certain xy-coordinates to capture an image and thereafter moving it to a next height position to similarly generate an image, as has hitherto been done, but by synthesizing captured images in parallel and simultaneously with movement of the microscope lens section in the z-axis direction. It is thus possible to generate a synthetic image without receiving restrictions due to the waiting time during processing required for the image synthesis and a processing speed thereof, so as to obtain an advantage of being able to significantly reduce the time required to obtain the synthetic image.

Moreover, according to still another embodiment of the present invention, there is provided a computer-readable recording medium or a recording device in which the above program is stored. The recording medium includes a magnetic disk, an optical disk, a magneto-optical disk, a semiconductor memory, and other program-storable medium, such as a CD-ROM, a CD-R, a CD-RW, a flexible disk, a magnetic tape, an MO, a DVD-ROM, a DVD-RAM, a DVD-R, a DVD+R, a DVD-RW, a DVD+RW, a Blu-ray (registered trademark), and an HD-DVD (AOD). Further, the program includes a program in the form of being distributed by downloading through a network such as the Internet, in addition to a program stored into the above recording medium and distributed. Moreover, the recording medium includes a device capable of recording a program, such as a general-purpose or special-purpose device placed with the program in the form of software, firmware or the like, in an executable state. Furthermore, each processing and each function included in the program may be executed by program software that is executable by the computer, and processing of each section may be realized by predetermined hardware such as a gate array (FPGA, ASIC) or in the form of program software being mixed with a partial hardware module that realizes some element of hardware.

BRIEF DESCRIPTION OF THE DRAWINGS

FIG. 12 is a plan view showing a Bayer array of imaging elements;

FIG. 13 is a plan view showing the situation of performing shifting by 1 pixel and acquiring RGB data at each pixel;

FIG. 14 is a plan view showing the situation of performing shifting by one-half of the pixel further from FIG. 13 and acquiring RGB data by a subpixel unit;

FIGS. 19A to 19D are schematic views showing the situation of synthesizing a depth synthetic image;

FIGS. 24A to 24C are image views showing the situation of performing automatic measurement processing;

DETAILED DESCRIPTION OF PREFERRED EMBODIMENTS

Figure 1:
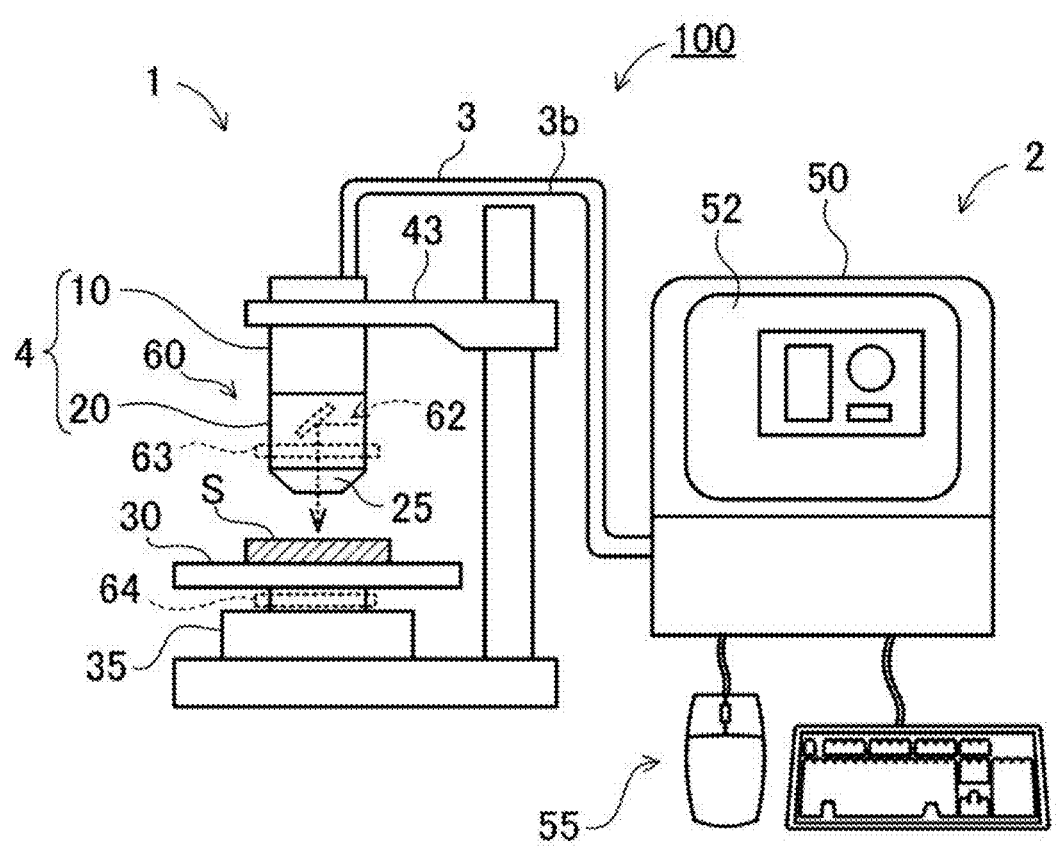
FIG. 1 is an external view of a magnifying observation apparatus according to one embodiment of the present invention.

Hereinafter, an embodiment of the present invention will be described based on the drawings. However, the embodiment shown hereinafter merely illustrates a magnifying observation apparatus, a magnified image observing method, a magnified image observing program, and a computer-readable recording medium for the purpose of embodying technical ideas of the present invention, and the present invention does not specify the magnifying observation apparatus, the magnified image observing method, the magnified image observing program, and the computer-readable recording medium to those described below. Further, the present specification does not specify members shown in the claims to members of the embodiment. Especially, sizes, materials, shapes, relative disposition and the like of constituent components described in the embodiment are not intended to restrict the scope of the present invention thereto, but are mere explanatory examples unless otherwise specified. It is to be noted that sizes, positional relations and the like of members shown in each of the drawings may be exaggerated for clarifying a description. Further, in the following description, the same name and symbol denote the same member or members of the same quality, and a detailed description thereof will be appropriately omitted. Moreover, each element constituting the present invention may have a mode where a plurality of elements are configured of the same member and the one member may serve as the plurality of elements, or conversely, a function of one member can be shared and realized by a plurality of members.

A magnifying observation apparatus used in the embodiment of the present invention and a computer, a printer, an external storage apparatus and other peripheral devices, which are connected to the magnifying observation apparatus and serve for an operation, control, display and other processing and the like, are communicated as electrically, magnetically or optically connected by serial connection or parallel connection such as IEEE 1394, RS-232x, RS-422, or USB or via a network such as 10BASE-T, 100BASE-TX or 1000BASE-T. The connection is not restricted to physical connection using a wire, but it may be wireless connection by use of a wireless LAN such as IEEE802.x, a radio wave such as Bluetooth (registered trademark), infrared rays, optical communication, or the like. Further, a memory card, a magnetic disk, an optical disk, a magneto-optic disk, a semiconductor memory or the like can be used as a recording medium for exchanging data, storing a setting, and the like. It is to be noted that in the present specification, the magnifying observation apparatus and the magnified image observing method are used in the meaning of including not only a body of the magnifying observation apparatus but also a magnifying observation system formed by combining the body with a computer and a peripheral device such an external storage apparatus.

Moreover, in the present specification, the magnifying observation apparatus is not restricted to the system itself for performing magnifying observation, and to an apparatus and a method for performing, in hardware, input/output, display, computing, communication and other processing which are related to imaging. An apparatus and a method for realizing processing in software are also included in the scope of the present invention. For example, an apparatus and a system, where software, a program, plug-in, an object, a library, an applet, a compiler, a module, a macro operated in a specific program, or the like is incorporated into a general-purpose circuit or a computer to allow imaging itself or processing related thereto, also correspond to the magnifying observation apparatus of the present invention. Further, in the present specification, the computer includes a work station, a terminal or other electronic devices in addition to a general-purpose or dedicated electronic calculator. Moreover, in the present specification, the program is not restricted to a program that is singly used, but can be used in the mode of functioning as part of a specific computer program, software, service or the like, in the mode of being called in time of need and functioning, in the mode of being provided as a service in an environment such as an operating system, in the mode of operating by being resident in an environment, in the mode of operating on a background, or in a position of another support program.

Figure 2:
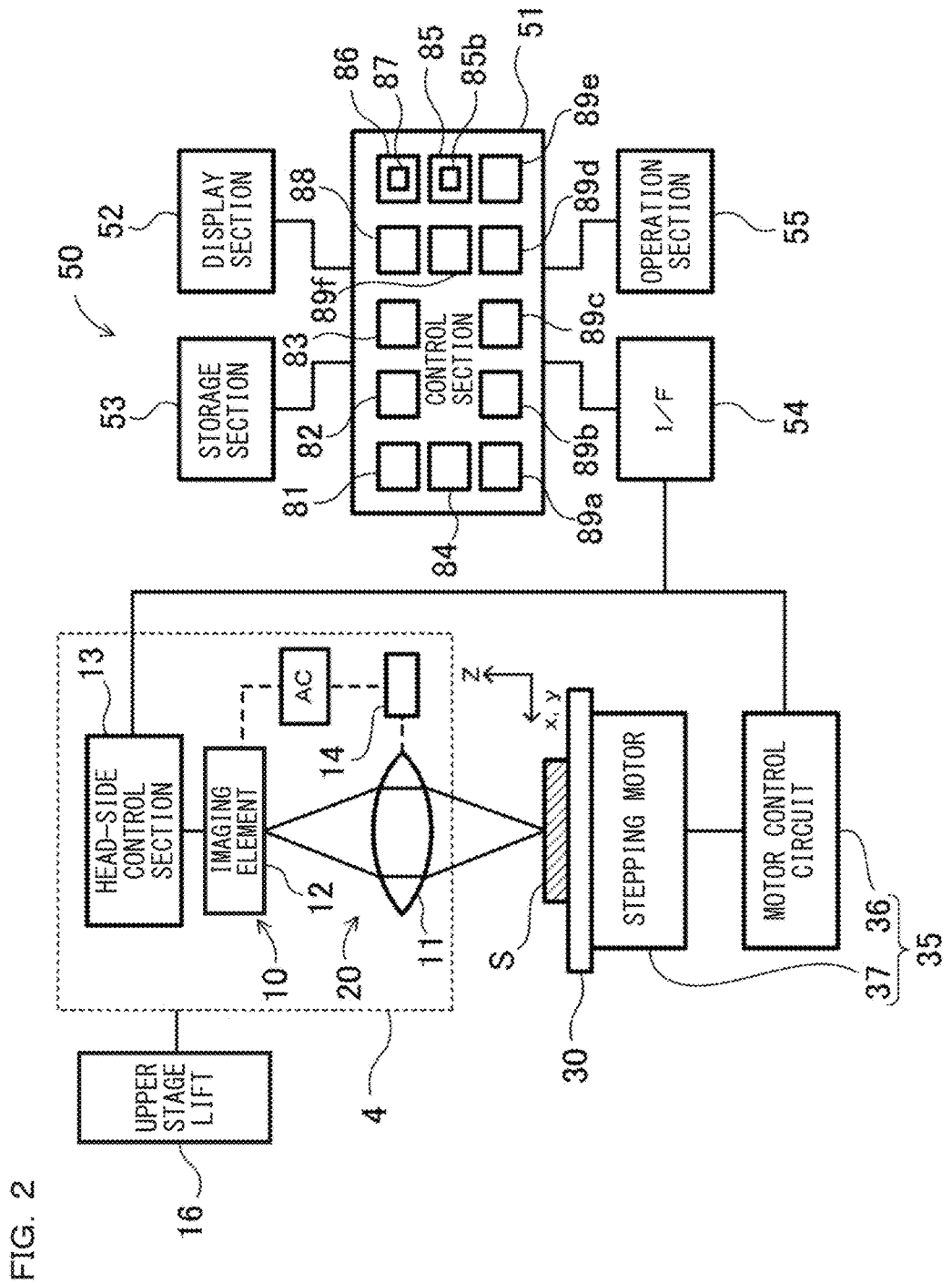
FIG. 2 is a block diagram of the magnifying observation apparatus according to one embodiment of the present invention.

Hereinafter, using FIGS. 1 and 2, a magnifying observation apparatus 100 according to one embodiment of the present invention will be described. In these figures, FIG. 1 is a schematic view showing a whole configuration of the magnifying observation apparatus 100, and FIG. 2 is a block diagram mainly of control of a body section 50 and each section. As shown in FIG. 1, the magnifying observation apparatus 100 is broadly divided into an imaging system 1 and a control system 2. The imaging system 1 is provided with an illumination section 60 for illuminating a specimen, a workpiece or another subject as an observation target S, and a head section 4 for capturing an image of the observation target S illuminated by the illumination section 60. The head section 4 is provided with a camera section 10 including an imaging element 12, and a microscope lens section 20 detachably mounted at the tip of the camera section 10. The microscope lens section 20 constitutes an imaging optical system (lens optical system) configured by a plurality of optical lenses. Here, the microscope lens section 20 includes an objective lens section 25. Further, the head section 4 functions as an imaging unit for receiving reflected light or transmitted light of illumination light.

Moreover, the imaging system 1 is provided with: a placement section 30 for placing the observation target S; a z-upper stage as a first focus adjusting section for changing a relative distance between this placement section 30 and the head section 4 in an optical axis direction and adjusting a focus; and an upper stage lift 16 for driving this z-upper stage. Meanwhile, the head section 4 is also provided with a z-lower stage as a second focus adjusting section for changing the relative distance with the placement section in the optical axis direction and adjusting a focus. Reflected light, which is incident on the observation target S placed on the placement section 30 via an imaging optical system 11 and reflected on the observation target S, or transmitted light applied from the bottom surface side of the observation target S, is electrically read by an imaging element 12 of the camera section 10.

Further, the control system 2 is provided with the body section 50 having a display section 52 for displaying a magnified image captured by the camera section 10. The camera section 10 is connected to the body section 50 via a cable section 3. It is to be noted that in the example of FIG. 1, the display section 52 is provided integrally with the body section 50, but the display section may be a separate member from the body section. Further, the cable section 3 is provided with an optical cable 3b for transmitting illumination light from the body section 50 to the head section 4 side in addition to an electrical cable for transmitting image information obtained by the imaging element of the camera section 10 to the body section 50 side. In the cable section 3, the electrical cable and the optical cable 3b can be integrated with each other, or these can be separately provided.

Moreover, the placement section 30 is movable in a plane in addition to being movable in a height direction, namely the z-direction, by a lower stage lift 35. Specifically, an x-y stage movable in an x-axis direction and a y-axis direction is provided. Further, a rotatable stage (θ stage) which is rotatable and rotates the placement section 30 can also be provided.

As shown in the block diagram of FIG. 2, the body section 50 is provided with: a storage section 53 as a focus distance information storing section for storing focus distance information related to a relative distance between the placement section 30 and the imaging optical system 11 in the optical axis direction at the time of adjusting a focus by the lower stage lift 35 along with two-dimensional position information of the observation target S in a plane almost vertical to the optical axis direction; the display section 52 for displaying an image read by the imaging element 12; and an interface 54 for performing data communication with the head section 4 and the lower stage lift 35. This magnifying observation apparatus 100 captures an observation image by use of the imaging element 12 for electrically reading reflected light or transmitted light which is incident via the imaging optical system 11 and comes from the observation target S fixed to the placement section 30, and displays the image on the display section 52.

Further, the storage section 53 also functions as a lens identification information storing section for storing lens identification information and lens aberration information, or as a wavelength component storing unit for storing a wavelength component with a small aberration of each lens section in association with the aberration information of the lens section. It is to be noted that the storage section 53 is configured of a hard disk, semiconductor memory or the like. Further, an individual storage section may be provided with respect to each data base.

(Lens Identification Information)

The lens identification information includes a lens type, the position of a focus distance, the length of a lens barrel, and the like. As described above, since the imaging system 1 and the control system 2 are connected via the cable section 3, it is possible to perform appropriate control by discriminating the type of a lens currently mounted in the control system 2. For example, by grasping a physical length of the microscope lens section 20, at the time of lowering the microscope lens section 20 by means of the z-upper stage, it is possible to grasp a lower limit movement distance at which the microscope lens section 20 can be lowered without coming into contact with the observation target S and the placement section 30, and control the lowering so as not to exceed that distance.

Further, in addition to directly recording information of the microscope lens section as lens type information, it is possible to record only identification information of the microscope lens section, such as its type, while previously storing detailed information of the microscope lens section which corresponds to the type into the storage section 53 of the body section 50, or the like, as a look-up table associated with the type. Herewith, when acquiring the type as the lens identification information through the camera section 10, the body section 50 can acquire detailed information corresponding to this type by referencing the storage section 53, and perform control suitable for the microscope lens section based on the acquired information. With this method, it is possible to grasp necessary information on the body section 50 side while reducing the amount of information to be held on the microscope lens section side.

Further, the magnifying observation apparatus 100 is provided with: an operation section 55 for setting an imaging condition for setting a condition at the time of capturing an image by the camera section 10 and performing other necessary variety of settings and operations; and a control section 51 for computing the height of the observation target S in the optical axis direction which corresponds to a set region based on focus distance information stored in the storage section 53 and related to part or the whole of the observation target S corresponding to the set region. This magnifying observation apparatus 100 can compute an average height (depth) of the observation target S in the optical axis direction which corresponds to a specified region by use of the imaging element 12.

This control section 51 realizes functions such as: an optical path shifting control unit 81 for activating an optical path shifting unit 14; an image selecting unit 82 capable of selecting one observation image in a state where a plurality of observation images captured with respect to the same visual field of the observation target S by use of a plurality of illumination filters are simultaneously displayed on the display section 52; an imaging condition setting section 83 for setting as an imaging condition an image observation condition including the type of an illumination filter used for capturing an observation image selected in the image selecting unit 82; an image processing section 85 for performing predetermined image processing; an automatic synthesis unit 84 for automatically performing an operation of synthesizing observation images in the image processing section 85, to acquire a color high-resolution observation image; a waveform selecting unit 86 capable of selecting a waveform component relatively less influenced by an aberration of a currently mounted microscope lens section out of a plurality of wavelength components based on aberration information of the microscope lens section currently mounted in the camera section 10 out of replaceable microscope lens sections with different specifications; an illumination light selecting unit 87 capable of selectively switching to any wavelength region among a plurality of different wavelength regions included in a wavelength band of light emitted by an illumination light source 65; a magnification adjusting unit 89a for increasing or decreasing a display magnification of an image displayed on the display section 52; a displayed position changing unit 89b for moving a displayed position of the image displayed on the display section 52; a simple imaging condition generating section 89c for generating a plurality of different provisional imaging conditions; an interlocking adjustment unit 89d for adjusting a display magnification and a displayed position of each simple image such that, when a magnification of one simple image is adjusted in the magnification adjusting unit 89a in the state of a plurality of simple images being list-displayed in a list display region, a magnification of another simple image is also adjusted as interlocked with this adjustment, and when a displayed position of one simple image is changed in the displayed position changing unit 89b, a displayed position of another simple image is also changed as interlocked with this change; a display mode switching unit 89e for automatically switching display on the display section 52 from a second display mode to a first display mode; and a height range setting unit 89f for setting a height range where a relative distance between the observation target placed on the placement section and the microscope lens section is changed. Further, the image processing section 85 functions as an image synthesizing unit 85b for synthesizing at least 2 observation images of the same observation target S captured by use of different illumination filters. This control section 51 can be configured of a gate array such as an ASIC or an FPGA.

The operation section 55 is connected with the body section 50 or the computer in a wired or wireless manner, or fixed to the computer. Examples of the general operation section 55 include a variety of pointing devices such as a mouse, a keyboard, a slide pad, TrackPoint, a tablet, a joystick, a console, a jog dial, a digitizer, a light pen, a numeric keypad, a touch pad, and ACCUPOINT. Further, each of these operation sections 55 can be used for operations of the magnifying observation apparatus 100 itself and its peripheral devices, in addition to an operation of a magnifying observation operating program. Moreover, input and an operation can be performed by the user directly touching the screen by use of a touch screen or a touch panel for a display itself for displaying an interface screen, video input or other existing input units can be used, or both of them can be used at the same time. In the example of FIG. 1, the operation section 55 is configured of a pointing device such as a mouse.

(Illumination Section 60)

The illumination section 60 generates illumination light for illuminating the observation target S whose image is formed by the imaging element 12. The illumination light source of the illumination section 60 is installed in the body section 50, and illumination light is transmitted to the illumination section 60 of the head section 4 via the optical cable 3b. The illumination section 60 can adopt either a configuration of a system incorporated into the head section 4 or a configuration of a detachable section separated from the head section 4. Further, as an illumination system for illumination light, epi-illumination, transmission illumination and the like can be appropriately used. The epi-illumination is an illumination method of applying illumination light from a position above the observation target, and includes ring illumination, coaxial epi-illumination, and the like. The illumination section 60 shown in FIG. 1 is provided with a coaxial epi-illumination section 62 (cf. FIG. 3) for irradiating the observation target S with coaxial epi-illumination light; a ring illumination section 63 for performing irradiation with ring-like illumination light from a ring-like light source; and a transmission illumination section 64 for performing irradiation with transmitted light. Each illumination section is connected with the body section 50 via the optical cable 3b. The body section 50 is provided with a connector for connecting the optical cable 3b, and also installed with the illumination light source 65 for transmitting light to the optical cable 3b via the connecter (cf. FIG. 3). Further, the ring illumination section 63 can switch between all-around illumination and side illumination. In order to realize this, there can be used a configuration where a plurality of LEDs are arranged in a ring form as the ring illumination section 63 and part of the LEDs are turned on/off, a configuration where a turret type mask for cutting off part of illumination light is arranged, or some other configuration. Such lighting control and switching of the illumination light are performed in an illumination light control section 66. The illumination light control section 66 is provided with an illumination light switching section 61 for switching illumination light.

Figure 3:
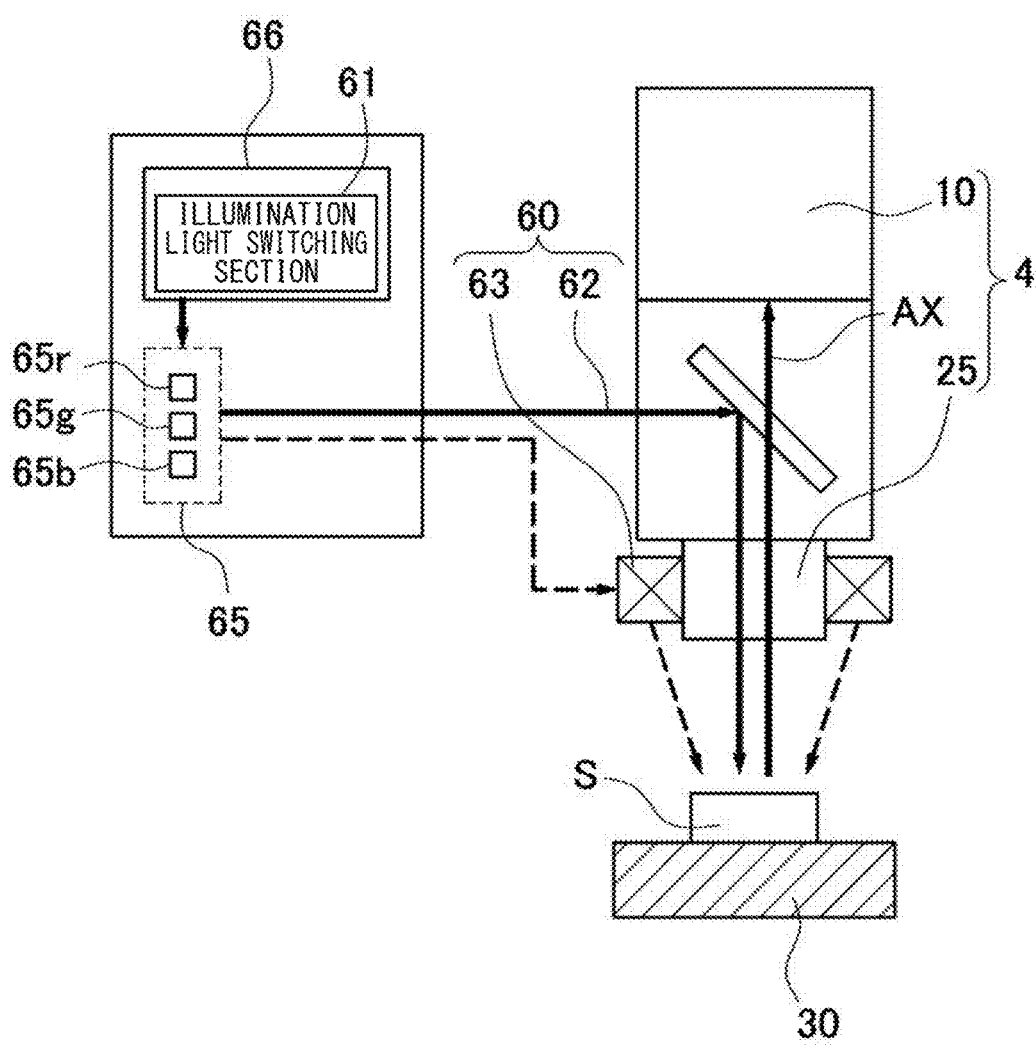
FIG. 3 is a schematic diagram showing an illumination section.

A schematic sectional view of FIG. 3 shows a detail of the illumination section 60. The illumination section 60 is provided with the coaxial epi-illumination section 62 and the ring illumination section 63. The coaxial epi-illumination is a method of performing irradiation from the same direction as an imaging surface of the camera, and is also called bright field illumination. The coaxial epi-illumination is effective especially in the case of, for example, viewing unevenness of a mirror surface workpiece such as a silicon wafer or an LCD panel. Lighting control for the illumination section 60 is performed in the illumination light control section 66. Further, the illumination light control section 66 is provided with the illumination light switching section 61, and the illumination light switching section 61 can switch between the coaxial epi-illumination section 62 and the ring illumination section 63. Further, the illumination light switching section 61 can also be configured so as to mix the coaxial epi-illumination section 62 and the ring illumination section 63 by changing a ratio therebetween.

(Magnified Image Observing Program)

Figure 4:
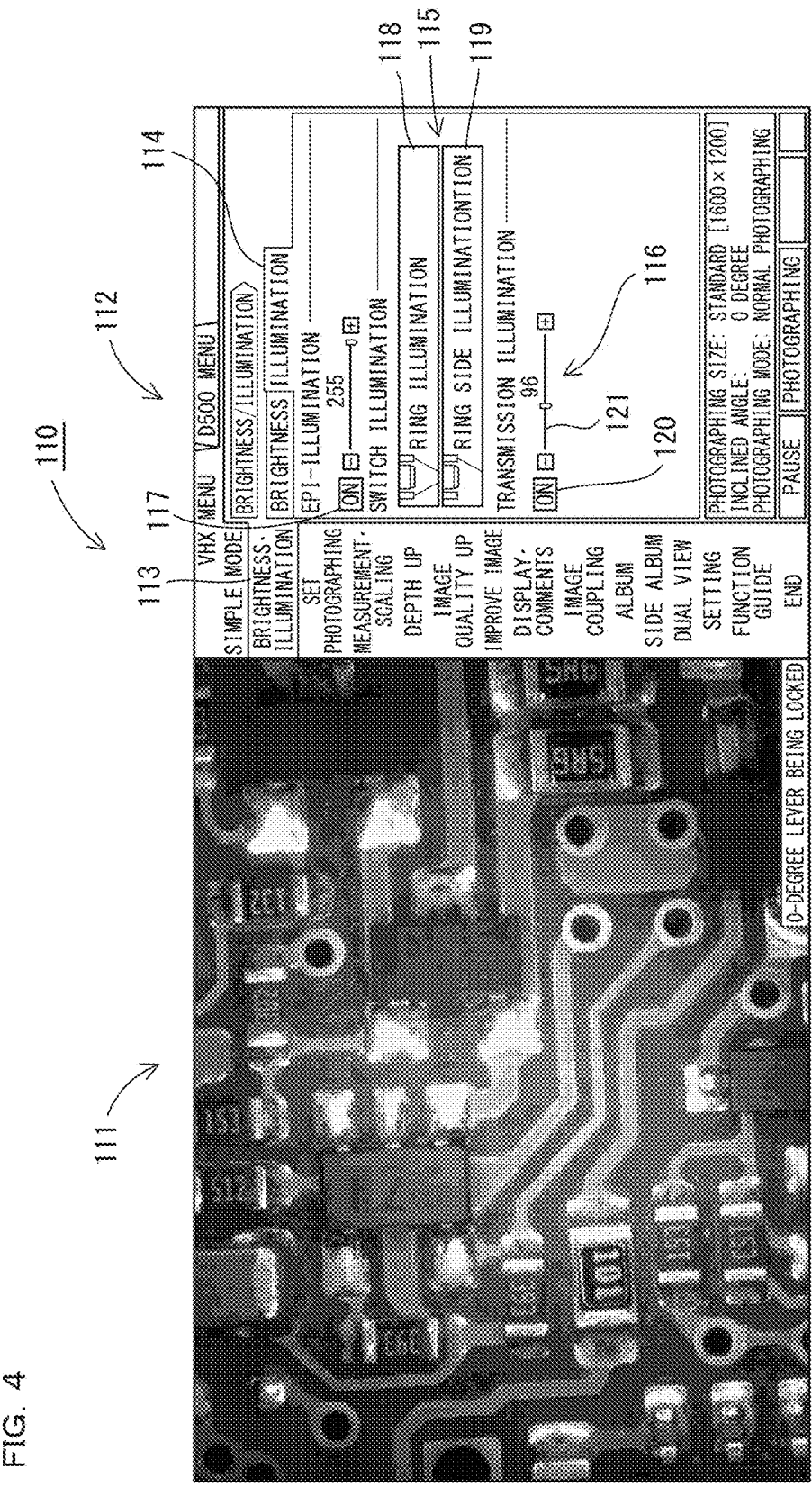
FIG. 4 is an image view showing a user interface screen of an illumination light switching screen of a magnified image observing program.

FIG. 4 shows one example of a user interface screen constituting one mode of the illumination light switching unit. FIG. 4 is a user interface screen of a magnified image observing program for operating the magnifying observation apparatus 100. Such an operation screen can be displayed on the display section 52 of the magnifying observation apparatus 100 or on a monitor of the externally connected computer. The user performs a variety of settings and operations of the magnifying observation apparatus 100 from the displayed screen. The magnified image observing program is incorporated in the body section 50.

Needless to say, in examples of the user interface screen of the program, it is possible to appropriately change arrangement, the shapes, a displaying manner, the size, the color, the pattern and the like of each input filed, each button or the like. A design change can make display easy for viewing, evaluation and determination, and make a layout easy for an operation. There can be made an appropriate change such as displaying a detailed setting screen in another window, or displaying a plurality of screens in the same display screen. Further, on each of the user interface screens of the program, specification to perform an on/off operation and input of a numeric value and an order on a virtually provided button and an input field is performed by the operation section 55. Here, an imaging condition and the like are set by an input device connected to the computer incorporated with the program. In the present specification, "pressing" includes clicking or selecting and artificially pressing a button by means of an input section, in addition to physically touching and operating the button. The input/output device constituting the operation section and the like is connected with the computer in a wired or wireless manner, or fixed to the computer or the like. Examples of the general input section include a variety of pointing devices such as a mouse, a keyboard, a slide pad, TrackPoint, a tablet, a joystick, a console, a jog dial, a digitizer, a light pen, a numeric keypad, a touch pad, and ACCUPOINT. Further, each of these input/output devices is not restricted to the operation of the program, but can also be used for an operation of hardware such as the magnifying observation apparatus 100. Moreover, input and an operation can be performed by the user directly touching the screen by use of a touch screen or a touch panel for the display of the display section 52 for displaying an interface screen, video input or another existing input unit can be used, or both of them can be used at the same time.

(Illumination Switching Screen 110)

The user interface screen of the magnified image observing program shown in FIG. 4 shows an illumination switching screen 110 as one mode of an illumination condition setting unit for setting an illumination condition of the illumination section. On the illumination switching screen 110, a display region 111 is provided on the left side, and an operation region 112 is provided on the right side. In the operation region 112, a menu is displayed in a ribbon form on the left side, and an operable content on the right side is switched in accordance with a selected ribbon. Further, a setting content can be switched here by switching a plurality of tabs. In the example of FIG. 4, a "brightness/illumination" ribbon 113 in the operation region 112 is selected, and an "illumination" tab 114 is further selected. Then the direction and brightness of each illumination light are set in an "epi-illumination" setting field 115" provided on the upper stage of the "illumination" tab 114 and a "transmission illumination" setting field 116 provided in its lower stage. For example, when an "On" button 117 in the "epi-illumination" setting field 115 is pressed, ring illumination is lighted, and its brightness is specified by 0 to 255. The brightness is specified by a numerical value or a slider. The image becomes bright when a light amount value is large, and the image becomes dark when the value is small. Further, a whole circumference of annular ring illumination is lighted when a "ring illumination" button 118 is pressed, and only part of the annular ring illumination is lighted when a "ring side illumination" button 119 is pressed. By obliquely performing irradiation with illumination light, for example, a flaw or unevenness on the surface of the observation target can be enhanced and observed. Meanwhile, similarly in the "transmission illumination" setting field 116, when an "On" button 120 is pressed, transmission illumination is lighted, and its brightness is specified by a numerical value or a slider 121. In this example, ring illumination is turned on and transmission illumination is turned off. However, both illumination can be turned on and a balance therebetween can be adjusted in accordance with an observation purpose.

(Brightness Setting Screen 122)

Figure 5:
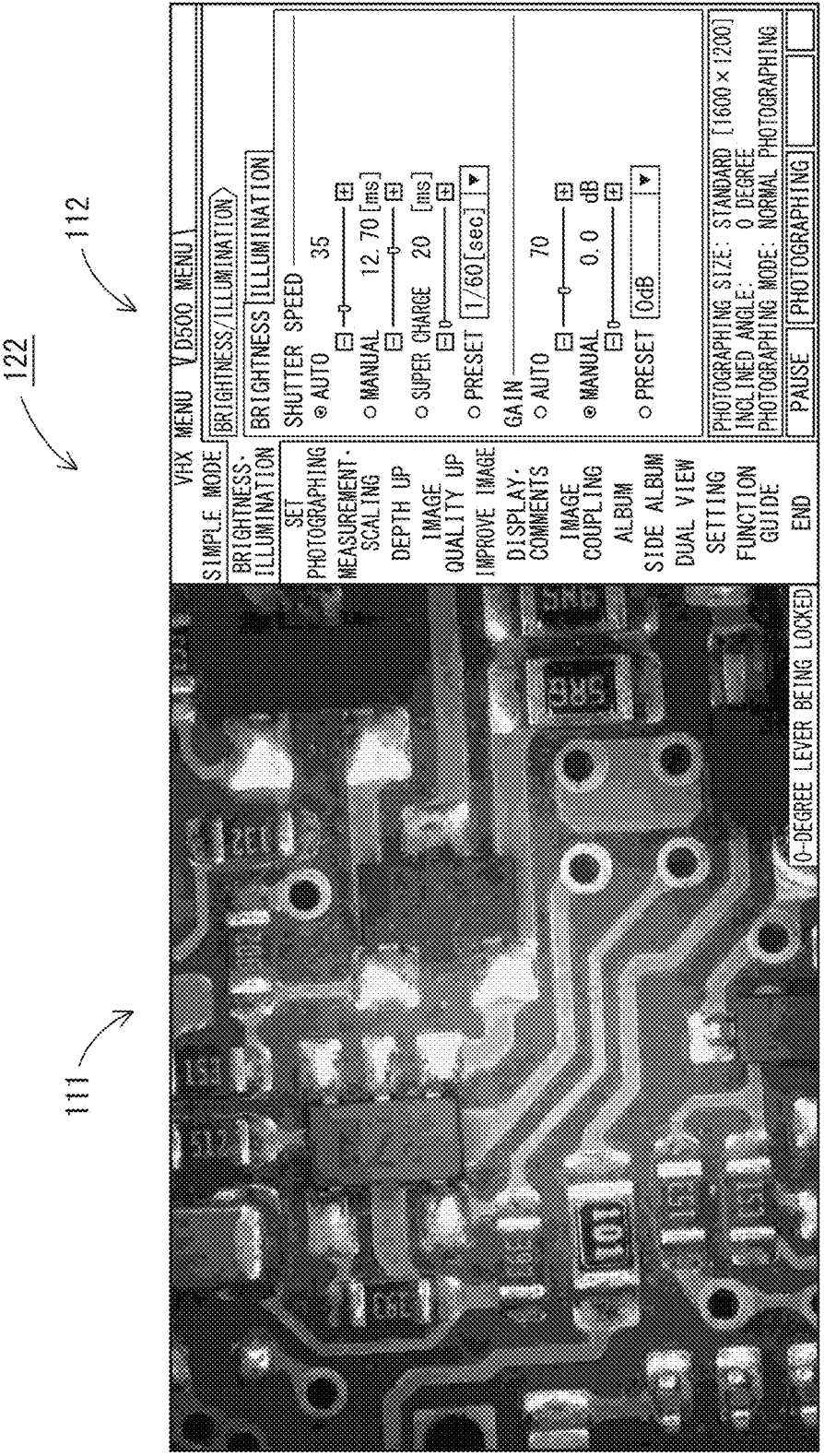
FIG. 5 is an image view showing a user interface screen of a brightness setting screen of the magnified image observing program.

Further, when the "illumination" tab 114 is selected in the operation region 112 in the illumination switching screen 110 of FIG. 4, the screen is switched to a brightness setting screen 122 of FIG. 5. On this screen, a shutter speed (exposure time) and a gain of the camera section 10 at the time of imaging can be adjusted as brightness of the image. The image becomes bright when the shutter speed is made slow (the exposure time is made long), and the image becomes dark when the shutter speed is made fast (the exposure time is made short). Here, as the shutter speed, any of auto, manual, super charge and preset can be selected by means of a radio button. Further, the image becomes bright when the shutter gain value is made large, and the image becomes dark when the shutter gain value is made small. Here, as the gain, any of auto, manual and preset can be selected.

(Illumination Light Source 65)

As the illumination light source 65, there can be used a semiconductor light emitting element such as a light emitting diode (LED) or a laser diode (LD). For example, as shown in FIG. 3, LEDs 65r, 65g, 65b having wavelength regions of R, G and B are prepared, and illumination light can be switched to red, green or blue by lighting each LED, or white light can be obtained by mixing these colors. Further, a white LED can be separately prepared. Since the LED is especially excellent in on/off responsiveness, it is also possible to obtain an advantage of allowing improvement in throughput of measurement. Further, the LED is also provided with features of having a long lifetime, low power consumption, a low calorific value and resistance to a mechanical shock. Alternatively, the LED may be the light source using a wavelength converting member such as a fluorescent substance that is excited by ultraviolet rays or visible rays as light source light. Herewith, even one LED can emit white light. Further, an LED capable of performing irradiation with ultraviolet light or infrared light, in addition to visible light, can also be used as the light source. For example, observation by means of infrared light is useful in analysis of a defective product, tissue distribution of a biological tissue, and the like. It is to be noted that the illumination light source is not restricted to the semiconductor light emitting element, but a halogen lamp, a xenon lamp, an HID lamp or the like may be used as a white light source for emitting white light with a wide wavelength region. Further, the light source may be one capable of performing irradiation with infrared light as well as visible light. The halogen lamp is particularly preferred since its light-emitting wavelength has a wide wavelength region. Moreover, not only a single light source is used, but a plurality of light sources can be provided. These can be simultaneously lighted and the mixed light can be used as illumination light, or these can be switched for illumination.

Figure 6:
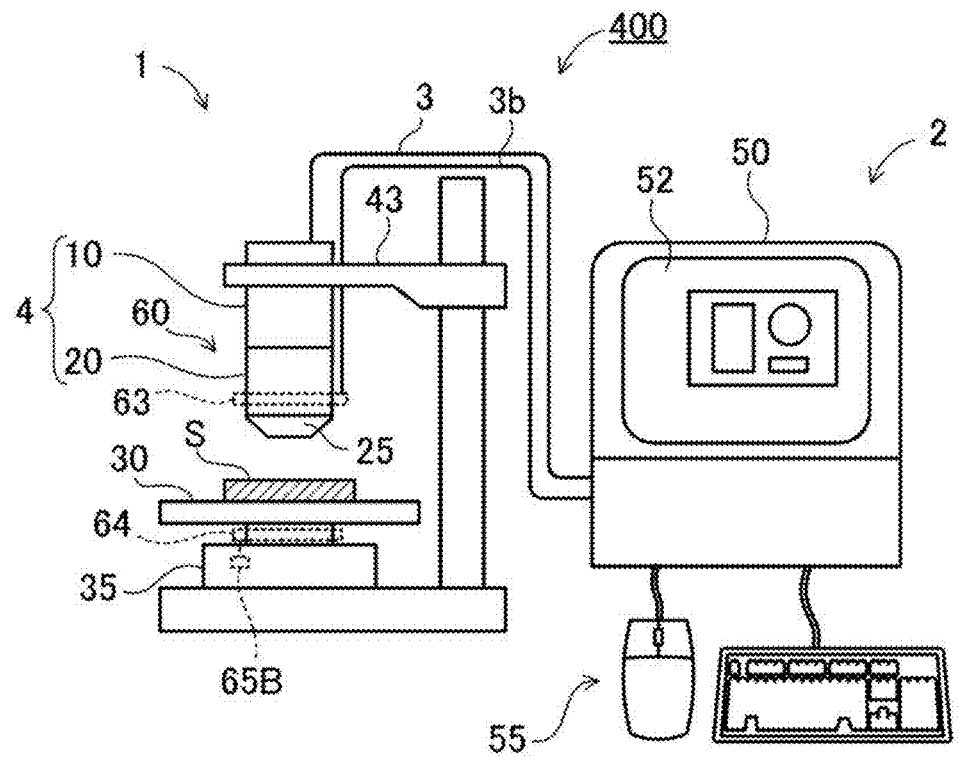
FIG. 6 is a schematic view showing a magnifying observation apparatus according to a modified example.
Figure 7:
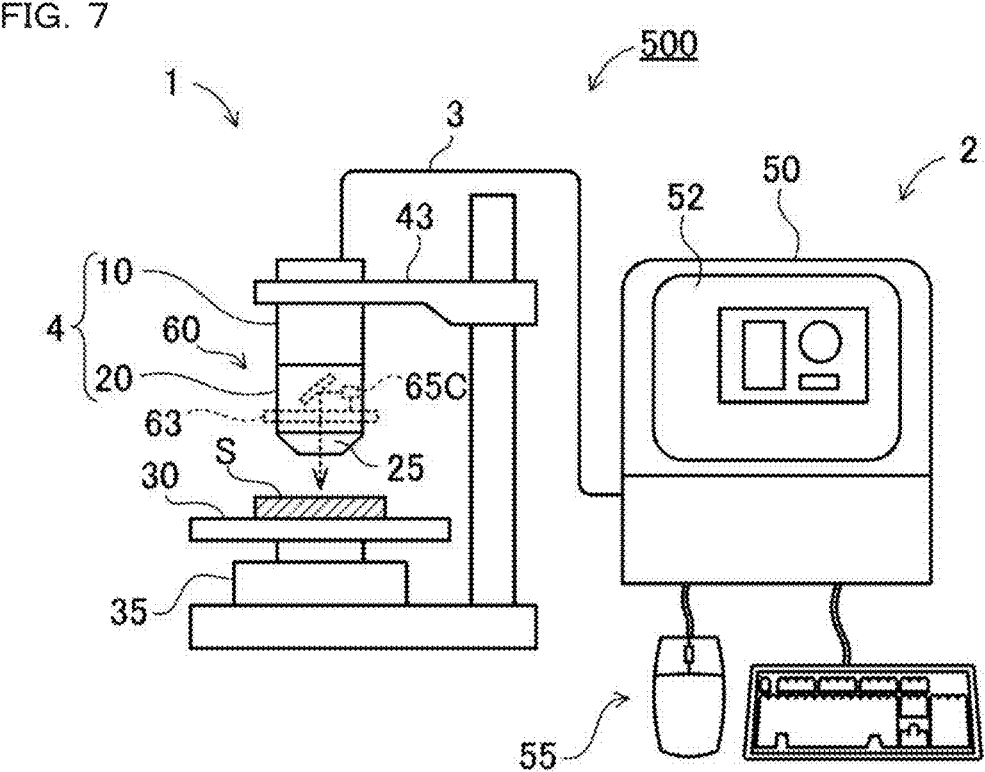
FIG. 7 is a schematic view showing a magnifying observation apparatus according to another modified example.

It is to be noted that the illumination light source is not restricted to the configuration of being installed in the body section. For example, it can be provided in the placement section or the microscope lens section. As a modified example, in a magnifying observation apparatus 400 shown in FIG. 6, a transmission illumination light source 65B is provided as the illumination light source on the placement section 30 side. Further, in a magnifying observation apparatus 500 shown in FIG. 7, an illumination light source 65C for the coaxial epi-illumination and the ring illumination is provided on the microscope lens section 20 side. With such configurations, it is possible to obtain an advantage of eliminating the need for transmitting illumination light from the body section side to the head section side by means of an optical fiber or the like, and reducing the number of cables to be extracted to the outside, so as to simplify the configuration. Further, also inside the head section side, light from the illumination light source may be divided by an optical fiber, or a semiconductor light emitting element such as an LED with high brightness can be provided for direct illumination. In particular, as compared to a conventional halogen lamp and the like, the LED has a small size, a low calorific value, and a long lifetime, and can be made maintenance-free.

As thus described, by preparing the illumination light source capable of emitting red, green and blue light, it is possible to eliminate the need for a filter as in the conventional white light source, and also eliminate the need for performing a mechanical operation such as switching of the filter, so as to perform stable and high-speed switching of illumination light only by means of an electrical signal. Further, with the LED having a long lifetime, it is possible to save labor for a maintenance operation such as replacement of an electric bulb. Moreover, since the semiconductor light emitting element has a small size as compared to the bulb, there is an advantage that a plurality of kinds of light emitting elements can be arranged in a space saving manner. Furthermore, for example by also providing an infrared light emitting element or an ultraviolet light emitting element, it is possible to easily switch illumination light not only to visible light but also to infrared light, ultraviolet light, or the like. Additionally, the semiconductor light emitting element has low consumption power, and its cooling fan can be reduced in size or omitted, to realize excellent quietness. In such a manner, it is possible to control the illumination light source provided with a plurality of light emitting elements with different wavelength regions by the illumination light selecting unit 87, select and light a light emitting element with a desired wavelength region, and perform irradiation with illumination light.

Further, in addition to the 3 primary colors of RGB, complementary colors (e.g., cyan, magenta, yellow) of these can be appropriately used for the illumination light source and the illumination filtering unit. Moreover, a filter for allowing transmission of ultraviolet light or infrared light can also be used as the filter.

(Coaxial Epi-Illumination Observation)

Figure 8:
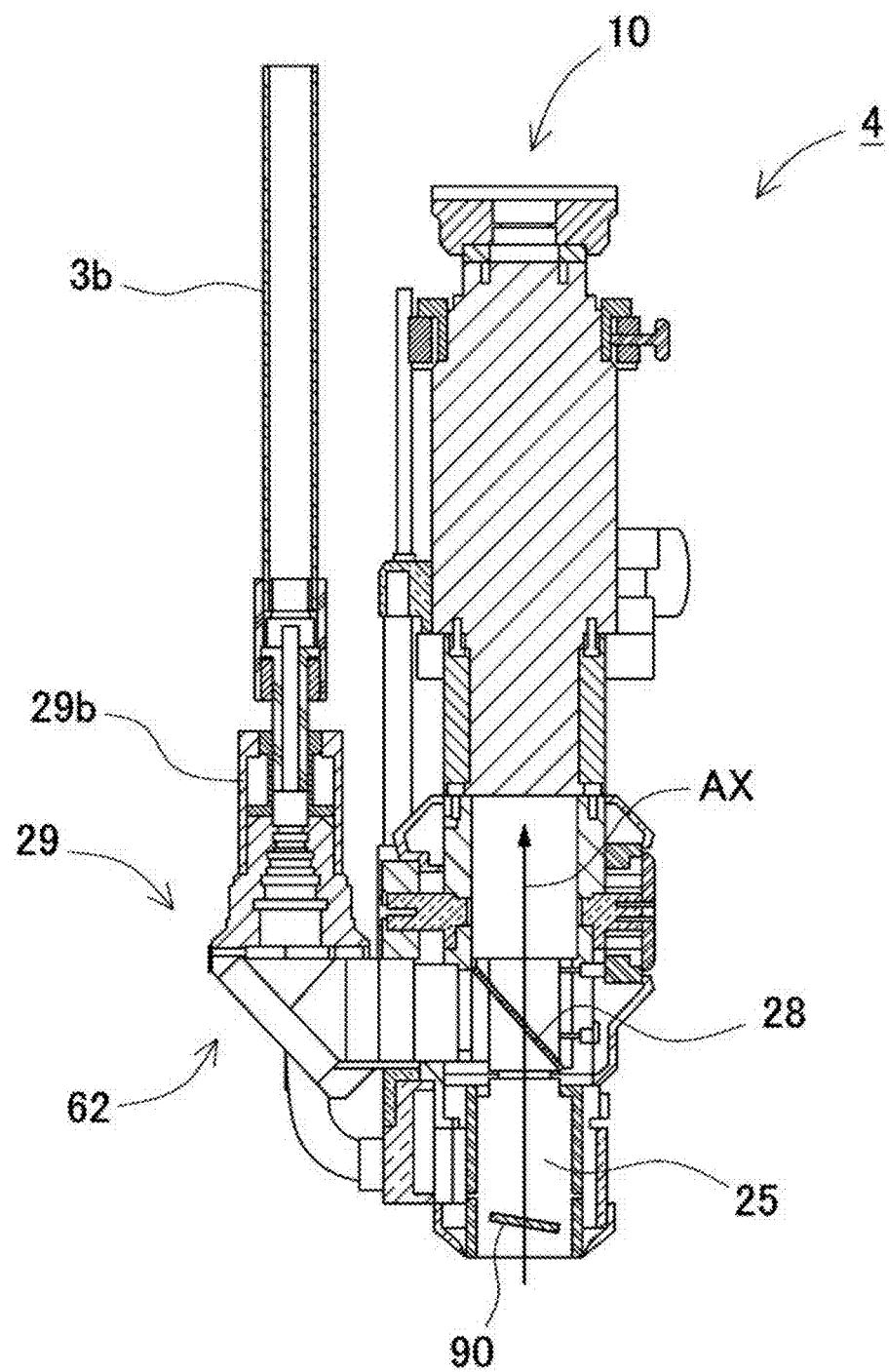
FIG. 8 is a sectional view of a head section of FIG. 8.

FIG. 8 shows a sectional view of the head section 4. This head section 4 is provided with: the coaxial epi-illumination section 62 for irradiating the observation target with coaxial epi-illumination light; the camera section 10 having an imaging element for receiving reflected light of illumination light applied by the coaxial epi-illumination section 62; the objective lens section 25 which is optically bonded with the camera section 10 by matching optical axes thereof; and a phase delaying element 90 arranged by matching its optical axis with the optical axis of the objective lens section 25. The illumination section 60 includes the coaxial epi-illumination section 62 and the ring illumination section 63. The head section 4 is provided with the camera section 10, a polarized beam splitter 28, and the objective lens section 25. These are optically bonded in a state where optical axes AX thereof are matched, and constitute the imaging optical system. Further, the phase delaying element 90 is arranged on the optical axis AX in the objective lens section 25. Meanwhile, the ring illumination light is not introduced into the imaging optical system, and the observation target S is directly irradiated with the ring illumination light. It is to be noted that for the phase delaying element 90, a $\lambda/4$ plate, a $\lambda$ plate, a $(1/2)\lambda$ plate, a $(3/4)\lambda$ plate, a $(5/8)\lambda$ plate or the like can be used, and the $\lambda/4$ plate is typically used. In addition, the $\lambda/4$ plate is preferably arranged as inclined so as to prevent occurrence of reflection on its boundary surface.

(Support Base 40)

Figure 9:
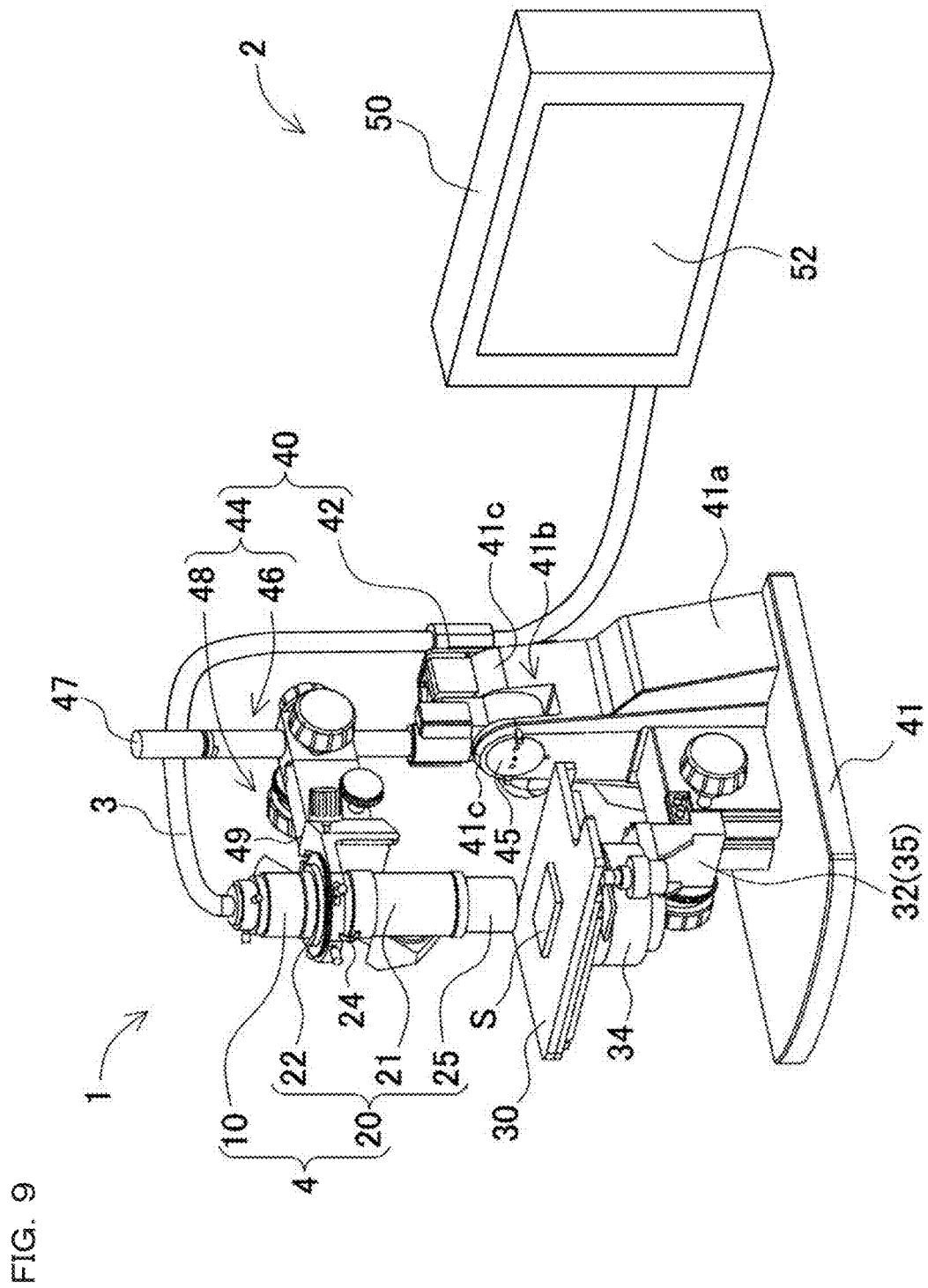
FIG. 9 is a perspective view showing an appearance configuration of an imaging system of the magnifying observation apparatus.

FIG. 9 shows one example of the appearance configuration of the imaging system 1 in the magnifying observation apparatus 100. The imaging system 1 shown in FIG. 9 is provided with the placement section 30 for placing the observation target S, and a support base 40 for supporting the head section 4. The support base 40 is provided with a stage fixing mechanism 42 for holding the placement section 30 so as to be movable in the horizontal plane or vertically, and a head inclining mechanism 44 for inclining the head section 4 in the state of holding the placement section 30. The stage fixing mechanism 42 and the head inclining mechanism 44 are fixed to a base section 41. The base section 41 is formed in a tabular shape and stably makes the support base 40 independent.

(Stage Fixing Mechanism 42)

The stage fixing mechanism 42 fixes the placement section 30 to the support base 40 via one or more movement mechanisms capable of moving the placement section 30 in the horizontal plane (xy-axis direction) and in the vertical direction (z-axis direction). Specifically, it is possible here to use, as the movement mechanism, a z-axis direction movement mechanism (first focus adjusting section) for moving the placement section 30 in the z-axis direction, an xy-axis direction movement mechanism for moving the placement section 30 in the xy-axis direction, and a rotational movement mechanism for rotating the placement section 30 in a θ-direction. In the example shown in FIG. 9, as the z-axis movement mechanism, the lower stage lift 35 is realized by a slider 32 fixed onto the base section 41 in a vertically movable manner. Further, as the rotational movement mechanism, the placement section 30 is made rotatable by an intermediate coupling section 34 fixed onto the slider 32. Additionally, as the xy-axis movement mechanism, the placement section 30 is made movable in the xy-axis direction by the x-y stage fixed onto the intermediate coupling section 34. The xy-axis movement mechanism, the z-axis movement mechanism and the rotational movement mechanism function as visual field moving units for changing a visual field of an image displayed on the display section 52.

(Head Inclining Mechanism 44)

Figure 10:
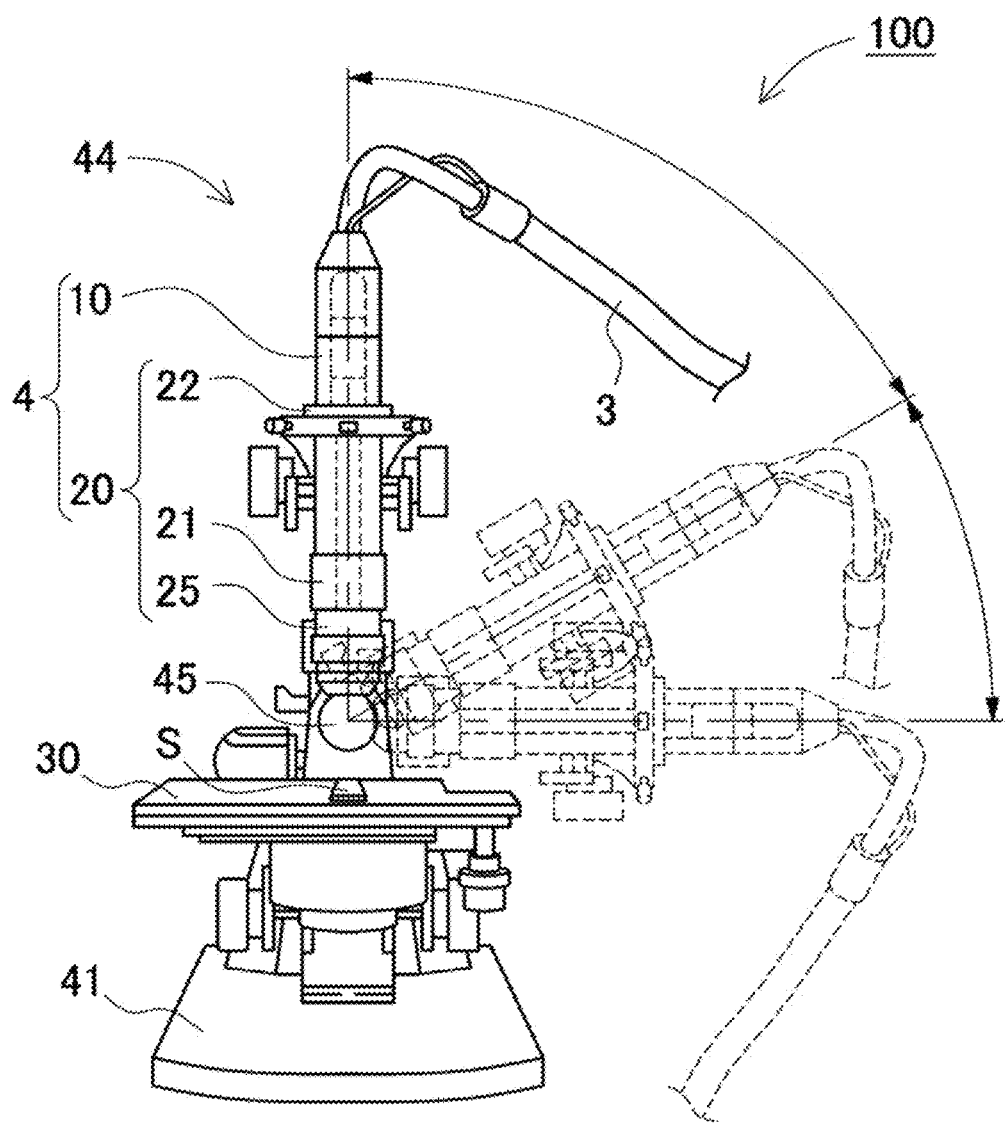
FIG. 10 is a schematic view showing the situation of swinging the head section.

In the meantime, for inclining the head section 4 with respect to the placement section 30, the head inclining mechanism 44 is provided with a swinging section 46 coupled swingably to the base section 41 via a swinging axis 45, and a head fixing section 48 for fixing the head section 4 to the swinging section 46, as shown in a perspective view of FIG. 10. The swinging section 46 is provided with the swinging axis 45, and a swaying support 47 provided in the attitude of protruding upward from the base section 41. Further, the head fixing section 48 is provided with a head arm 49 for fixing the head section 4 to the swaying support 47 in an almost parallel attitude. The swaying support 47 is provided with the swinging axis 45 at its lower end, and supported by the base section 41 so as to be circulated around the swinging axis 45. Further, the head arm 49 is fixed by, for example, cramping the swaying support 47 in a position from an upper portion to a middle portion of the swaying support 47 so as to hold the head section 4 above the placement section 30. Moreover, a fixing mechanism for fixing the head section 4 is provided at the tip of the head arm 49. Here, the fixing mechanism is formed in a ring shape surrounding an outer circumference of the head section 4, and the head section 4 is inserted into the center of the ring shape, and screwed at a plurality of positions therearound for fixing.

A block 41a that is widened downward is fixed to the upper surface of the base section 41, and a bearing 41b is formed in an upper portion of the block 41a. The bearing 41b is provided with a pair of guide sections 41c that are fixed as separated from each other, and the pair of guide sections 41c are formed in a recessed shape in a side surface view. The respective guide sections 41c have circular holes formed with a parallel axis to the y-axis direction taken as a central axis. The swinging axis 45 is fitted to these holes along the y-axis direction. In this example, it is configured that the swinging axis 45 is provided with a scale and an angle at which the head section 4 is swayed can be visually viewed by means of the scale.

The head section 4 is inclined with respect to the placement section 30 by the head inclining mechanism 44, thereby allowing inclined observation in which the observation target S is observed from an oblique direction. Especially by horizontally swaying the head section 4 from a vertical attitude with the swinging axis 45 taken as a rotational axis, observation can be performed from either a left direction or a right direction, and the observation from different viewpoints allows improvement in flexibility of observation. Further, in such inclined observation, eucentric observation is required where the visual field is not changed even when the head section 4 is inclined. For this reason, at the time of the inclined observation, the height of the placement section 30 is desirably adjusted such that the observation surface of the observation target S is previously matched to the center of the swinging axis 45.

Figure 11:
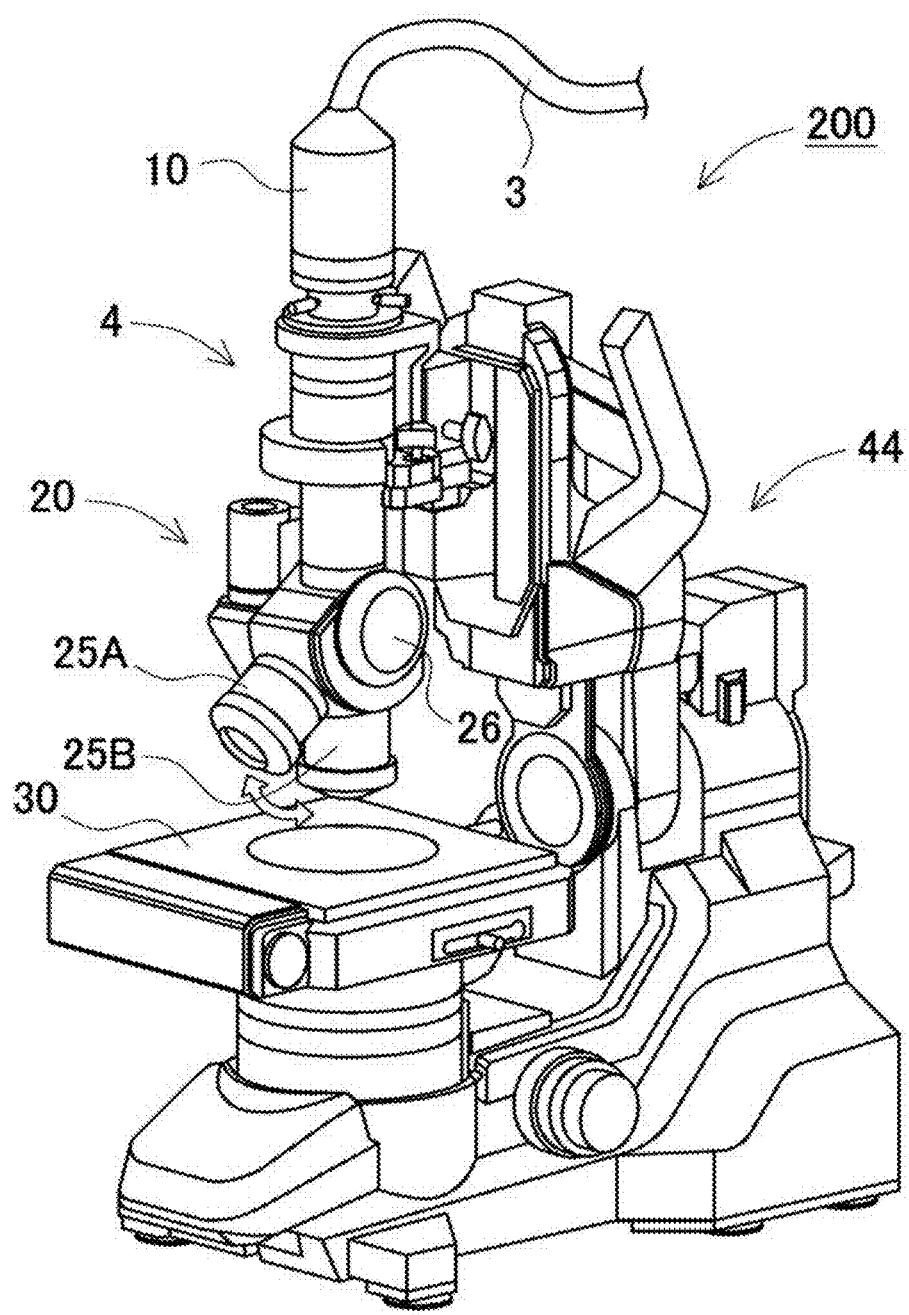
FIG. 11 is a perspective view showing the magnifying observation apparatus provided with an objective lens switching unit.

Further, as shown in a perspective view of FIG. 11, a magnifying observation apparatus 200 is provided with an objective lens switching unit 26 for swaying a first objective lens section 25A and a second objective lens section 25B, which are provided at the tip of the head section 4 in a vertical plane to a plane where the head section 4 is swayed, to perform switching. As thus described, the swaying plane of the head section 4 and the swaying plane for switching the objective lens section 25 are made orthogonal to each other, thereby allowing avoidance of a situation where the tip of the objective lens comes into contact with the observation target at the time of switching the objective lens section 25 in the state of the head section 4 being inclined. Here, each objective lens section is previously designed so as to have the same length.

(Camera Section 10)

The head section 4 is provided with the camera section 10 having the imaging element, and the microscope lens section 20 detachably mounted at the tip of the camera section 10. The camera section 10 is provided with the imaging element 12 for electrically reading reflected light incident via the imaging optical system 11 from the observation target S illuminated by the illumination section 60. A CMOS is used as the imaging element 12 in this example, but another light reception element such as a CCD can also be used. Further, in addition to the objective lens section 25, the microscope lens section 20 is provided with a lens body 21, and a mount section 22 mounted on the end surface of this lens body 21 to constitute a lens contact surface. Moreover, the mount section 22 is electrically connected with the microscope lens section 20 via a lens-side cable 24 having flexibility. Herewith, lens identification information of the microscope lens section 20 is transmitted to a lens-side connection terminal of the mount section 22 via the lens-side cable 24.

(Optical Path Shifting Unit 14)

Further, the magnifying observation apparatus 100 can also be provided with the optical path shifting unit 14 for relatively shifting a detection position of the imaging element 12, and the optical path shifting control unit 81 for activating the optical path shifting unit 14. Specifically, concerning 3 or more marked pixel groups, a detection position of any of imaging elements constituting the marked pixel group is relatively shifted by the optical path shifting unit 14 by a movement amount corresponding to an interval between pixels of the imaging element such that a light receiving signal makes a round through positions of the pixels of imaging elements constituting the marked pixel group and a light reception amount is detected at each position.

(Optical Path Shifting Control Unit 81)

The optical path shifting control unit 81 activates the optical path shifting unit 14 such that at the time of irradiating the specimen S with illumination light with a predetermined wavelength via an illumination filter selected with a filter selecting unit 88, a light reception amount is detected by an imaging element corresponding to the wavelength region out of a plurality of imaging elements. This can make selection of the illumination filter and the imaging element interlocked with pixel shifting, whereby it is possible for the user to easily acquire a high-resolution observation image without being conscious of troublesome switching and combination of selection of illumination light and selection of the illumination filter and the imaging element in accordance with the illumination light.

In the example of FIG. 2, the optical path shifting unit 14 is provided in the camera section 10, and by pixel shifting, it is possible to obtain a higher resolution than a resolution of the CMOS. The pixel shifting is to achieve a high resolution in such a manner that, for example by using a piezo-electric element or the like for a single plate type as described in JP 2004-170574 A or a three-plate type, an image, which is photographed as the specimen S is shifted, for example, by a half of a pixel pitch by the pixel shifting for physically shifting the element to a space between adjacent elements (pixels), is synthesized with an image before the shifting. Further, by performing shifting by 1 pixel pitch and acquiring RGB data at each pixel, color reproduction properties can also be improved. As typical mechanisms for the pixel shifting, there are an imaging element driving system for moving the imaging element 12 by means of an actuator AC or the like, an LPF inclining system for inclining an LPF, a lens moving system for moving the lens, and the like.

When the pixel shifting function is executed, as shown in FIG. 12, in a state where the imaging elements are arranged at corresponding pixels in a matrix form in a Bayer array, the optical path shifting unit 14 can perform switching so as to shift the imaging elements to 2×2 adjacent pixel positions, as shown in FIG. 13. Herewith, the Bayer-arrayed imaging elements with different light receiving characteristics are shifted by the optical path shifting unit 14 so as to make a round with respect to the adjacent 2×2 marked pixels, whereby it is possible to acquire a light receiving signal at each of all the 2×2 pixel positions and obtain a high-resolution observation image. It is to be noted that a shift amount of the imaging element being relatively shifted by the optical path shifting unit 14 is 4 times of counterclockwise shifts corresponding to a total of 4 pixels as a displacement amount of the imaging element which corresponds to the pixel interval in the example of FIG. 13. However, it can also be shifted only by 2 adjacent pixels vertically, horizontally or the like, or only by 3 pixels. Further, the movement amount is not restricted to an amount corresponding to 1 pixel of the imaging element, but it can also be an amount corresponding to one-half of the pixel as shown in FIG. 14, an amount corresponding to one-third of the pixel, or the like. By adjusting the movement amount in accordance with a peak position and a range of light-receiving sensitivity at each pixel constituting the imaging element, it is possible to improve the light reception amount even by a movement amount not larger than the amount corresponding to 1 pixel, so as to achieve a high resolution. As thus described, the displacement amount corresponding to the pixel interval of the imaging element is not restricted to the amount that is equivalent to the pixel pitch or an integral multiple thereof, but also includes the amount that is a fraction multiple thereof such as one-half of the pixel or one-third of the pixel.

(Display Section 52)

Further, such image data and the setting content stored in the storage section 53 can be displayed on the display section 52. As the display section 52, a CRT display, a liquid crystal display, an organic EL monitor or the like can be used. Further, the operation section 55 for the user performing a variety of operations is connected to the control section 51. The operation section 55 is an input device such as a console or a mouse. It should be noted that also in this example, the display section and the operation section can be incorporated integrally with the body section 50, or can be external members. Moreover, when the display section is configured by a touch panel, the display section and the operation section can be integrally configured.

Here, an operation of the lower stage lift 35 will be described. By input of control data concerning control of a stepping motor 37 into a motor control circuit 36, the body section 50 changes a relative distance in the optical axis direction between the placement section 30 and the head section 4 having the imaging optical system 11 and the imaging element 12, which is the height in the z-direction in this case. Specifically, by input of control data necessary for controlling the lower stage lift 35 into the motor control circuit 36, the body section 50 controls rotation of the stepping motor 37 and increases or decreases a height z (a position in the z-direction) of the placement section 30. The stepping motor 37 generates a rotation signal in accordance with rotation. Based on the rotation signal inputted via the motor control circuit 36, the body section 50 stores the height z of the placement section 30 as information concerning the relative distance between the placement section 30 and the imaging optical system 11 in the optical axis direction. This placement section 30 functions as an observation positioning unit for performing positioning of an observation position on the observation target S.

Needless to say, the lower stage lift 35 is not restricted to an electrically lifting type, but can be configured as a manually lifting type.

Further, in the present embodiment, not only the relative distance between the placement section 30 and the imaging optical system 11 in the optical axis direction is changed by changing the height of the placement section 30, but the height of the imaging optical system, namely, the height of the head section 4, can also be changed. The head section 4 is connected with the body section 50 by the cable section 3. Herewith, data acquired in the head section 4 is transmitted to the body section 50 via the cable section 3, and necessary processing can be performed on the body section 50 side.

The imaging element 12 can electrically read a light reception amount at each of pixels that are two-dimensionally arranged in the x-direction and the y-direction. An image of the observation target S formed on the imaging element 12 is converted to an electric signal in accordance with the light reception amount at each pixel of the imaging element 12, and is converted further to digital data in a head-side control section 13. The body section 50 stores into the storage section 53 the digital data converted in the head-side control section 13 as light reception data D, along with pixel arrangement information (x, y) as two-dimensional position information of the observation target S in a plane (the x/y-directions in FIG. 2) almost vertical to the optical axis direction (the z-direction in FIG. 2). Here, "a plane almost vertical to the optical axis direction" need not be a plane strictly forming 90° against the optical axis direction, but may only be an observation plane within a range of inclination to such an extent that the shape of the observation target S can be recognized at resolutions in the imaging optical system and the imaging element.

Further, although the example of the observation target S being placed on the placement section 30 has been shown as one example of the placement section 30 in the above description, for example, it can also be configured that an arm is attached in place of the placement section and the observation target S is fixed to its tip. In addition to being mounted for use on a camera attaching section 43, the head section 4 can further be arranged at a desired position and angle by a method where it is made detachable and is held with a hand, or some other method.

(Control Section 51)

The control section 51 performs control so as to convert the captured observation image to an image with a resolution at which it can be displayed on the display section 52 and display the obtained image. In the magnifying observation apparatus 100 of FIG. 1, an observation image, obtained by the camera section 10 capturing an image of the observation target S by means of the imaging element 12, is displayed on the display section 52. Generally, performance of the imaging element such as a CMOS or a CCD often goes beyond a display capability on the display section, and hence in order to display the captured observation image on one screen, a resolution is reduced to a size in which the image can be displayed on one screen by thinning out pixels, or the like, to reduce and display the image. When a reading resolution at the time of being read by the camera section 10 is taken as a first resolution, display is performed on the display section 52 at a second resolution that is lower than the first resolution.

(Simple Imaging Condition Generating Function)

Figure 15:
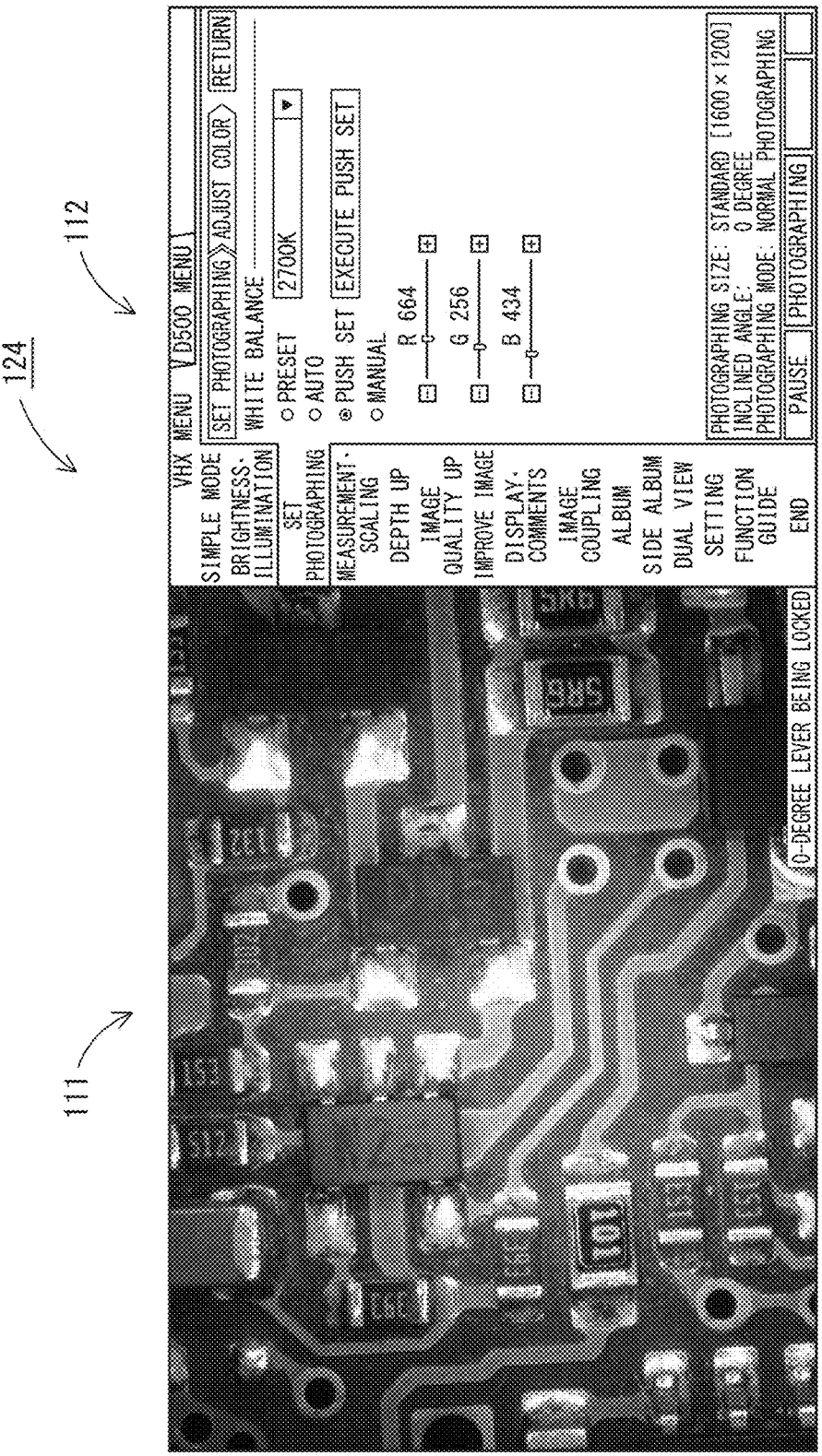
FIG. 15 is an image view showing a user interface screen of a white balance setting screen of the magnified image observing program.
Figure 16:
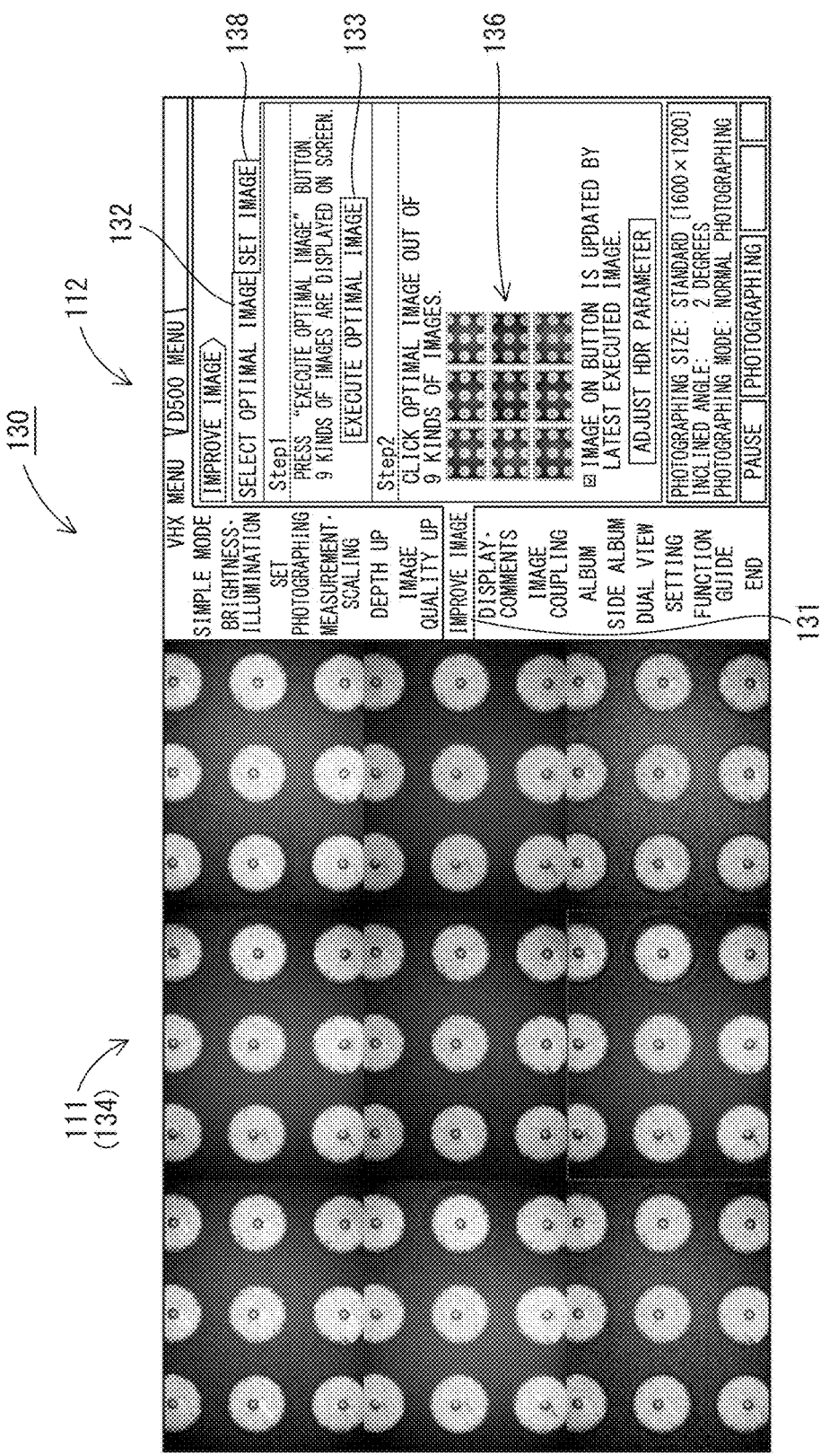
FIG. 16 is an image view showing a user interface screen of the magnified image observing program where a list display region is displayed.
Figure 17:
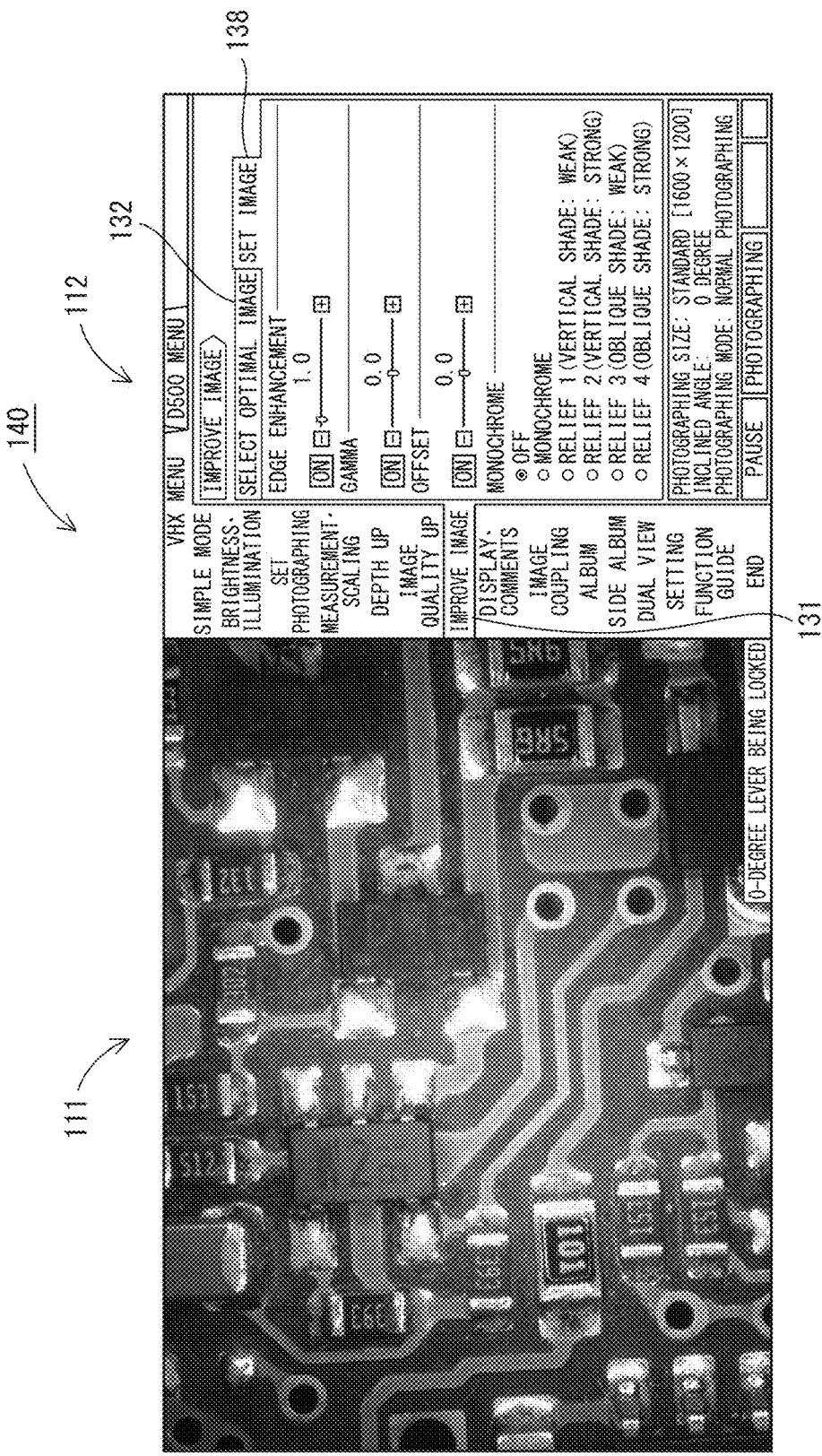
FIG. 17 is an image view showing a user interface screen of an image setting screen of the magnified image observing program.

At the time of observing the observation target by use of the magnifying observation apparatus 100, it is of necessity to set an imaging condition for acquiring an image. Examples of the imaging condition include a variety of imaging parameters such as selection of illumination light in the case of a plurality of illumination sections 60 being provided, the kind and the direction of illumination light, a shutter speed (exposure time) of the camera section 10, brightness and contrast of a screen, a white balance and the type of image processing such as a variety of filtering as post-processing after imaging (here, parameters including the post-processing parameters after imaging are referred to as "imaging parameters"). Further, the imaging conditions include an illumination condition for setting illumination light. As one example, a user interface screen of the magnified image observing program is shown in each of FIGS. 4 and 15 to 17 as one mode of the imaging condition setting section 83 for setting such an imaging condition. In these figures, as described above, FIG. 4 shows the illumination switching screen 110 as one mode of the illumination condition setting unit for setting the illumination condition of the illumination section 60. Further, FIG. 15 shows an example of a white balance setting screen 124 for setting a white balance, FIG. 16 shows an example of a list display region, and FIG. 17 shows an example of an image setting screen. On the white balance setting screen 124 of FIG. 15, a white balance, namely a color shade of an image, can be adjusted. In the list display region of FIG. 16, by selecting a desired simple image out of simple images each captured on a simple imaging condition having been simply set, the simple imaging condition set for this simple image can be set as an imaging condition. On the image setting screen of FIG. 17, a variety of imaging conditions are set. In such a manner, when the imaging condition is set and changed in the imaging condition setting section 83, a later-described display mode switching unit 89e determines that an image changing operation has been performed and switches the display mode.

(Simple Imaging Condition Setting Function)

Individually setting such imaging conditions is time-consuming. Further, since some imaging parameters are correlated to each other, it may be difficult especially for a beginner user to find out which parameter needs to be adjusted in order to obtain a desired image. Therefore, the magnifying observation apparatus according to the present embodiment is provided with a simple imaging condition setting function of previously generating in a simple manner a plurality of temporary imaging conditions obtained by combining a variety of imaging parameters, and further list-displaying on the display section a simple image acquired on each simple imaging condition. Accordingly, by allowing the user to select a desired simple image out of the list-displayed simple images, the simple imaging condition, on which this simple image has been acquired, can be set as a normal imaging condition, and hence even a user not familiar with the operation can easily obtain an image visually close to a desired image. Further, each imaging parameter can be finely adjusted with respect to the selected simple imaging condition, and there can thus be obtained an advantage of being able to easily perform an imaging condition setting operation. Such a simple imaging condition generating function can be realized by the simple imaging condition generating section 89c of the control section 51.

A plurality of different simple imaging conditions generated in the simple imaging condition generating section 89c are set in the illumination section 60 and the camera section 10 from the control section, and each simple image is simply captured. Since the simple image captured here is just intended on being list-displayed for the user to make comparisons, a fine image need not be acquired, and simple imaging is sufficient for the purpose. Specifically, an image is obtained in a shorter time than the time taken in normal imaging by reducing a resolution or a frame rate, by simplifying computational processing for image generation or by some other means. Herewith, a plurality of simple images on different simple imaging conditions can be acquired in a short time (this may be referred to as a preview in the meaning of being preliminary imaging). The simple imaging condition generating section 89c can make an impression of the obtained simple image significant by setting to an imaging parameter that can largely change a visual effect.

(List Display Function)

Further, the magnifying observation apparatus 100 is provided with a list display function for list-displaying simple images, simply acquired on a plurality of different simple imaging conditions generated in the simple imaging condition generating section 89c, in the list display region on the display section. An example of the list display is shown on a list display screen 130 of FIG. 16. In the example of FIG. 16, for executing the list display function, an "improve image" ribbon 131 in the operation region 112 is selected, and a "select optimal image" tab 132 is selected. Then, an "execute optimal image" button 133 provided on the upper stage of the "select optimal image" tab 132 is pressed, to switch the display region 111 to a list display region 134. In the list display region 134, the simple images captured on the respective simple imaging conditions are arrayed and displayed. In this example, 9 simple imaging conditions are generated by the simple imaging condition generating section 89c, and 9 simple images simply captured on the respective imaging conditions are displayed. The respective simple images are subjected to different image processing and illumination effects, and out of these, the user selects a desired simple image in accordance with an observation purpose. In the example of FIG. 16, 9 list-displayed images 136 similar to those in the list display region 134 are also displayed in the operation region 112. Since an array of the list-displayed image 136 matches an array of the list display region 134, the user decides a desired simple image while comparing each simple image in the larger list display region 134, and selects the image present in the corresponding position out of the list-displayed images 136 in the operation region 112 by a mouse click or the like. Herewith, a simple imaging condition corresponding to the selected simple image is called and this simple imaging condition is inputted as a normal imaging condition. Further, the user can finely adjust the imaging condition as needed.

In the example of FIG. 16, when a "set image" tab 138 is selected, the screen is switched from the list display screen 130 to an image setting screen 140 of FIG. 17. Here, it is possible to finely adjust edge enhancement, gamma correction, offsetting and monochrome setting as the imaging parameters. In this example, the edge enhancement, the gamma correction and the offsetting are adjusted using a slider, and in the monochrome setting, a degree of enhancing a shade is selected using a radio button. Here, the edge enhancement is an imaging parameter for enhancing an edge portion of the image to facilitate observation of a flaw or a fine matter, and the larger its value, the more strongly the edge enhancement is applied. Further, the gamma correction is adjustment performed on a brightness histogram of each pixel included in the image, and used for enhancement of contrast or gradation. Moreover, the offsetting adjustment is also adjustment of a brightness histogram, and used at the time of making the whole image brighter or darker. Furthermore, it is also possible to generate a new simple imaging condition in accordance with the setting condition here, and again execute the list display function. Additionally, by pressing an "adjust HDR parameter" button provided below the list-displayed image 136, the screen is shifted from the screen of FIG. 16 to a detailed synthesis parameter setting screen for generating an HDR image.

(Image Synthesizing Unit 85b)

Further, as a synthetic image photographing mode for acquiring a synthetic image in a synthetic image generating unit 85, the magnifying observation apparatus is provided with a dynamic range extension photographing mode suitable for an application of extending a dynamic range, and a resolution improvement photographing mode for improving a brightness resolution and enhancing a contrast. In the dynamic range extension photographing mode, there is generated a synthetic image having a wider dynamic range than that of an original image. On the other hand, in the resolution improvement photographing mode, there is generated a synthetic image having a brightness resolution more improved than that of the original image in a narrower dynamic range than a dynamic range of the imaging element.

(HDR Image)

Figure 18A:
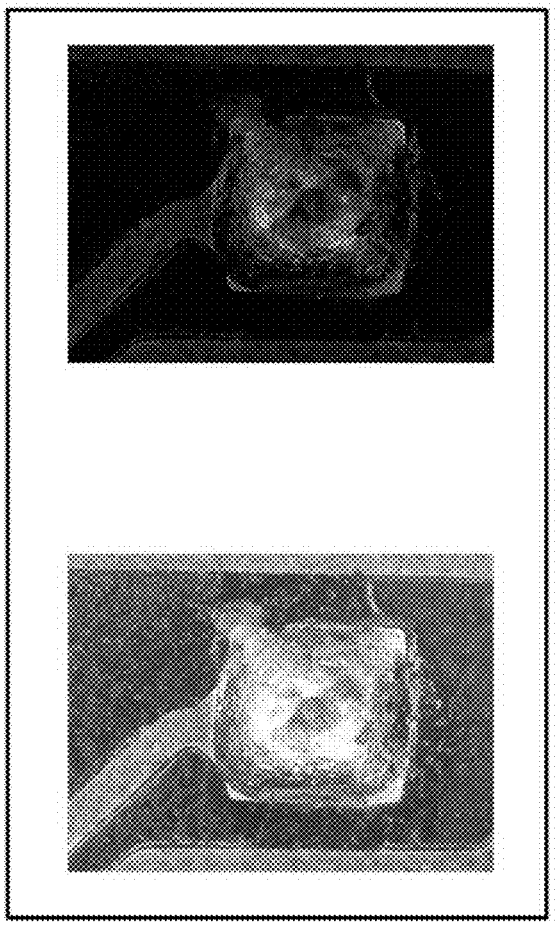
FIGS. 18A and 18B are image views showing low-tone images with different exposure time.
Figure 18B:
Figure 18C:
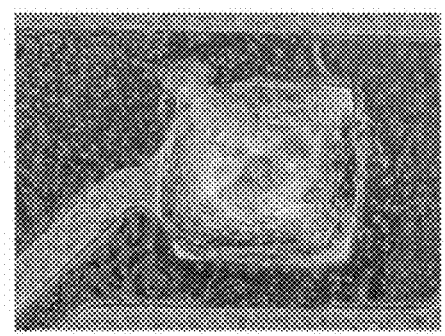
FIG. 18C is an image view showing an HDR image obtained by synthesizing FIGS. 18A and 18B.

In the dynamic range extension photographing mode, a so-called HDRI is captured. The HDRI (High Dynamic Range Image, hereinafter referred to as an "HDR image") is an image with a dynamic range, namely a ratio between a minimum light amount and a maximum light amount, is significantly higher than that of a conventional image. For example, on a monitor of a standard computer, 8 to 24 bit color is adopted as standard color representation and can be represented by 2.56 to 16.77 million tones, but a larger number of colors exist in reality and human's eyes see them by changing the size of a pupil to adjust brightness to reference brightness that is thought to be suitable. Accordingly, there is used an HDR image beyond a representation capability of the monitor and the like and rendered with more color information. For acquiring such an HDR image, there can be used a known technique such as synthesizing a plurality of images obtained by capturing images of the same observation target at the same position on different imaging conditions (typically, exposure time of the imaging element). For example, a high-tone HDR image can be obtained by synthesizing a plurality of low-tone images which are captured as a dynamic range of a brightness region is changed. As one example, low-tone images with different exposure time as shown in FIGS. 18A and 18B are synthesized, to generate a high-tone HDR image as shown in FIG. 18C.

Further, as opposed to the above dynamic range extension photographing, it is also possible to perform photographing where a resolution is improved so as to allow display of a fine pattern in a narrow dynamic range. In the resolution improvement photographing mode, images with an imaging condition more finely changed are synthesized in a narrower dynamic range than that of the original image, thereby to obtain a synthetic image with its brightness resolution more improved than that of the original image. It is to be noted that the synthetic image obtained here is not literally an HDR image due to the dynamic range not being extended, but it is a high-tone image similar to the HDR image, and in the present specification, it is to be treated as included in the HDR image for convenience. Further, although the HDR image is used in the meaning that its dynamic range is wider than a dynamic range with which display is possible on the display section in the present specification, but it is not restrictive. The HDR image can also be treated as one that means an image with a wider dynamic range than a dynamic range with which imaging is possible by the imaging element of the imaging unit, or one that means an image provided with a specific bit number such as a bit number not smaller than 24 bit or not smaller than 32 bit.

(Depth Synthetic Image)

Further, as a synthetic image, this magnifying observation apparatus can also capture a depth synthetic image in addition to the HDR image by means of the synthetic image generating unit 85. A depth synthetic image is an image obtained in such a manner that, when a height difference of a measurement target portion of the target S goes beyond a depth of field, only focused portions are extracted and synthesized from observation images individually captured as made different from each other in the height direction as shown in FIGS. 19A to 19D. In the depth synthetic processing of generating a depth synthetic image, a plurality of still images are photographed while the z-position is moved, and regions in focus are synthesized, to synthesize an image in focus over the screen. In this case, several to several hundreds of images are required to be photographed depending on the photographing range in the z-direction and combination with another image synthesis processing (high dynamic range processing or below-mentioned super-resolution processing).

Figure 20:
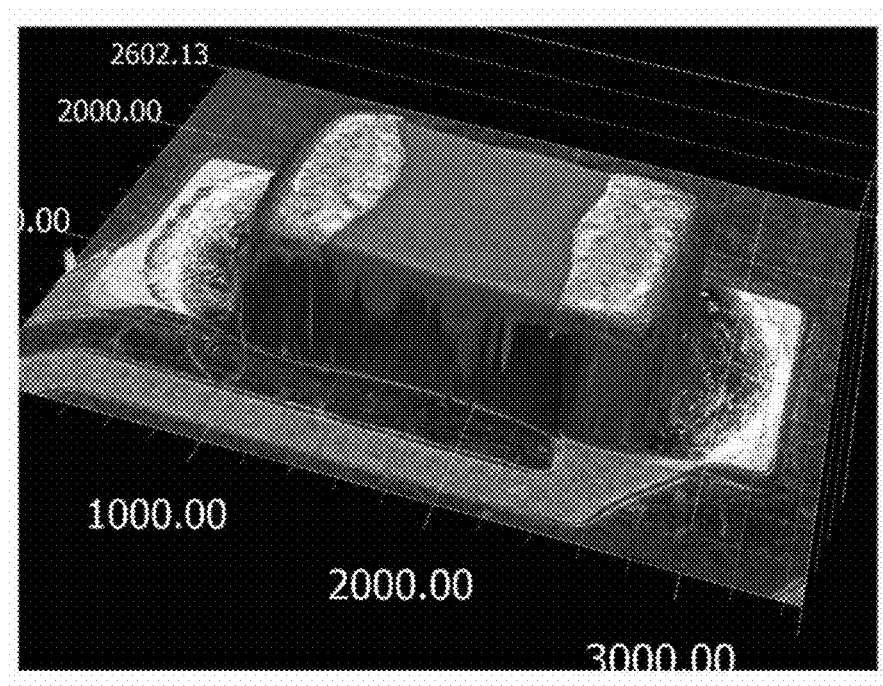
FIG. 20 is an image view showing a three-dimensional image.

Further, as another synthetic image that is synthesized in the synthetic image generating unit 85, a three-dimensional image, a high-resolution image by means of the pixel shifting function, a super-resolution image, automatic measurement processing or the like can also be used. The three-dimensional image is an image obtained by combining the depth synthetic processing with position information of the z-stage to estimate a height in focus (FIG. 20). Specifically, coordinate information of the z-axis movement mechanism (z-stage) is stored at the time of creating a depth synthetic image, and a three-dimensional image is generated by use of height information with respect to each pixel. Further, the high-resolution image by means of the pixel shifting function is obtained in such a manner that, in the imaging elements in the Bayer array as shown in FIG. 12, 4 positions of 2 rows×2 columns are shifted by 1 pixel to be moved, and images captured at the respective positions are combined. Herewith, it is possible to acquire RGB data at each pixel, so as to obtain a high-resolution image (FIG. 13) without performing Bayer interpolation. Further, by using the pixel shifting of sub-pixels at the same time, it is possible to acquire each RGB data while acquiring data between the pixels, so as to obtain a still higher-resolution image (FIG. 14). Moreover, the super-resolution image is an image formed in such a manner that brightness information is obtained by use of only a specific wavelength component by pixel-shifting photographing, to generate a high-resolution image free of an influence of lens aberration and an influence of a long wavelength component. As for this super-resolution image, a plurality of images are photographed by pixel-shifting photographing or the like, and an image prior to occurrence of blurring due to the lens is estimated based on a probability distribution model and a point spread function. Further, the automatic measurement processing is processing of automatically measuring an image by means of the pattern matching or the like, and synthesizing and displaying a measurement result such as the size on the image.

(One-Click Measurement Function)

Figure 21:
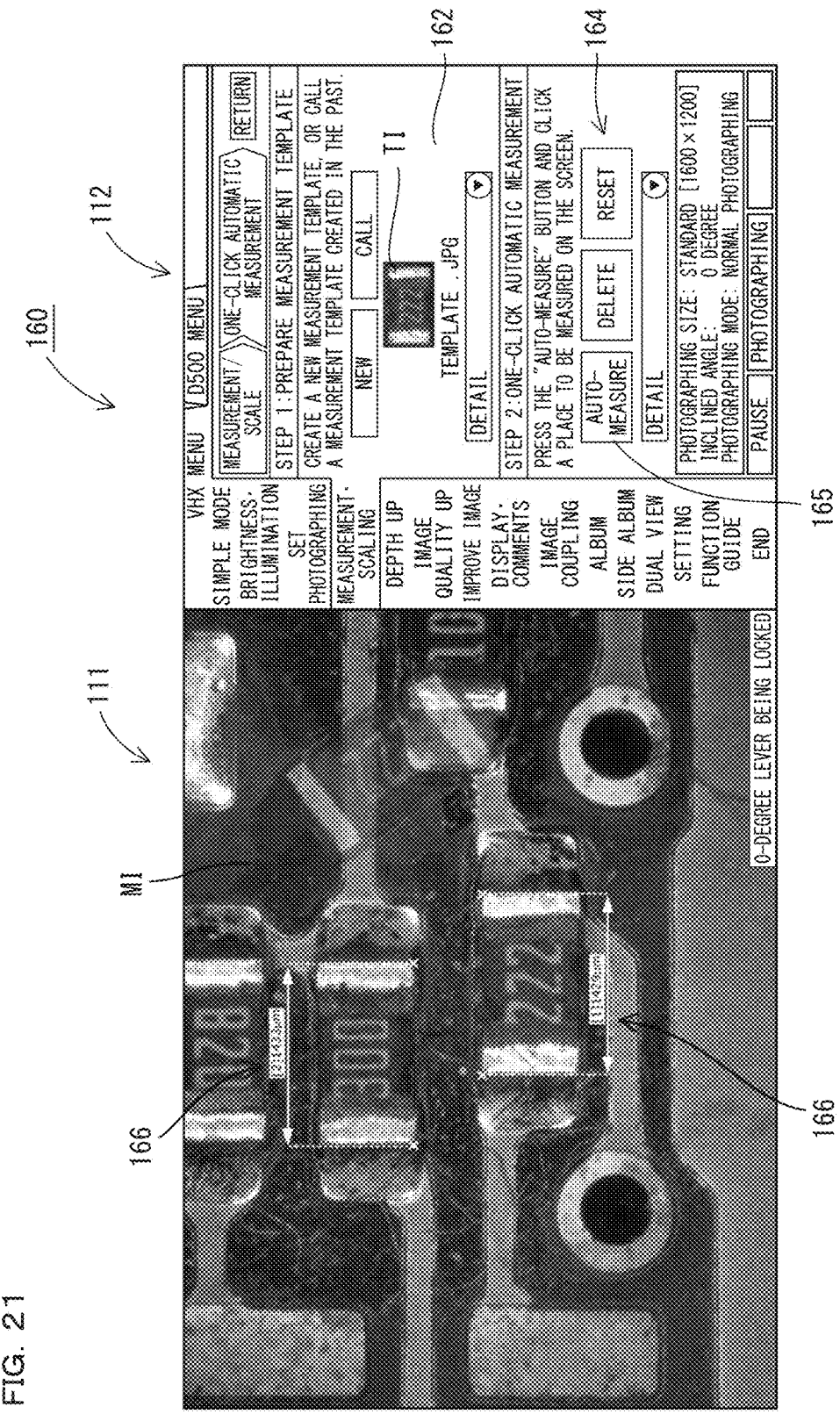
FIG. 21 is an image view showing a user interface screen of a measurement processing setting screen of the magnified image observing program.

Here, the measurement processing will be described. The measurement processing is processing of measuring a specified portion in a state where an image of a target for the measurement processing is displayed. The measurement processing includes manual measurement processing which is manually performed by the user, and automatic measurement processing which is automatically performed in accordance with a previously set manual measurement processing condition. The automatic measurement processing further includes one-click measurement which is performed by the user at the specified timing, and fully automatic measurement processing which is automatically executed at the timing when an image is inputted. Here, the one-click measurement function will be first described based on a user interface screen of the magnified image observing program of FIG. 21. FIG. 21 shows a user interface screen of a measurement processing setting screen 160 for setting the measurement processing. The one-click measurement function is a function in which the measurement processing is performed when a portion to be measured is specified (clicked) with a mouse or the like by the user on a measurement processing target image MI displayed in the display region 111 on the left side. On the screen of FIG. 21, first, there are specified an image used for the pattern matching to be executed on an input image and an item to be measured at the time of performing the measurement processing. Here, the image used for the pattern matching is specified as a measurement template image TI. In the example of FIG. 21, the measurement template image TI is set in the operation region 112. The set measurement template image TI is displayed in a measurement template setting field 162 in the operation region 112. Further, a portion to be measured and the type of measurement are specified with respect to this measurement template image TI.

Moreover, an input image to be a target for the measurement processing, namely the measurement processing target image MI, is displayed in the display region 111. In this state, when an "auto-measure" button 165 in a one-click automatic measurement setting field 164 provided on the middle stage of the operation region 112 is pressed and a place around the portion to be measured is clicked on the measurement processing target image MI, the pattern matching with the registered measurement template image TI is executed, and further, the same measurement as a measurement item set on this measurement template image TI is executed, a result of which is superimposed and displayed on the display region 111 as a measurement result display 166. In the example of FIG. 21, the length of a chip resistor included in the input image is specified as the measurement item and a situation, where the measurement processing has been executed on 2 of chip resistors displayed in the display region 111, is shown as 2 measurement result displays 166.

In the above one-click measurement function, the user needs to specify a region on the measurement processing target image, but the pattern matching may be automatically performed on a predetermined region with respect to the input image, and a result of executing the measurement processing may be displayed on the display section. Such fully automatic measurement processing is also included as one of the image processing. In the fully automatic measurement processing, at a stage where movement of the visual field stops, the pattern matching is performed inside the measurement processing target image, to extract a region with a high matching level, and a result of the automatic measurement is displayed on the display section (a detail will be described later).

Further, it is also possible to acquire a high-resolution color image by use of the image synthesizing unit 85b. When observation is performed by illumination light with a short wavelength, a high-resolution image can be obtained. By using blue illumination light through use of the above properties and also performing the pixel shifting, a high-resolution monochromatic image can be obtained. However, this image only has blue information and is not a full color image. Accordingly, by separately acquiring a full color image by use of white illumination light and superimposing color information (chromaticity, saturation) of the full color image on brightness information of the monochromatic image by the image synthesizing unit 85b, it is possible to obtain a high-resolution synthesized color image. That is, by capturing a monochrome high-resolution image by use of an imaging element capable of capturing illumination light with a short wavelength, specifically an imaging element for blue, out of the single-plate imaging elements, and synthesizing the captured image with a separately photographed color observation image, color information can be added to the high-resolution monochrome observation image, so as to obtain a color high-resolution observation image (brightness synthetic image).

(Display Mode Automatically Switching Function)

In the magnifying observation apparatus, after such a synthetic image is displayed, the visual field may be moved or the photographing condition may be changed for further capturing another synthetic image. In such a case, in a conventional practice, it is necessary to perform the forgoing visual field searching and imaging condition adjustment operation after a first display mode for displaying a still image of the synthetic image is once stopped and the mode is switched to a second display mode for displaying a moving image (a through image or a live picture) on the display section 52. This is because, when the mode remains to be the first display mode, updating of a display content on the display section 52 takes time due to long time being required for generation of one image, and this is not suitable for the visual field searching, thereby requiring switching of the image to a moving image with a high frame rate that can be drawn in a shorter time. Then, when the visual field and the imaging condition are adjusted in the second display mode with a high frame rate to complete setting of a state that allows imaging, this time, the mode is switched to the first display mode, and such operations as re-generation of a synthetic image and displaying of the obtained synthetic image are performed. In such a manner, in the conventional practice, the operation of manually switching the display mode on the display section from still image display to moving image display is needed every time, to cause a problem of the operation being complicated.

Accordingly, in the present embodiment, there is provided a display mode automatically switching function of automatically switching a screen displayed on the display section 52 to a live picture and displaying it upon detection of any operation (image changing operation) for changing an image such as movement of the visual field or changing the photographing condition in a state where a still image is displayed. Herewith, it is possible to keep displaying the live picture on the display section 52 during movement of the visual field or during the time until the photographing condition becomes stable. Then, upon stopping of the visual field and stabilization of the photographing condition, synthesis processing is automatically executed again, to display a synthetic image. That is, upon detection of stopping of the visual field or decision of the photographing condition, the display mode is automatically switched to the first display mode. With such a configuration, the user can save the time for switching the display mode on the display section from a still image to a moving image every time, and an operating environment with good usability is realized.

Figure 22A:
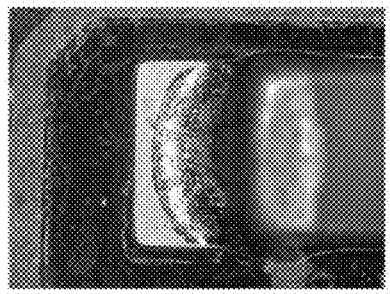
FIG. 22A is an image view showing an image before depth synthesis.
Figure 22B:
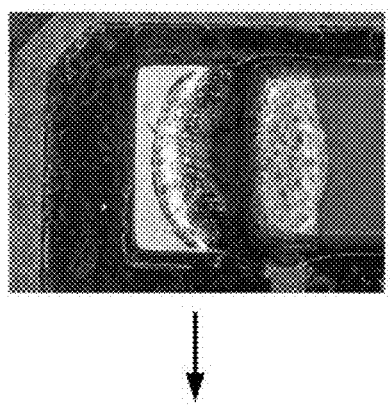
FIG. 22B is an image view showing the situation of displaying the depth synthetic image in a first display mode.
Figure 22C:
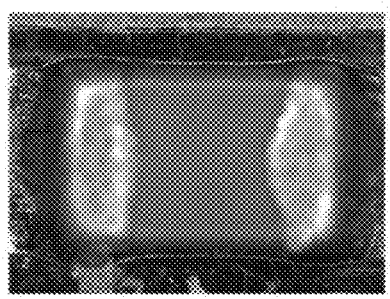
FIG. 22C is an image view showing a second display mode image.
Figure 22D:
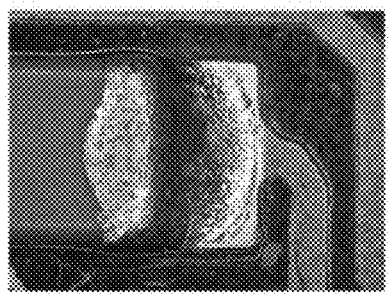
FIG. 22D is an image view showing a first display mode image.

For example, there is considered a state where a depth synthetic image as in FIG. 22B has been obtained by executing depth synthesis on an observation image as in FIG. 22A. At this time, a still image in the first display mode is displayed on the display section 52. When the visual field is moved from this state by the user operating a visual field moving unit (e.g. the xy-axis movement mechanism, the z-axis movement mechanism, etc.) in order to obtain a depth synthetic image in a next visual field, display on the display section 52 is automatically switched to a live picture in the second display mode as shown in FIG. 22C. When the user decides a desired visual field, the display mode is automatically switched to the first display mode, and depth synthesis processing is executed, to obtain a new depth synthetic image as shown in FIG. 22D.

(Display Mode Switching Unit 89e)

Here, the display mode switching unit 89e performs automatic switching between the second display mode and the first display mode on the display section 52. For example, switching from the first display mode to the second display mode is performed upon performance of an image changing operation in an image changing unit. Here, the image changing unit is a unit for accepting an image changing operation of making a change to an image acquired by the imaging unit in a state where a first display mode image subjected to the image processing in the first display mode is displayed on the display section 52. For example, at the stage of detecting an operation of moving the visual field, a display magnification, a relative height or the like performed by the visual field moving unit or at the stage of detecting an operation of adjusting image brightness, a shutter speed or the like performed by an image adjusting unit, the display mode switching unit 89e performs switching from the first display mode to the second display mode.

In contrast, switching from the second display mode to the first display mode is made at the point of completion of the image changing operation by the image changing unit. For example, immediately after movement of the visual field by the visual field moving unit or after a lapse of predetermined time (e.g., about several seconds), the completion is determined.

As thus described, by detecting the image changing operation of making some change to the image acquired by the imaging unit which is performed in the image changing unit including the visual field moving unit and the image adjusting unit, the display mode switching unit 89e automatically executes switching from the first display mode to the second display mode.

Further, switching to the second display mode may be performed not only during movement of the visual field, but the second display mode image may also be displayed during changing of the photographing condition. For example, during the time when the user is manually adjusting brightness of an image displayed on the display section 52 to appropriate brightness, the image is updated as a frame rate is increased as the second display mode, namely a live picture, and switching is thus performed to an image in accordance with a value adjusted in real time, thereby facilitating adjustment. Then, after completion of the adjustment operation, image processing such as synthesis processing is automatically executed, and hence the apparatus can be used without stress.

Here, examples of the photographing condition include adjustment of exposure time (brightness), a gain (brightness), illumination (a light amount and a way of applying light) and the like, and application of a variety of image processing such as edge enhancement, gamma correction and image filter processing. During the adjusting operation for each of these setting items and during execution of image processing, the mode is set to the second display mode, and at the stage of completing the user's adjustment, namely at the stage of stopping input or at the stage of completing execution of an image processing command, synthesis processing applied with these settings and image processing is executed in the image processing section.

(Display Mode Switching Operation)

Figure 23:
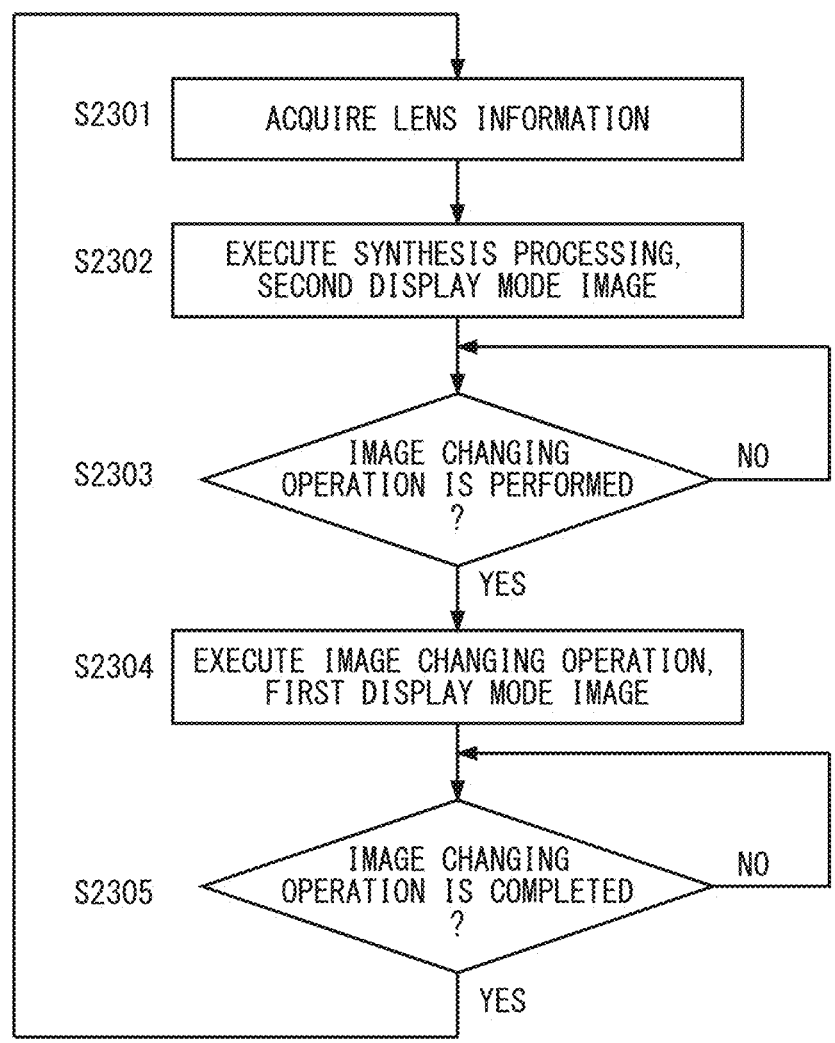
FIG. 23 is a flowchart showing a procedure for switching a display mode.

A procedure for the display mode switching operation by the display mode switching unit 89e will be described based on a flowchart of FIG. 23. First, in Step S2301, information of the microscope lens section 20 mounted in the camera section 10 is acquired. Examples of the information of the lens include the kind of lens and a magnification. This information is acquired by either automatic recognition or input from the user. In the case of the automatic recognition, lens identification information held on the microscope lens section 20 side can be acquired by being read by the body section through the camera section 10. In the case of the user input, the user inputs the type of mounted camera section 10, the attribute thereof or the like with the console or the magnified image observing program or the like.

Next, in Step S2302, the display mode on the display section 52 is set to the first display mode while synthesis processing is executed. Here, generation and display of the synthetic image are executed as the synthesis processing.

Specifically, based on the information of the microscope lens section 20 obtained in Step S2301, the control unit decides a movement amount and a movement speed of the lens, and acquires a plurality of images while changing a focus position by moving the lens, and the image synthesizing unit 85*b* executes the synthesis processing. Further, the display mode on the display section 52 automatically becomes the first display mode by the display mode switching unit 89*e*, and a synthetic image as a still image is displayed as the first display mode image.

Further, the processing further goes to Step S2303, and it is determined whether or not any image changing operation of changing the image has been performed. Here, it is determined whether or not a visual field moving operation has been performed by the image changing unit, for example, the visual field moving unit such as the xy-axis movement mechanism or the z-axis movement mechanism. When the image changing operation has not been performed, the processing returns to Step S2303 and is then repeated. On the other hand, when the image changing operation has been performed, the processing goes to Step S2304, and the display mode switching unit 89*e* switches the display mode from the first display mode to the second display mode, while executing the inputted image changing operation. For example, in the case of movement of the placement section, the display is switched from the still image to a live picture, and the user can check moving visual field by means of moving image, and follow changes in image in real time. Further, in Step S2305, it is determined whether or not execution of the image changing operation has been completed. Here, it is determined whether or not movement of the placement section has been completed, and when it has not been completed, the processing returns to Step S2305, and comes into a standby state. When the image changing operation is then completed, the processing returns to Step S2301 to repeat the above loop. It is to be noted that, when there is no change made in the microscope lens section, the processing may skip Step S2301 to go to Step S2302. In such a manner, by the display mode being automatically switched to the second display mode upon detection of the image changing operation and switched to the first display mode upon completion of the image changing operation, the user can perform an operation and observation with a suitable display content on the display section 52 without switching the display content, so as to improve the usability.

It should be noted that at the time of the synthesis processing in Step S2302, movement in the z-direction is not restricted to movement of the microscope lens section 20 by the upper stage lift 16, but the placement section may be moved by the lower stage lift 35. Further, a plurality of images may be acquired by changing a focus ring for focus adjustment provided in the microscope lens section 20 to change a focus position. Moreover, as for the movement amount and the movement speed of the microscope lens section 20, for example when the magnification of the lens is low, the movement amount is made large (a synthesis range is made wide), to make the movement speed high. Furthermore, when the depth of field is small, the movement amount is made small to make the movement speed low, and it is thereby possible to move the placement section such that portions in focus are located well in the z-direction in the respective images.

(Detection of Image Changing Operation)

As for detection of the image changing operation for performing switching from the first display mode to the second display mode such as a live picture, for example in the case of the visual field moving units such as the xy-axis movement mechanism and the z-axis movement mechanism being electrically operated, the display mode on the display section 52 is switched at the timing of the control section issuing a movement order of these units. Further, the display mode is switched from the second display mode to the first display mode upon detection of issuing of a stopping order of the foregoing visual field moving unit or notification of completion of movement in the display mode switching unit 89*e*, while the image processing such as depth synthesis is automatically executed. Alternatively, a sensor for detecting movement of the placement section can be provided the placement section and the mode can be set to the second display mode only during the time when the sensor is sensing the movement. By detecting movement in the xyz-directions and the θ-direction, the sensor can execute switching of the display mode in whichever direction the placement section moves.

Further, it is also possible to use a change in image for determination of the start and the end of the image changing operation as thus described. For example, the image processing section checks a degree of change in image by the image processing, and regards that the movement has been made when the degree of change in image goes beyond a certain value. In contrast, when the degree of change becomes smaller than the certain value, it is determined that the movement has been stopped. As a parameter for determining the degree of change in image, for example, there is used the amount of change in brightness between frames or the amount of movement of a characteristic point. When this method is used, a member relating to the image changing unit need not be electrically operated, but can be manually operated. For example, since it is not necessary to incorporate the motor and the sensor onto the x-y stage as the xy-axis movement mechanism, there can be obtained an advantage of reducing manufacturing cost and simplifying the configuration.

Further, the visual field moving operation includes not only movement of the visual field toward the xy-directions by the xy-axis movement mechanism described above, but also rotational movement toward the θ-direction by the rotational movement mechanism, movement toward the z-direction by the z-axis movement mechanism, adjustment of the focused position, enlargement/reduction of the visual field and adjustment of the magnification such as switching of the objective lens. Further, such a visual field moving operation also includes inclination of the head section 4 by the head inclining mechanism 44. For example, in the magnifying observation apparatus shown in FIG. 10, when an angle sensor is provided and an inclination operation by the head inclining mechanism 44 is detected, synthetic image generating processing can be executed while the display is switched to display in the second display mode (live image) during an inclination operation and to display in the first display mode (still image) after completion of the inclination.

(Autofocus Processing)

In autofocus processing on an image, photographing of a still image at a focused position is performed while the z-position is moved. In this case, photographing processing corresponding to a range for search in a height direction is required. Normally, a several tens of images are photographed at equal pitches and synthesized. The autofocus processing may be automatically executed in addition to being manually executed by the user by provision of a dedicated run button. For example, autofocusing is automatically executed in a state where movement of the visual field is stopped. It can be determined that movement of the visual field has been stopped when input of an operation signal from the visual field moving unit is stopped or when a change in image is detected and the amount of change becomes not larger than a predetermined value, or the like. For example, when an image of a live picture remains unchanged for a certain time (e.g., several seconds), it is determined that movement of the visual field has been stopped, and the autofocusing is executed. The display mode switching unit switches the display mode from the second display mode to the first display mode, and a still image in focus (autofocus image) can be displayed. Further, when the visual field moving unit is operated in this state, switching is performed from the first display mode to the second display mode, and display on the display section becomes the live picture, and the image is updated almost in real time so as to facilitate the visual field searching. When it is then stopped again, the autofocusing is automatically executed and an autofocus image is displayed. Herewith, since a still image in focus is always displayed in a state where the user has stopped movement of the visual field, it becomes easy to check a detail. Further, during movement of the visual field, the user only executes the visual field moving operation, the display mode on the display section is automatically switched from the still image to the moving image, and it is thus possible to check a situation of a change in visual field, so as to realize an observation environment with extremely good usability.

Moreover, in addition to the depth synthetic image as described above, the synthetic image synthesized in the synthetic image generating unit 85 can be an HDR image, a three-dimensional image having height information, a high-resolution image by means of the pixel shifting function, a super-resolution image, or the like. In the image synthesis processing of generating such a synthetic image, it is of necessity to capture a plurality of images and processing these. Since it thus takes certain time to generate a synthetic image, real time display is difficult, and generally, a synthetic image is displayed as a still image or displayed with its frame rate made extremely slow. However, it is inefficient to search a portion to be observed in the first display mode with a slow frame rate as thus described. Accordingly, it is configured such that, at the time of searching the visual field, namely at the time of the image changing operation being performed, display with a low load is possible and the display is thus performed in the second display mode capable of also improving the frame rate, and after decision of the visual field, switching is performed to the first display mode as described above.

However, in the present invention, the second display mode is not necessarily restricted to the live picture, but it may, for example, be updated display of a simple synthetic image obtained by simplifying the synthesis processing and generating a simple synthetic image that can be generated in a shorter time than normal synthesis processing so as to be updated at a certain level of frame rate. For example, during movement of the visual field or during changing of the photographing condition, although switching is performed to the second display mode, a live picture is not used and, while the image synthesis processing is performed in the second display mode, a simple synthetic image is synthesized by simplifying this synthesis processing itself, whereby it is possible to make the frame rate faster than that of a normal synthetic image and facilitate movement toward a target portion. As simple image processing executed in the first display mode in which such a simple synthetic image is displayed, it is possible to use image processing where the number of images photographed is reduced. For example, in the case of a simple depth synthetic image, a photographing pitch between images that serve as originals is set wide, and the number of images photographed which is necessary for synthesizing one simple depth synthetic image is reduced. Further, in the case of an HDR image, the number of images photographed can as well be reduced by setting a large difference in exposure time between original images. By reducing the number of images photographed which are necessary for image synthesis, it is possible to suppress a decrease in frame rate and facilitate searching of the target portion. By reducing the number of images photographed by this method, despite the quality of the simple synthetic image being slightly degraded, the image can be sufficiently used for the application of searching the target portion, and a more efficient operation can be performed by placing a higher priority on improvement in frame rate over the quality of the simple synthetic image.

Similarly, the first display mode is not necessarily restricted to a still image, but it can be a synthetic image with a slow frame rate. Observation like this can be used especially in such an application where the visual field is not frequently changed and such an application where even a large influence of an afterimage is not problematic. As thus described, in the present invention, the first display mode is not restricted to a still image subjected to image processing and the second display mode is not restricted to a live picture. It is sufficient just to make the frame rate of the second display mode faster than the frame rate of the first display mode, and in accordance with a balance between the image changing operation and the image processing, the frame rate in each display mode and the processing content can be appropriately adjusted based on an observation application or the like.

Further, although the image processing of generating a synthetic image in the image synthesizing unit has been described as the first display mode in the above example, the first display mode is not restricted to generation of a synthetic image, and it may be another image processing. Examples thereof include auto focusing, edge enhancement, storage processing for obtained image data, and fully automatic measurement processing on an image.

(Fully Automatic Measurement Processing)

In the fully automatic measurement processing, for example, a measurement position is previously specified with respect to a photographed image, teaching data is created which stores a partial image including the measurement position and a relative position of the measurement position to the partial image, and an attitude/position of a portion matching with the teaching data is specified from a new captured image, to execute measurement that is recorded in the teaching data. For example, at the time of previously acquiring a partial image including a measurement position as shown in FIG. 24A by means of the teaching data, the first display mode is set. Then, switching is performed to the second display mode (a live picture of FIG. 24B) during movement of the visual field, and the pattern matching is performed after the movement. At the time of automatically performing the measurement processing, switching is performed to the second display mode as shown in FIG. 24C. In such a manner, by stopping the automatic measurement processing during movement of the visual field and performing automatic measurement after decision of the visual field, the user can perform measurement only by the operation of moving the visual field without performing an on/off operation for automatic measurement every time, thus leading to realization of an environment excellent in operability. It is as described above that such measurement processing can also be executed on an inputted image at a position or timing specified by the user, in addition to being automatically performed.

As described above, according to the magnifying observation apparatus according to the present embodiment, after a synthetic image with a large depth of focus is once generated and displayed, the display content on the display section 52 is automatically switched to a live picture to be displayed upon detection of movement of the visual field. Herewith, the user searches a target portion while viewing the live picture, to determine the visual field. Subsequently, the depth synthesis processing is automatically performed upon sensing of completion of movement of the visual field, and a depth synthetic image is displayed. Herewith, the user can search the target portion by viewing the live picture with a fast frame rate, and can automatically observe the image with a large depth after determining the target portion, so as to save the time for turning on/off a synthesis mode and realize an efficient observation.

(Image Changing Operation Detecting Function)

Further, although the image changing operation such as the visual field moving operation is detected by the display mode switching unit, it can also be detected by another member. For example, a dedicated image changing operation detecting unit may be provided. Alternatively, a control unit configured by a general-purpose IC or the like can be made to detect the image changing operation. Moreover, the detection function for the image changing operation may have an on/off configuration. For example, while the image changing operation detecting function is on, automatic switching of the display mode by the display mode switching unit is valid, and when the image changing operation detecting function is turned off, the mode is switched to a manual switching mode in which the user manually switches a display content on the display section, as has hitherto been done.

In addition, although the display mode switching unit 89e is a unit for automatically switching the display content on the display section between the first display mode image and the second display mode image as described above, it goes without saying that, in addition to this, there can also be provided a unit for the user manually switching the display content on the display section.

Here, the switching from the second display mode to the first display mode and the image processing for obtaining the first display mode image are not necessarily required to be simultaneously performed. It may take a certain time especially to detect that the image changing operation such as the visual field moving operation has been performed, start the image processing for generating the first display mode image, actually generate the first display mode image and replace the display content on the display section with this image. For example, it takes several seconds to several tens of seconds to obtain a synthetic image due to the need for processing of capturing a plurality of images that serve as originals and then synthesizing the image. Therefore, the display content on the display section is actually updated at the timing when the second display mode is generated. In other words, it is not the timing when the image changing operation such as the visual field moving operation is detected, but is the timing later than this.

It is to be noted that switching of the display mode in the present specification basically means the timing when the display content on the display section switches between the first display mode image and the second display mode image, but as described above, even if the display content on the display section has not actually been switched yet, necessary image processing is being performed inside the magnifying observation apparatus. Hence it can also be grasped that the display mode has been switched at the time when the processing of the image processing section starts generating the first display mode image. For example, since the second display mode image may be able to be generated almost simultaneously with the start of the image processing depending on the image processing content, in this case, the start of the image processing in the image processing section and switching of the display content on the display section can be taken as practically the same.

(Suspension of Processing)

On the other hand, since there occurs the waiting time after performing the image changing operation such as the visual field moving operation by the user until the first display mode image is displayed, it can be considered that the user performs an operation again such as moving the visual field, changing a magnification or switching to inclined observation during the waiting time. In this case, however, if display on the display section is not switched to the second display mode until completion of the once specified image processing, the display is not updated during that time, and hence the user cannot check an observation image and is thus brought into an inconvenient situation.

Figure 25:
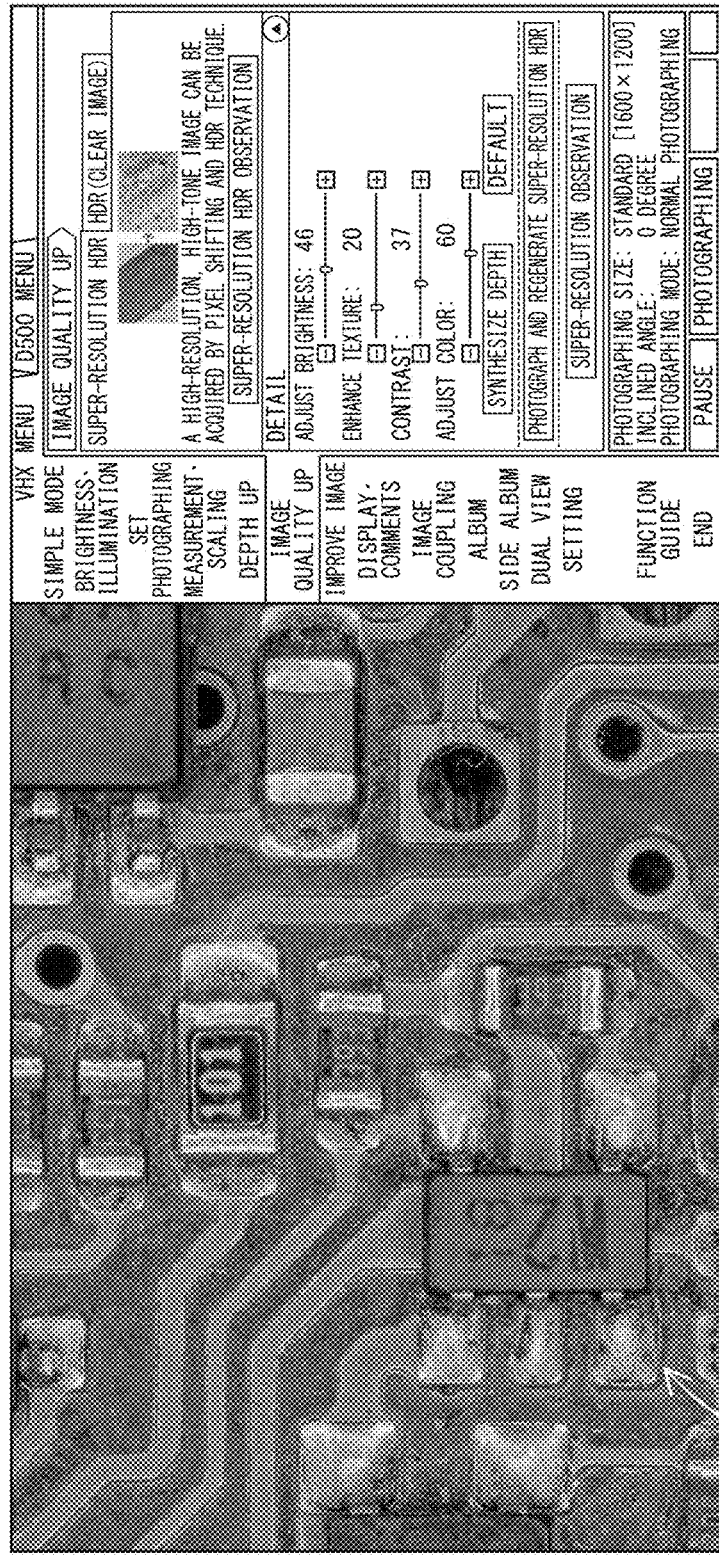
FIG. 25 is an image view showing a synthetic image captured by making an observation target stand still.
Figure 26:
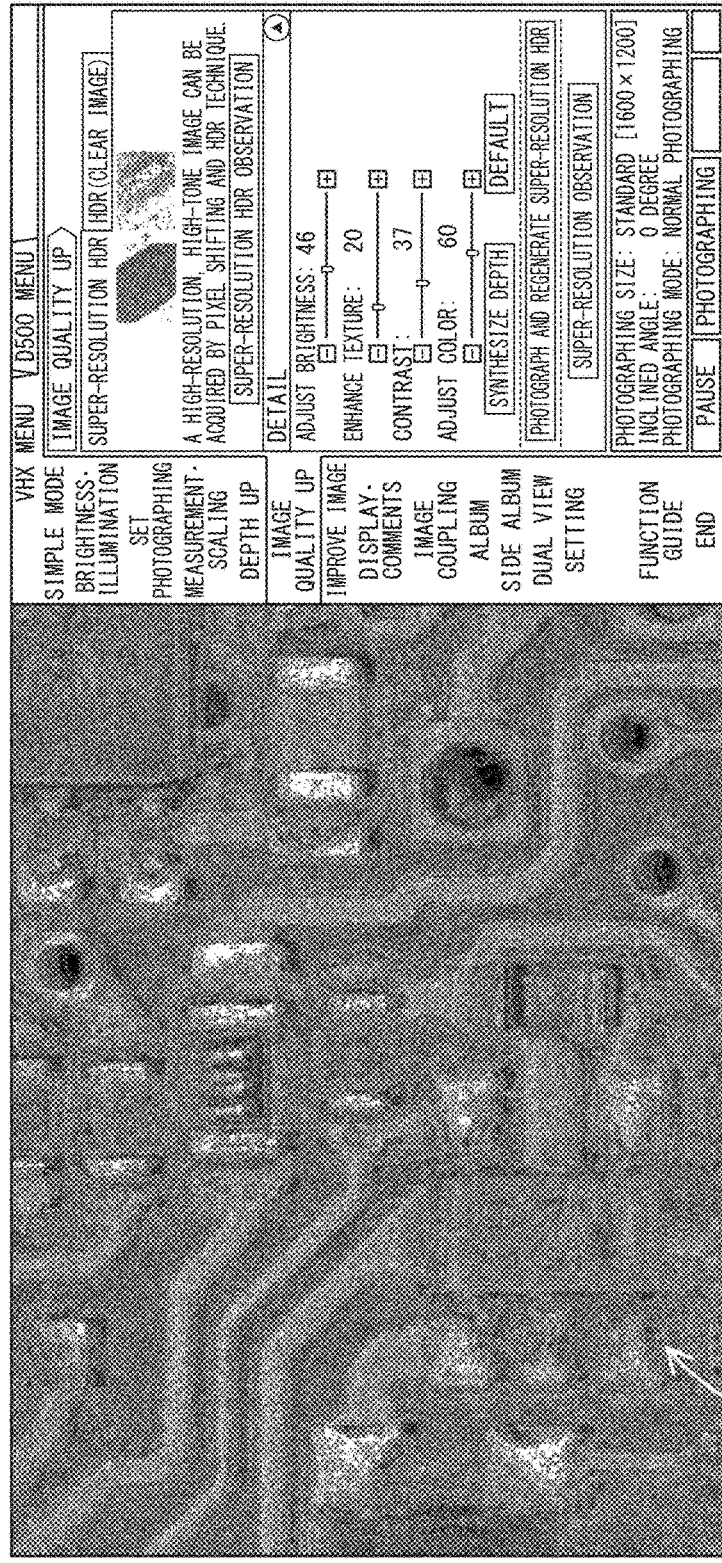
FIG. 26 is an image view showing a synthetic image obtained by capturing images while an x-y stage is moved.

On the other hand, it can also be considered that a synthetic image is successively photographed in each movement of the visual field and the visual field is searched while the synthetic image is displayed as it is. However, since photographing a plurality of still images is generally required for generation of a synthetic image, synthesis takes time to cause a delay in display. Further, when a synthetic image is forcefully generated in a state where an image being photographed is not standing still, the obtained image may be brokenly displayed. For example, in an example of displaying a live picture of successively performing photographing of a synthetic image, which is a combination of 3CCD imaging by means of the pixel shifting and the high dynamic range processing, and which generates a synthetic image from not less than 10 images, FIG. 25 shows a synthetic image CI1 obtained by capturing images while the observation target is made to stand still, and FIG. 26 shows a synthetic image CI2 obtained by capturing images while the x-y stage is moved. As thus described, it is difficult to construct an accurate image by display of a synthetic image while it is moved. Further, a delay in display as described above cannot be ignored, and hence it is significantly inconvenient for performing a positioning operation.

Accordingly, in the present embodiment, even during performance of the image processing in the first display mode, when the image changing operation such as the visual field moving operation is newly inputted, the display mode switching unit can suspend the image processing and display the second display mode image. Herewith, the user can promptly check a desired image while no extra waiting time occurs, leading to realization of an observation environment with good usability.

(Procedure for Suspension Processing)

Figure 27:
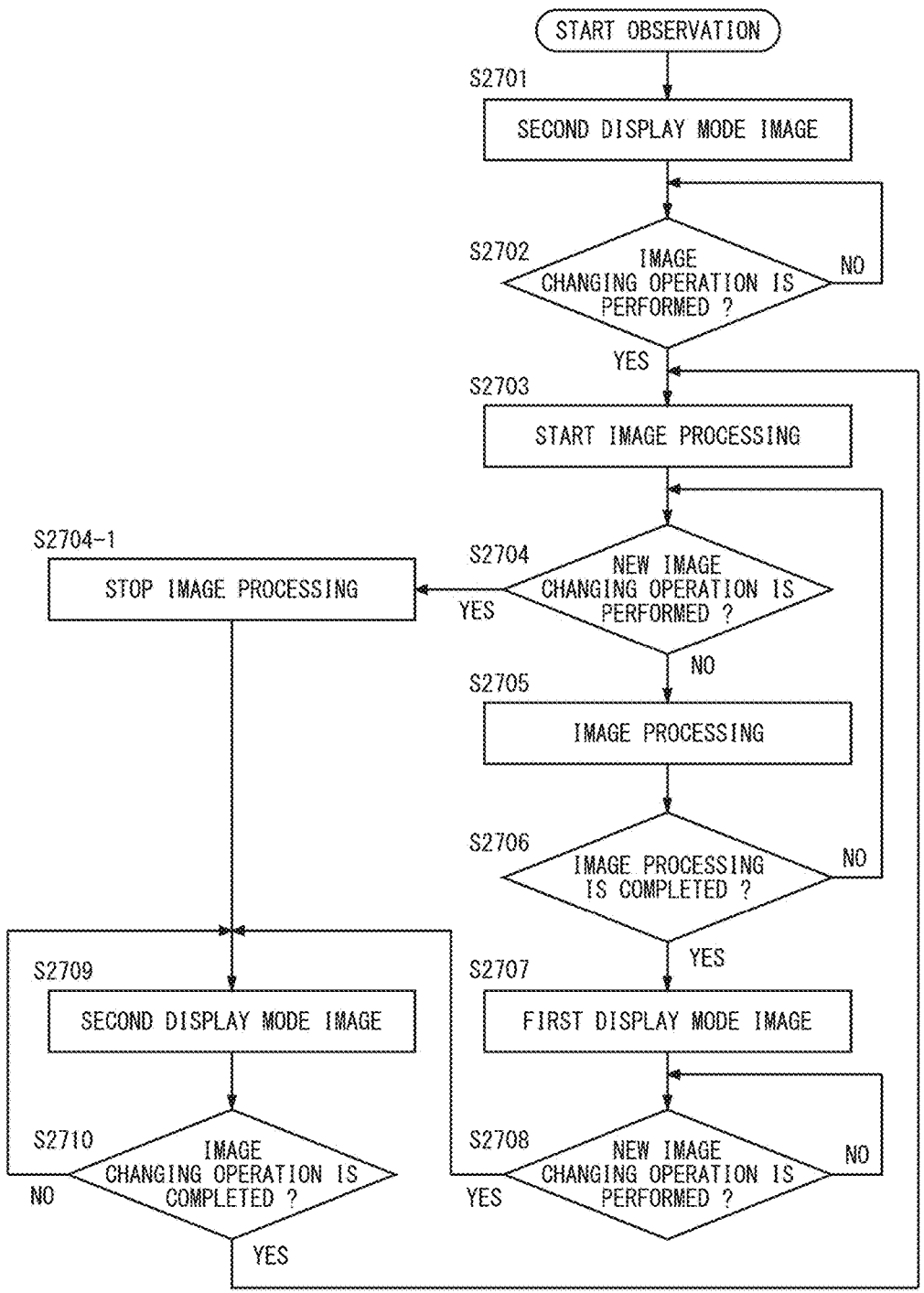
FIG. 27 is a flowchart showing a procedure for switching a display mode, including suspension processing.

A procedure for switching the display mode including the suspension processing as above will be described based on a flowchart of FIG. 27. First in a state where observation is started, in Step S2701, it is assumed that the second display mode image is displayed. In this state, in Step S2702, it is determined whether or not the image changing operation such as the visual field moving operation has been detected. When it is not detected, the processing returns to Step S2702 and is then repeated. On the other hand, when the image changing operation such as movement of the visual field is detected, the processing goes to Step S2703, and the image processing is started in the image processing unit. For example when the image processing is image synthesis processing, images required for generation of a synthetic image are captured. Meanwhile, in Step S2704, it is determined whether or not a new image changing operation has been detected.

When the image changing operation is detected, the processing jumps to Step S2704-1, to stop the current image processing, and the processing also goes to Step S2709 to display the second display mode image. For example, when the x-y stage is moved by the user during generation of a synthetic image, the display section is immediately changed to a live picture, and it becomes possible to check the image during the movement.

On the other hand, when the image changing operation is not detected, the processing goes to Step S2705, to continue the image processing. For example in the case of the image synthesis, images that serve as originals continue to be photographed. Then in Step S2706, it is determined whether or not the expected image processing has been completed. In the case of the image synthesis, it is determined whether or not all images necessary for the image synthesis have been photographed, and when they have not, the processing returns to Step S2704 and the foregoing processing is repeated. That is, images continue to be captured while it is checked whether or not a new image changing operation is detected. Upon completion of the expected image processing as above by acquirement of all necessary images and completion of generation of a synthetic image as thus described, the processing goes to Step S2707, to switch the display mode to the first display mode and display the first display mode image. In next Step S2708, it is determined whether or not a new image changing operation has been detected, and when it is not detected, the processing returns to Step S2708, to continue to display the first display mode image. When it is detected, the processing goes to Step S2709, to perform switching to the second display mode and display the second display mode image. Further, in Step S2710, it is detected whether or not the image changing operation has been completed, and when it has not been completed, the processing returns to Step S2709 and is then repeated, and on the other hand when completion is detected, the processing returns to Step S2703, to start the image processing. A similar operation is repeated in such a manner, and while the display mode is appropriately switched, when a new image changing operation is performed during the image processing, it is possible to suspend the image processing and perform switching to the second display mode image, so as to prevent the user from being forced to have the waiting time for switching of the image, thus allowing enhancement in responsiveness.

Figure 28:
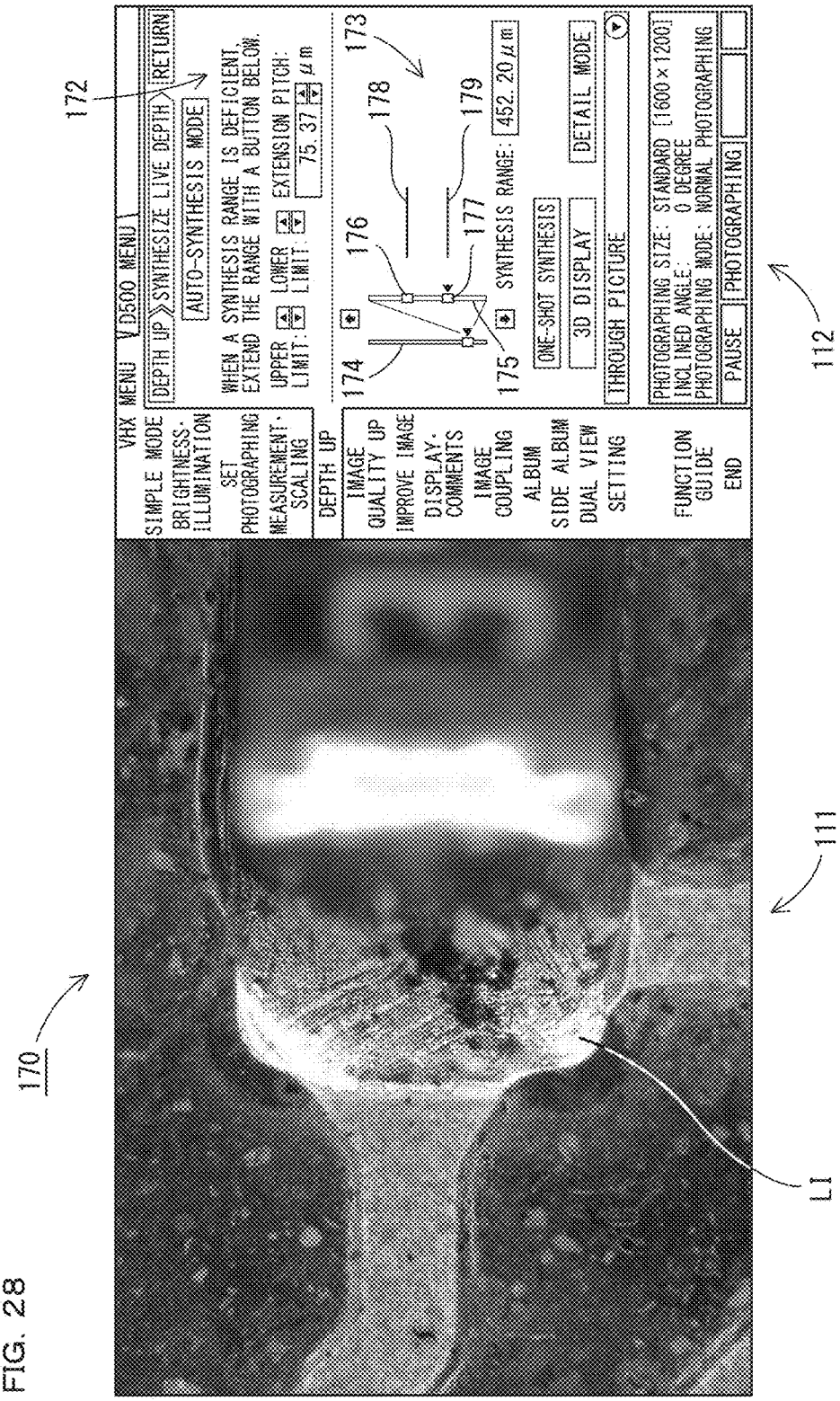
FIG. 28 is an image view showing a live picture in the second display mode.
Figure 29:
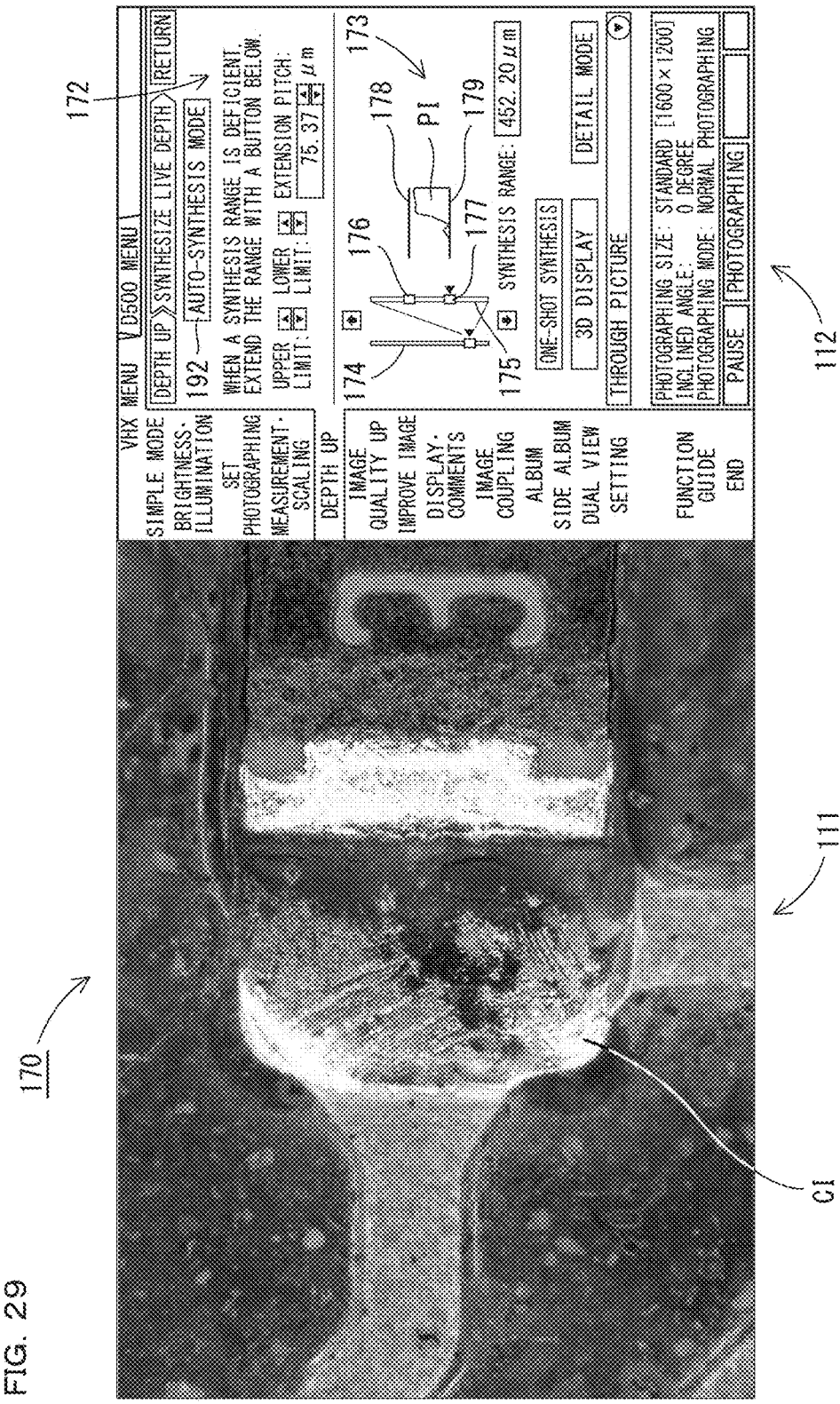
FIG. 29 is an image view showing a synthetic image in the first display mode.

Herewith, for example when the placement section is standing still, a synthetic image can be displayed, and when movement of the placement section is detected, the display can be switched to a live picture display suitable for this movement. When the placement section stands still again, generation of a synthetic image can be started again to photograph necessary images, and the display can be changed to the synthetic image. In such a manner, the display method on the display section is appropriately changed in accordance with the user's operation, thereby facilitating the user to grasp movement of the placement section at the time of moving it, and to perform the positioning operation for photographing of a synthetic image to be observed. As described above, it has hitherto been necessary for the user to manually perform the operation of switching display on the display section by means of the input unit or the like in order to photograph a synthetic image and display a still image or to display a moving image for the visual field searching or the positioning. For example in observation at a high magnification, with the visual field being in a narrow state, an operation of moving the placement section and executing the image synthesis is repeated in order to perform the positioning. For example, FIG. 28 shows a live picture LI in the second display mode, and FIG. 29 shows a synthetic image CI in the first display mode. As shown in FIG. 28, in the live picture LI, it is difficult to bring the whole picture into focus, and a detail cannot be checked. In order to check an image in focus in a wide range, a synthetic image CI as shown in FIG. 29 is relied on. Nevertheless, since a synthetic image is a still image, in such positioning and visual field searching, it is of necessity to repeat the operation of switching the display on the display section between the moving image (FIG. 28) and the still image (FIG. 29) in each movement of the visual field, and much time has been taken. In contrast, in the present embodiment, with the operation of changing an image taken as a trigger, the display mode on the display section is switched from a still image to a moving image, and with the operation of recognizing completion of the image changing operation further taken as a trigger, the display mode is returned to the still image, whereby labor for such switching is saved to realize seamless switching of the display mode. Consequently, appropriate switching of the display mode facilitates the user to grasp movement of the observation target during its movement, and facilitates the user to perform the positioning for photographing a synthetic image to be used as the measurement method, thus leading to realization of an observation environment with extremely good usability.

(Nonsynchronous Synthesis Function)

In the present embodiment, the upper stage lift 16 is electrically operated, and is made vertically controllable by the control section. For example at the time of generating a depth synthetic image, the upper stage lift 16 is operated by the control section via the head-side control section 13, to change the position of the microscope lens section 20 in the z-axis direction and capture an image. An image, thereby captured at each different height, is synthesized into a depth synthetic image by the image synthesizing unit 85b. There has hitherto been performed serial control at the time of generation of a synthetic image, in which movement in the z-axis direction is once performed to repeat the operation of photographing an image, and after all images are obtained, they are synthesized into a depth synthetic image by the image synthesizing unit 85b. With this method, however, since the imaging and the processing incrementally take time, it takes a long to obtain a depth synthetic image.

Accordingly, in the present embodiment, the imaging and the image synthesis processing are asynchronously performed, and both are performed in parallel and simultaneously, to reduce the total processing time. Especially with the recent improvement in performance of hardware, the upper stage lift 16 is set as an electric z-upper stage capable of high-speed z-axis movement, and a large-capacity buffer capable of storing a large amount of image data is provided, thereby reducing the imaging time and eliminating the need for waiting during the image processing until completion of the image acquiring processing, and it is thus possible to greatly reduce the total processing time along with an increased speed of each processing.

Figure 36:
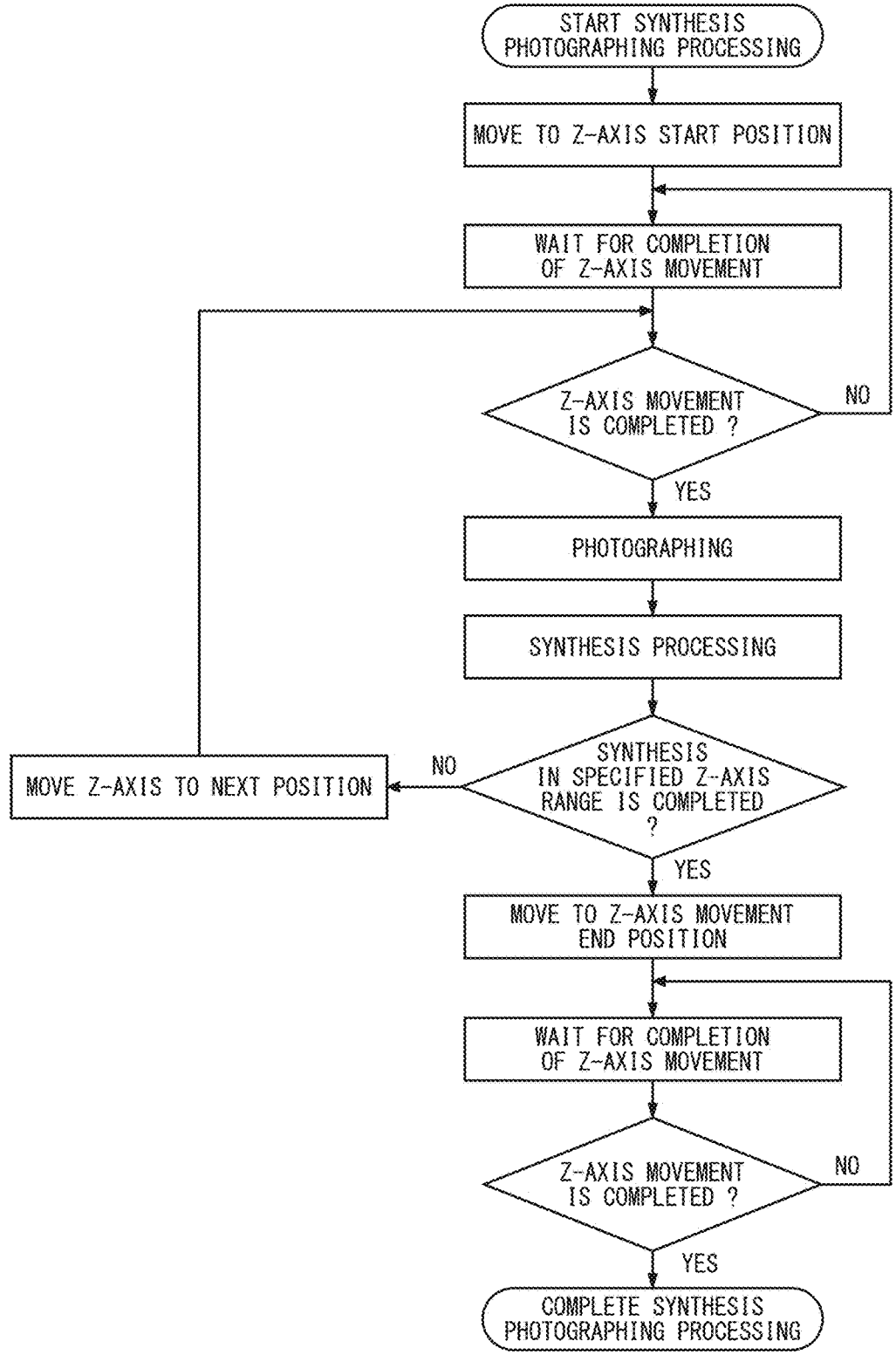
FIG. 36 is a flowchart showing a conventional procedure for synthesizing a depth synthetic image.
Figure 37:
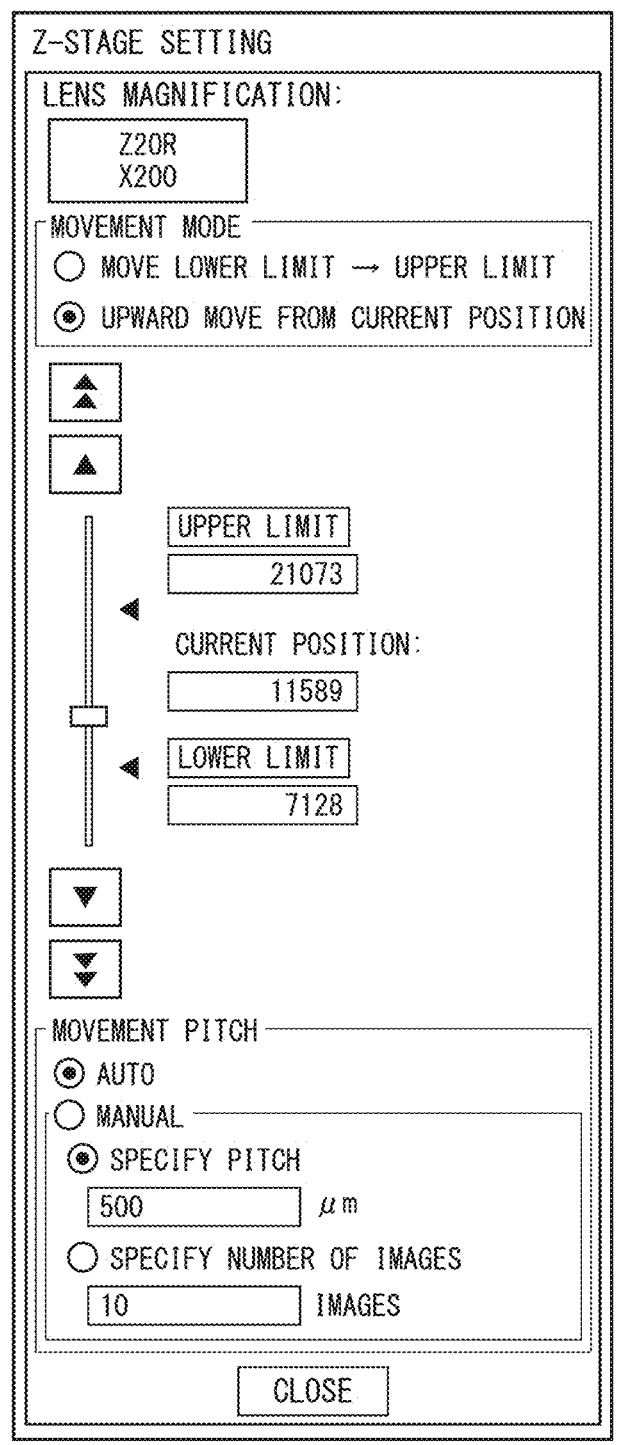
FIG. 37 is an image view showing an imaging condition setting screen for specifying a height range at the time of generating a synthetic image.

Further, when the time required for generation of a synthesis image becomes shorter, the time required for the user setting an imaging condition for performing the image synthesis processing then becomes problematic. That is, as shown in FIGS. 36 and 37, it has been necessary to specify a height range for capturing an image in order to generate a synthetic image. With this method, the synthesis processing is executed after an appropriate condition setting for the upper limit and the lower limit of the height range is performed by the user, and hence the time when the user is performing such an imaging condition setting occupies most of the time taken until completion of the processing. The actual synthesis photographing processing takes extremely a shorter time (several seconds) as compared to the time required for the setting, bringing about a situation where the ability for the high-speed synthesis processing cannot be made use of.

Accordingly, in the present embodiment, there has been adopted a method where the user does not previously set the upper and lower limits of the height range, but a default value (a predetermined value) of the height range is set based on lens identification information of the currently mounted microscope lens section 20. With this default value, the image synthesis processing is once performed, to display a synthetic image, and when the obtained synthetic image is not sufficient for the observation purpose, the height range is finely adjusted. With this method, in many cases, the image synthesis is completed at a high speed and a desired synthetic image can be acquired without the user performing any setting. Further, even in a case where the height range setting is excessive or deficient, such as a case where a pixel out of focus is found, it is possible to adjust the height range while checking a result of the already acquired synthetic image, so as to easily adjust the height range as compared to the case of performing a setting in the state of having no information, and obtain an advantage of easy handling even for a beginner user (FIG. 29).

It goes without saying that in a case where the user is proficient in setting the height range or some other case, the user can directly set the upper and lower limits of the height range, as has hitherto been done, without using a predetermined value of the height range (FIG. 28).

(High-Speed Synthesis Photographing Processing)

Figure 38:
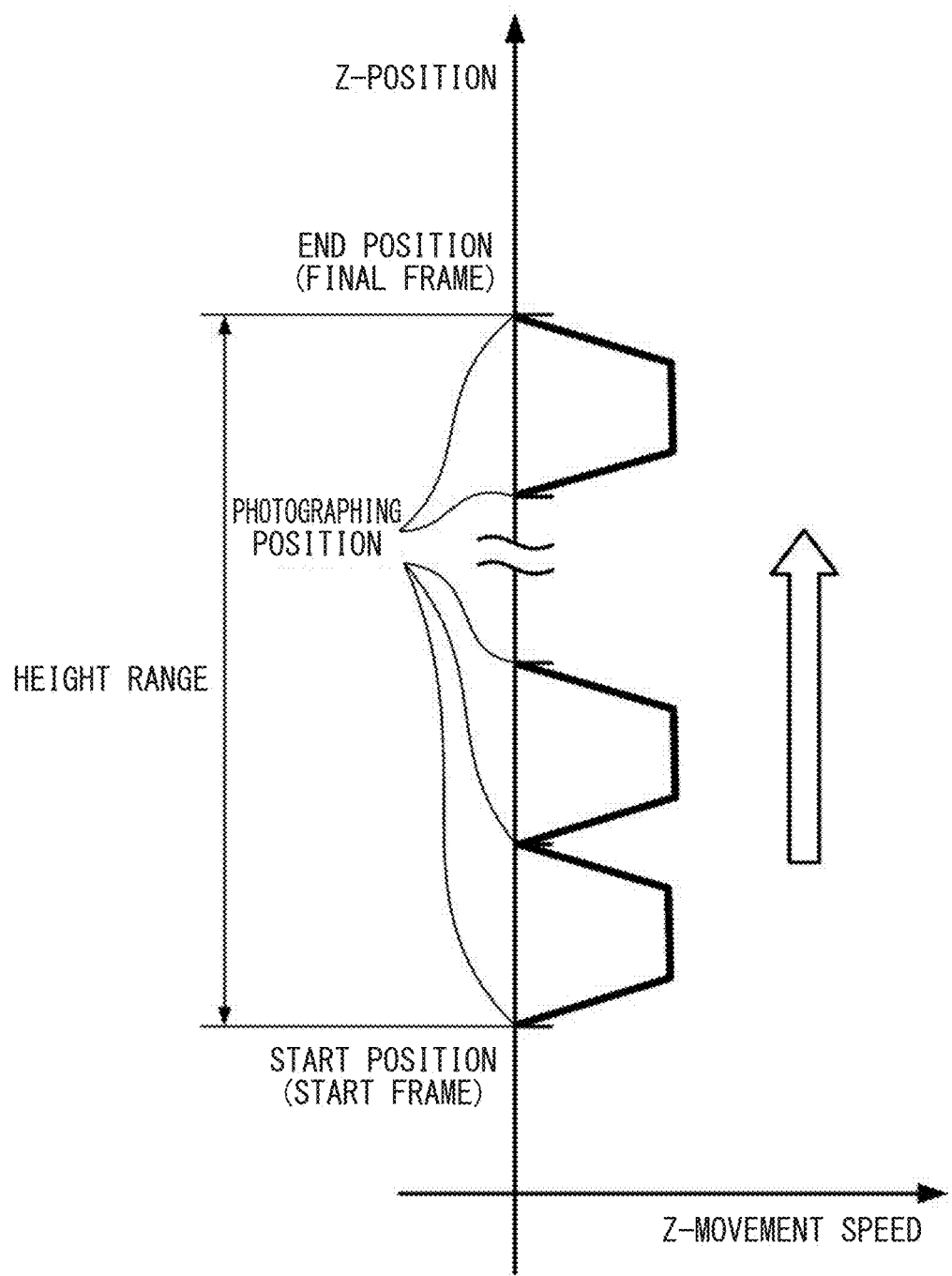
FIG. 38 is a schematic view showing a movement speed and the position of a conventional microscope lens section in the z-axis direction.

In order to capture images with different heights by the camera section 10 asynchronously with the image synthesis processing by the image synthesizing unit 85b, images are captured by the camera section 10 while the microscope lens section 20 is moved by the upper stage lift 16 that is electrically operated. By setting a shutter speed of the camera section 10 high, the camera section 10 captures images with small blurring. Further, it is desirable to make the upper stage lift 16 movable at a fixed speed in the z-axis direction. In the conventional photographing method, as shown in FIG. 38, the microscope lens section is stopped and an image is captured in order to capture an image at each photographing position obtained by dividing the height range at equal intervals. In order to move the microscope lens section by the upper stage lift, there are required an acceleration period when the speed increases from the stopping state to a certain speed and a deceleration period from the fixed speed to stopping, whereby it takes extra time in each movement of the microscope lens section from the stopping state and in each stopping from the moving state, and besides, control of the upper stage lift 16 is complicated.

Figure 30:
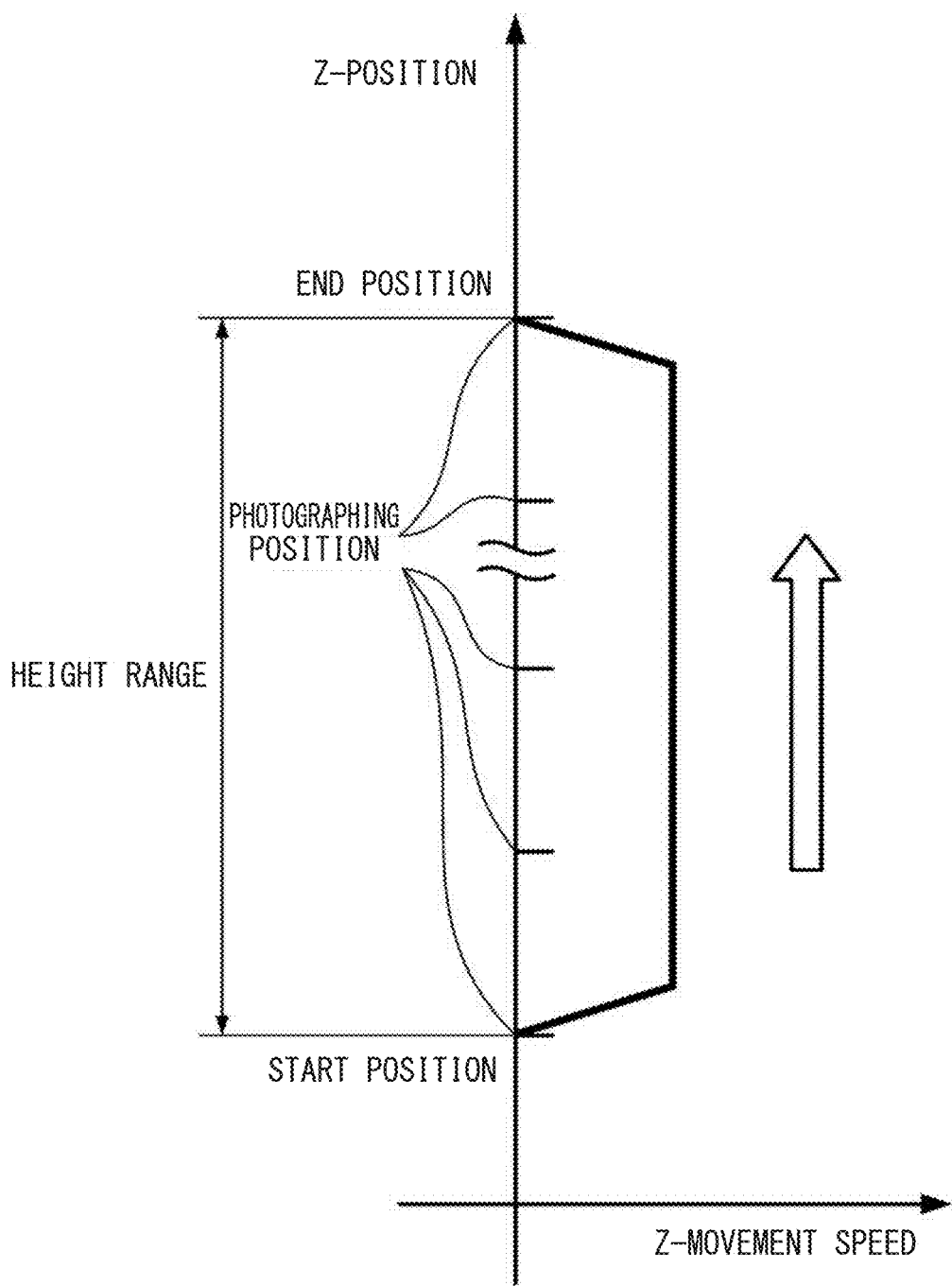
FIG. 30 is a schematic view showing a movement speed and the position of a microscope lens section in a z-axis direction according to the embodiment.

As compared to such an operation, in the present embodiment, as shown in FIG. 30, since an image can be captured at each photographing position while the microscope lens section 20 is moved at a fixed speed, the acceleration period and the deceleration period of the microscope lens section 20 are sufficiently provided only as the first and final periods, thus leading to reduction in time required for the whole movement and allowing simplified control for the movement.

It should be noted that in the example of FIG. 30, the microscope lens section 20 is moved in the height range, from the lower limit position toward the upper limit position. This is because, by moving the microscope lens section 20 in a direction in which it gets farther from the observation target, it is possible to reduce a risk of the tip of the microscope lens section 20 coming into contact with the observation target. However, it is also possible to move the lens reversely from the top to the bottom.

As thus described, photographing is performed at equal intervals while the upper stage lift 16 moves the microscope lens section 20 in the z-axis direction at a fixed speed, so that photographing is performed while the microscope lens section 20 is moved in the z-axis direction without being stopped in each photographing. When all the photographing is performed at a fixed speed, photographing can be executed by a fixed frame-rate camera at equal intervals. However, since the acceleration and deceleration need to be performed at the upper limit and the lower limit of the height range, the frame rate needs to be adjusted (lowered) in these portions.

(Upper Limit)

Figure 31:
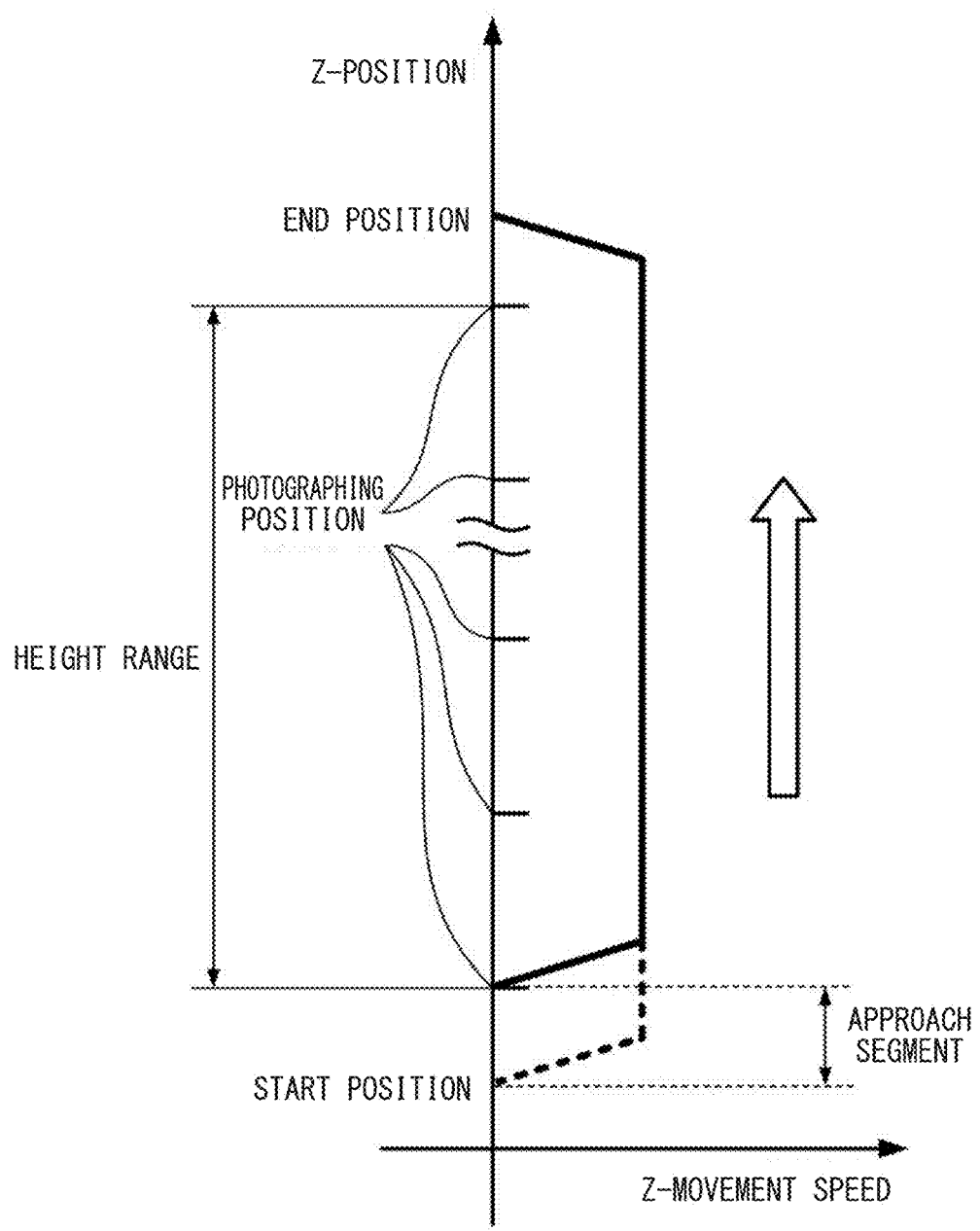
FIG. 31 is a schematic view showing a movement speed and the position of the microscope lens section in the z-axis direction according to another embodiment.

Accordingly, as shown in a modified example of FIG. 31, at a limit position on the side of decelerating the microscope lens section 20, which is the upper limit of the height range in this example, the microscope lens section 20 is intentionally not stopped but continues to be moved at the fixed speed beyond the upper limit, whereby even at the upper limit, an image can be captured on the same condition, namely at the same frame rate, as at the other photographing positions. In particular, since the imaging itself is completed at the upper-limit photographing position, movement of the microscope lens section 20 itself does not cause a delay in processing. After the microscope lens section 20 is moved to a higher position than the upper limit position, it is decelerated and stopped.

(Additional Image)

Further, also in a range beyond the upper limit of the height range, an image can still be continued to be captured. For example, as shown in a modified example of FIG. 32, additional photographing positions are set in the range beyond the upper limit of the height range, to capture an additional image at each additional photographing position. These obtained additional images can also be used for generation of a synthetic image. At this time, the additional images are not unconditionally incorporated into the synthetic image, but they are discriminated such that only an image that achieves quality beyond a predetermined reference value is incorporated. In such a manner, only when an additional image significant for image synthesis has been obtained, this additional image is used to allow higher-resolution image synthesis. The reference for determining whether or not to adopt an additional image is, for example, whether or not the number of pixels in focus out of pixels included in an additional image goes beyond a predetermined threshold. For example, when the setting for the upper limit of the height range is low, there can be obtained a synthetic image where the number of focused positions is increased by an additional image. On the other hand, when an additional image does not have significant data, for example when a region in focus is not included therein, this is not used for image synthesis so as not to have an adverse effect on the synthetic image processing. In such a manner, by using movement of the microscope lens section 20 beyond the set height range, it is possible to capture an extra image, so as to contribute to further improvement in quality of a synthetic image. In particular, since the image processing generally takes longer than the imaging processing, by use of that time difference, an additional image is acquired and it is further determined whether or not the additional image is used, thus allowing efficient improvement in quality of a synthetic image. A detail of such an additional image acquirement function will be described later.

Figure 32:
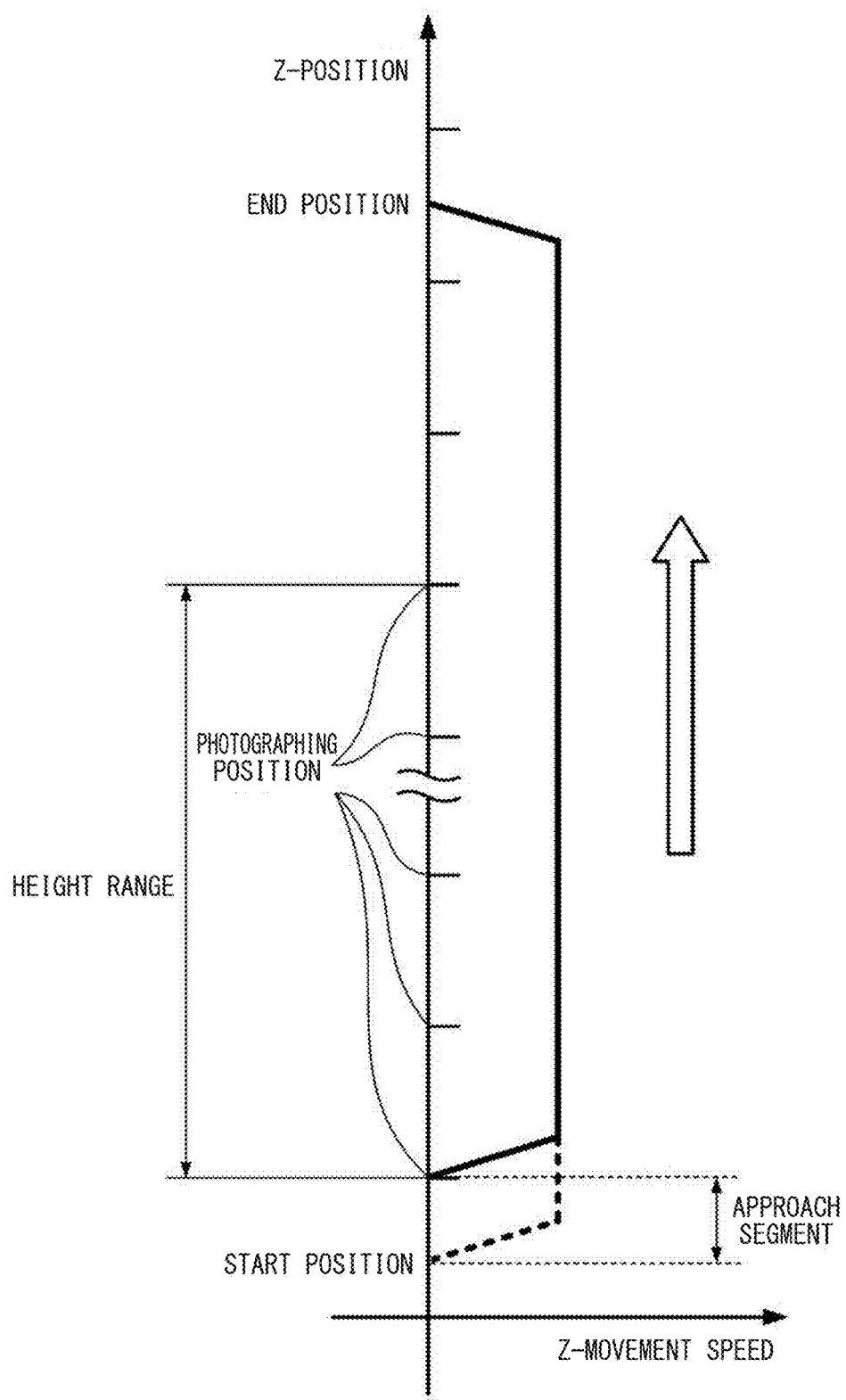
FIG. 32 is a schematic view showing a movement speed and the position of the microscope lens section in the z-axis direction according to still another embodiment.

It is to be noted that, although the photographing positions of additional images are set at the same pitch as for the photographing positions at equal intervals set in the height range in the example of FIG. 32, a different pitch (e.g., narrower pitch) can also be set for additional images. Herewith, it is possible to acquire a larger number of additional images while controlling an extra movement range of the microscope lens section 20, so as to contribute to improvement in quality of a synthetic image.

(Photographing at Lower Limit Position)

On the other hand, in photographing at the lower limit position, in order to perform photographing on the same condition as that for the other photographing positions, the microscope lens section 20 is once moved to a position lower than the lower limit photographing position, namely the movement start position, to provide an approach segment, and the movement is started, whereby at the lower limit position, the microscope lens section 20 comes into a fixed-speed moving state as shown by dotted lines in FIG. 31. With this method, however, it is necessary to once turn the microscope lens section 20 in the opposite direction to the moving direction, and it thus takes extra time for movement in the opposite direction, deceleration, stopping and starting of movement in the opposite direction. Accordingly, it is also possible not to adopt such movement on the side of the movement start position (at the lower limit position in this example) of the microscope lens section 20, but to simultaneously start movement from the start position and imaging. With this method, it is possible to avoid a loss of the imaging time, so as to make the processing speed high. However, since photographing is not performed at equal intervals up to a frame where acceleration of the microscope lens section 20 is completed, it is desirable to appropriately correct this portion.

In order to move the microscope lens section 20 at a fixed speed and perform photographing while asynchronously performing the synthesis processing as described above, a high-speed storage apparatus with a large-capacity buffer is required. This can be realized at reasonable cost due to recent improvement in performance of hardware. Sequentially processing images previously captured and stored into the buffer eliminates the need for waiting for completion of the movement in the z-axis direction, as has hitherto been done, and it is thus possible to fully allocate a processing ability of the control section to the synthesis processing. Further, to perform photographing at an increased imaging frame rate by applying a high-speed imaging sensor to the camera section 10 also contributes to a higher speed.

(Procedure for High-Speed Synthetic Image Photographing)

Figure 33:
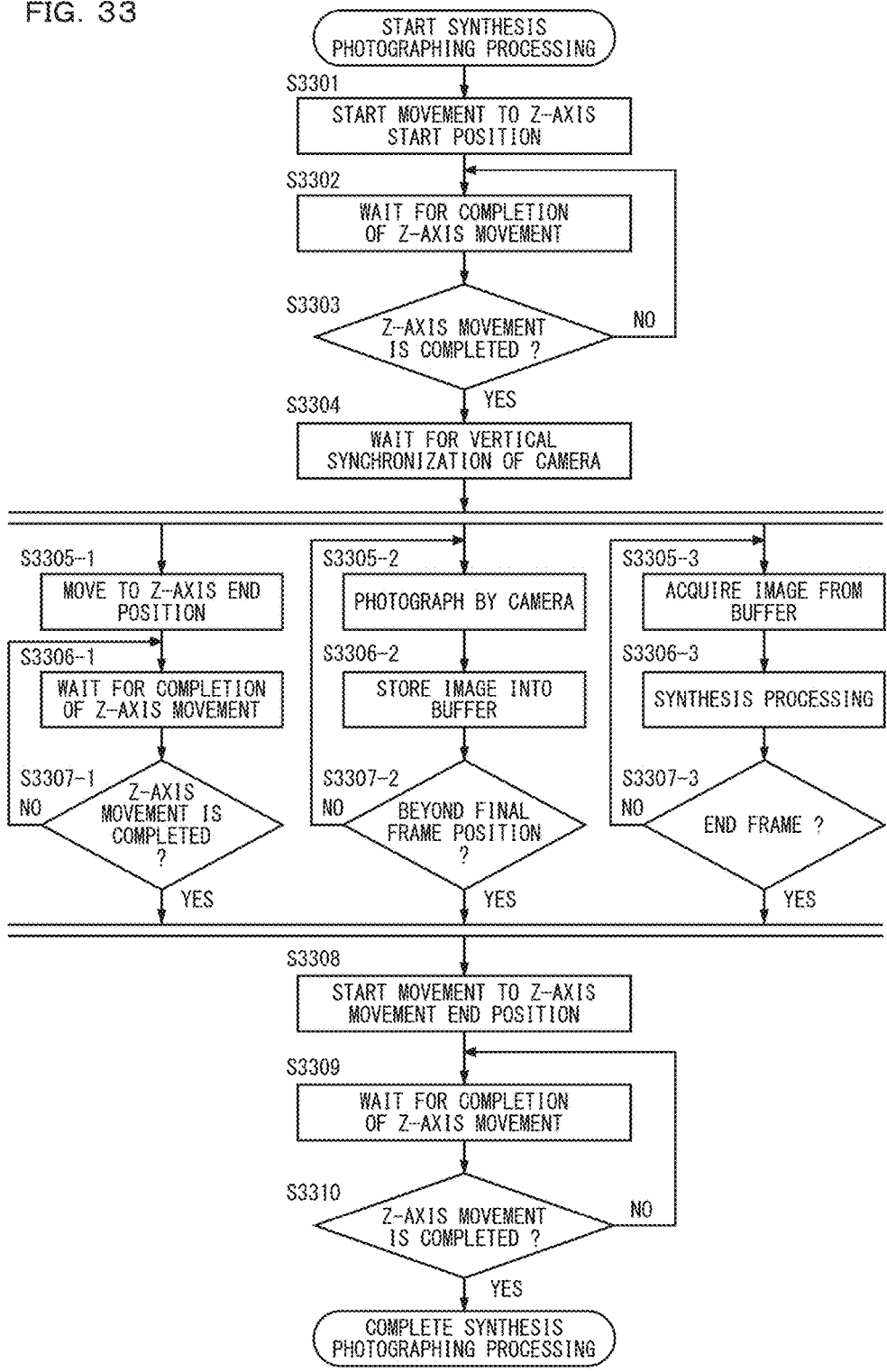
FIG. 33 is a flowchart showing a procedure for high-speed synthetic image photographing processing.

A procedure for high-speed synthetic image photographing processing as above will be described based on a flowchart of FIG. 33. When the synthetic imaging processing is started, first in Step S3301, movement of the microscope lens section 20 is started such that it is moved to the start position in the z-axis direction. Next, after waiting for completion of the movement in the z-axis direction in Step S3302, it is determined whether or not the movement to the start position has been completed in Step S3303. When it has not been completed, the processing returns to Step S3302 and is then repeated. When the movement has been completed, the processing goes to Step S3304, to come into the waiting state for vertical synchronization of the camera section 10, namely the state of waiting for the imaging start timing (vertical synchronization) of the camera section 10. Here, the coordination between the imaging operation of the camera section 10 and the moving operation of the microscope lens section 20 is checked so that images can be captured by the camera section 10 at equal-interval photographing positions while the microscope lens section 20 is moved.

Next, as the asynchronous operation processing, 3 pieces of processing, which are processing of moving the microscope lens section 20 (Step S3305-1 to Step S3307-1), processing of performing imaging by the camera section 10 (Step S3305-2 to Step S3307-2) and processing of synthesizing the obtained images (Steps S3305-3 to Step S3307-3), are performed in parallel.

(Moving Processing of Microscope Lens Section 20)

First, in the moving processing of the microscope lens section 20, movement of the microscope lens section 20 toward the end position in the z-axis direction is started in Step S3305-1, and after the moving operation of Step S3306-1, it is determined whether or not the movement in the z-axis direction has been completed in Step S3307-1. When it has not been completed, the processing returns to S3306-1 and is then repeated, and when it has been completed, the processing goes to Step S3308.

(Imaging Processing of Camera Section 10)

Meanwhile, in the imaging processing of the camera section 10, first in Step S3305-2, imaging is performed by the camera section 10, and in Step S3306-2, the captured data is written into the buffer. Then in Step S3307-2, it is determined whether or not the captured image has gone beyond a final frame position. When it has not, the processing returns to Step S3306-2 and is then repeated, and when it has, the processing goes to Step S3308. In other words, when the captured image is a final image, or when its height goes beyond the upper limit of the height range and has not reached quality to be adopted as an additional image, the processing is completed.

(Image Synthesis Processing of Image Synthesizing Unit 85b)

Finally, in the processing of synthesizing an image, in Step S3305-3, images are read from the buffer. Next, in Step S3306-3, the image synthesis processing is executed. Finally, in Step S3307-3, it is determined whether or not the image has reached an end frame. When it has not, the processing returns to Step S3306-3 and the synthesis processing is repeated, and when it has been completed, the processing goes to Step S3308.

In such a manner as above, when the moving processing of the microscope lens section 20, the imaging processing of the camera section 10 and the image synthesis processing of the image synthesizing unit 85b are completed, in Step S3308, movement of the microscope lens section 20 to the end position (described later) in the z-axis direction is started, and after the waiting state for completion of the movement to the end position in Step S3309, it is determined whether or not the movement to the end position has been completed in Step S3310. When the movement to the end position has been completed, the high-speed image synthesis processing is completed, and when it has not been completed, the processing returns to Step S3309 and is then repeated. In such a manner, it is possible to asynchronously execute the high-speed image synthesis processing.

It is to be noted that the example has been described above where the moving processing of the microscope lens section 20, the imaging processing of the camera section 10 and the image synthesis processing by the image synthesizing unit are asynchronously performed. However, the present invention is not restricted to this example, and the moving processing of the microscope lens section and the imaging processing of the camera section can be synchronously performed.

(End Position of Microscope Lens Section 20 after Image Photographing)

Further, the synthetic imaging end position, to which the microscope lens section 20 is moved, is, for example, a position at the start of synthesis in the z-axis direction. Herewith, in a case where a synthetic image is displayed on the display section after completion of the image synthesis processing, when the display is switched to a moving image, almost the same image as the image before starting of the image synthesis processing is displayed on the display section, and by restoring the image, the operation such as the visual field searching can be continued without a sense of incompatibility.

Alternatively, the end position may remain unchanged from the end position in the image synthesis processing. In this case, the microscope lens section 20 is not moved in completion of the synthesis processing, and hence it is possible to prevent generation of extra movement so as to keep the time required for movement in the z-axis direction to the minimum.

Further, the movement may be performed to a position at a height of an image most in focus out of images captured during the image synthesis processing. In this case, it is possible to display the image in focus at the time of returning the display mode on the display section from display of the synthetic image as the still image to display of the moving image.

Figure 34:
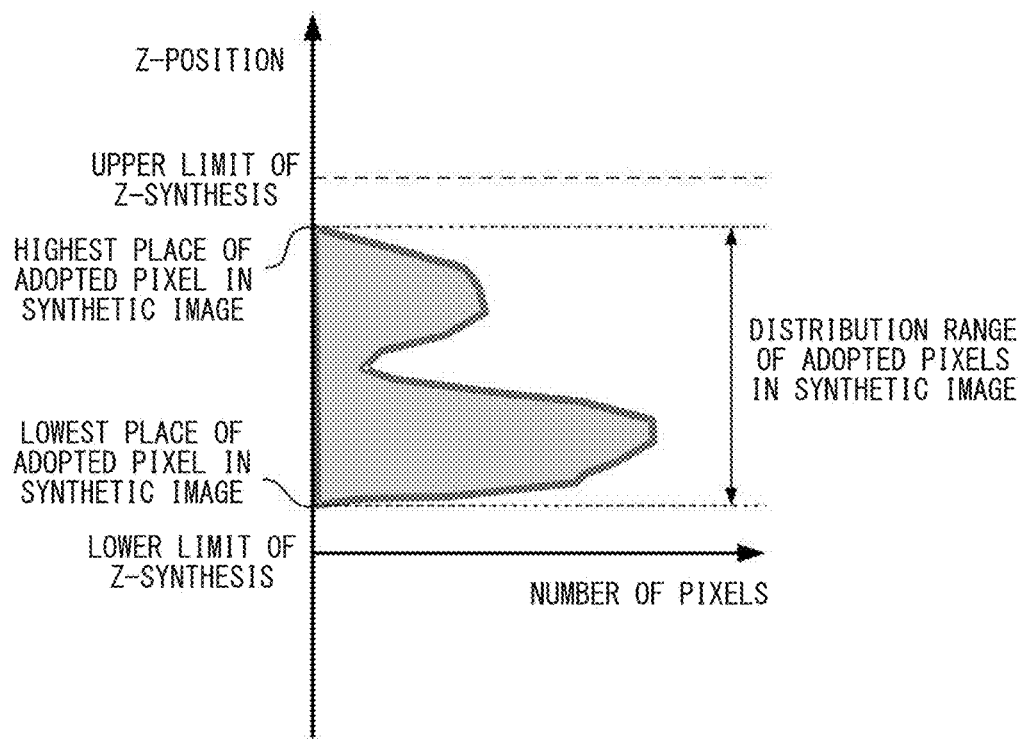
FIG. 34 is a graph showing a histogram of height positions of original images with adopted pixels in a synthetic image.

Further, the movement may be performed to the lowest position or the highest position among height positions of images actually adopted to generation of a synthetic image out of the captured images. A height histogram of FIG. 34 shows this situation. By moving the microscope lens section 20 to such a position, the current height position of the lens can be taken as the first frame position of synthesis processing in the case of performing the image synthesis processing next time, and hence the time required until movement of the microscope lens section 20 to the start position can be saved. Moreover, information of the highest position and the lowest position of pixels adopted to a synthetic image as above is recorded as supplementary information along with the synthetic image at the time of storing the synthetic image and is made readable, whereby it is possible to move the microscope lens section 20 based on this position information when the user performs similar observation at a later date.

(Height Range Setting Unit 89*f*)

Based on lens identification information as information of the optical lens system included in the microscope lens section 20, the height range setting unit 89*f* is capable of automatically setting the height range as a predetermined range previously set based on a depth of focus of the optical lens system. Accordingly, the user does not previously specify the range in which the microscope lens section 20 is vertically moved, but the height range can be automatically set by a predetermined value set by the optical lens system to be used. This results in that, without the user individually adjusting the height range for performing image synthesis while checking an image, it is possible to automatically complete a setting in accordance with a predetermined setting based on the lens identification information, so as to execute image synthesis in a short time. Especially in the foregoing synthetic image high-speed photographing processing, since synthesis processing itself can be performed at a high speed, even when the height range is not intentionally set to the efficient minimum range and it is in the state of being set to rather a wide range slightly including a margin, the processing time is not practically problematic. FIG. 29 shows one example of a user interface of such an automatic setting by the height range setting unit 89*f*. In FIG. 29, when an "auto-synthesis mode" button 192 is pressed, the height range is automatically set on the magnifying observation apparatus side, and thereafter, the image synthesis processing is executed.

Predetermined values of the upper limit and the lower limit of the height range are set based on the lens identification information of the mounted microscope lens section 20. For example, these values can be computed from a lens magnification or a depth of focus, or fixed values or the like decided after previous evaluation by use of an actual lens can be used.

Alternatively, based on the lens identification information, the upper limit and the lower limit may be respectively set in positions vertically apart by a fixed distance from a reference position taken at the center therebetween. As for the reference position, for example, the height position of the currently observed image in the z-direction can be used, or the height of a focus position in a certain region on the screen that is found by performing the autofocus processing can also be used. Further, the fixed distance can be decided from intervals of the photographing positions and a previously set number of images to be photographed. For example, when the number of images to be photographed is decided based on the number of images that the camera section 10 can photograph within a fixed time period, the time required for the entire synthesis processing can be almost unified irrespective of the microscope lens section to be used.

It should be noted that in consideration of an operation distance of the microscope lens section, limitations may be set on the distance it moves to the lower limit. When the microscope lens section is excessively lowered, it may come into contact with the observation target or the placement surface of the placement section, and in order to reduce such a risk, more limitations may be provided than those for the upper limit position.

Moreover, it is as described above that the user can also manually specify the height range. The height range is set by the height range setting unit. As one example of such a height range setting unit, FIG. 28 shows one example of a user interface screen for a magnified image observing program. Especially in the above embodiment, there can be adopted a method where, the upper and lower limits are not previously set, but the synthesis processing is once performed based on predetermined settings for the upper and lower limits on the basis of the lens identification information, and when the settings are excessive or deficient, they are finely adjusted later. Herewith, in many cases, the image synthesis is completed at a high speed without making any setting, and a desired synthetic image can be acquired. Even when the range is excessive or deficient, it can be adjusted after checking a result of the already acquired synthetic image, and hence the setting can be made more easily than in a state without any information.

(Height Range Setting Unit)

Here, a detail of a height range setting screen 170 as one mode of the height range setting unit will be described based on FIGS. 28 and 29. On the height range setting screen 170 shown in these figures, a depth synthetic image MI is displayed in the image display region 111 on the left side and a height range setting field is provided in the operation region 112 on the right side. In the height range setting field, a height range manual specification field 172 for manually specifying the height range is provided on the upper stage, and a height graph display field 173 is provided on the middle stage. In the height range manual specification field 172, the upper limit and the lower limit of the height range can be inputted by numerical values. Meanwhile, in the height graph display field 173, while a height graph (here, projection diagram PI) is displayed on the right side, a slider showing movement of the height in the z-axis direction is displayed to the left side of the height graph. The slider is configured of a total slider 174 showing the whole height range, and an enlargement slider 175 obtained by enlarging part of the total slider 174. The enlargement slider 175 is provided with an upper-limit operation knob 176 showing the upper limit of the height range, and a lower-limit operation knob 177 showing the lower limit thereof. When the user operates these upper-limit operation knob 176 and lower-limit operation knob 177 by mouse dragging or the like, the height range is successively changed, and in accordance with this, an upper limit bar 178 and a lower limit bar 179 displayed in a height graph move interlockingly with the change. Further, the numerical values of the upper limit and the lower limit of the height range in the height range manual specification field 172 change. This is due to a setting made such that, when any height range setting unit is operated, the other height range setting unit also changes interlockingly with the operation. Herewith, the user can set the height range by a desired method.

It is to be noted that, although the configuration has been described in the above example where the placement section side is fixed and the microscope lens section 20 is moved by the upper stage lift 16 to change the relative height, the present invention is not restricted to this configuration, and in contrast, the placement section side may be moved to change the relative height. In this case, the microscope lens section side is fixed, and imaging is performed while the placement section is moved by the lower stage lift.

(Additional Image Acquiring Function)

In high-speed synthetic image photographing processing according to the present embodiment, the microscope lens section 20 moves beyond the range set as the height range in terms of performing photographing of the final frame during movement of the microscope lens section 20 at a fixed speed. Further, when the electric z-axis stage can move the microscope lens section 20 at a high speed and the photographing frame rate of the camera section 10 is high, the time required for the moving operation of the microscope lens section 20 and the imaging operation of the camera section 10 is shorter than the time required for the image synthesis processing of a synthetic image. In this case, the operation in the z-axis direction has already completed at the time when the image synthesis processing in the image synthesizing unit is completed. By efficiently using an unoccupied time until completion of the synthesis processing, movement of the microscope lens section 20 in the z-axis direction and photographing by the camera section 10 are continued, thereby allowing photographing in a wider range than the set height range. Here, simply widening the range for performing photographing is not different from setting a wide range as the height range from the first, and it is just that the time required for the image synthesis processing becomes further longer. Then, when an image of the final frame is subjected to the synthesis processing in the image synthesis processing, only in a case where pixels in the final frame in number not smaller than a predetermined number of pixels are adopted to a synthetic image, an additional image photographed after the final frame, namely out of the height range, is used for synthesis. This processing is repeated, and the processing is continued until the number of pixels adopted falls below the threshold or there is no more photographed additional image. By such automatic additional photographing, for example, even when the height range is erroneously set narrow, the accuracy of the synthetic image can be kept by means of an additional image, while an unnecessary increase in number of images subjected to the image synthesis processing can also be prevented.

Figure 35:
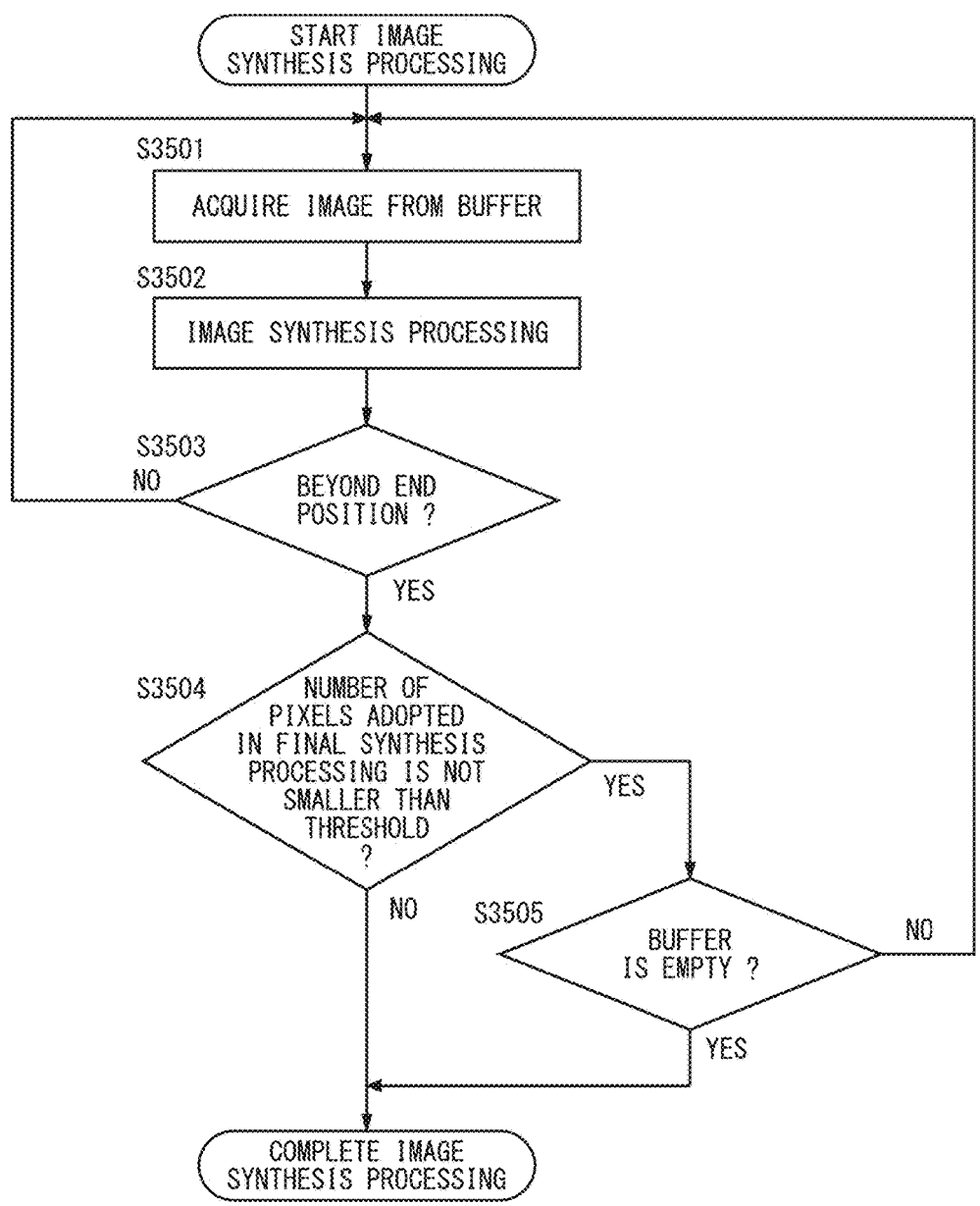
FIG. 35 is a flowchart showing a procedure for image synthesis processing of automatically photographing an additional image.

A flowchart of FIG. 35 shows a procedure for the image synthesis processing of automatically photographing an additional image by such an additional image acquiring function. This flowchart shows processing in a frame surrounded by a broken line in the flowchart of FIG. 33 described above. In a state where the image synthesis processing has been started, in Step S3501, the image synthesizing unit 85b acquires an image from the buffer. Next, in Step S3502, the image synthesizing unit 85b performs the image synthesis processing. Further, in Step S3503, it is determined whether or not the height position of the microscope lens section 20 has gone beyond the height range, and when it has not, the processing returns to Step S3501 and the above processing is repeated. On the other hand, when it has gone beyond the height range, the processing goes to Step S3504, and it is determined in the final image whether or not the number of pixels adopted to the synthesis processing is not smaller than the threshold. When it is smaller than the threshold, the processing is completed. When it is not smaller than the threshold, the processing goes to Step S3505, and it is determined whether or not the buffer is empty. When it is empty, the processing is completed. When it is not empty, the processing returns to Step S3501 and is then repeated. In such a manner, when the number of pixels adopted falls below the threshold or the buffer becomes empty, the image synthesis processing is completed. With this procedure, an additional image is adopted when it is valid for the image synthesis processing, and an additional image is not adopted when it is not valid, whereby it is possible to efficiently determine whether or not to adopt the obtained image in accordance with its quality. Further, photographing of an additional image is only performed by use of the waiting time during the image synthesis processing, to prevent the processing time from becoming long by capturing a larger number of images than necessary, and prevent the processing time for image synthesis from being wasted.

(Manual Additional Photographing)

Further, when the upper limit or the lower limit of the photographed synthetic image is deficient, only a deficient image can be additionally photographed, to perform synthesis. The order of processing images (e.g., the ascending order of the height position in the z-axis direction) has an effect on a result of synthesis, depending on algorithm of the synthesis processing, and hence it is necessary to keep the order of processing. For example, when deficiency occurs on the upper limit side while photographing is performed during movement along the z-axis from the lower limit to the upper limit, the synthesis processing may only be continued in order to photograph an additional image. On the other hand, when deficiency occurs on the lower side, in order to keep the image processing order and perform the synthesis process, all photographed images need to be left in the buffer. When all the images are left in the buffer, it is possible to perform the image synthesis processing again based on the added image and the already photographed images. However, since the synthesis processing needs to be performed using all the images in this case, when movement of the microscope lens section in the z-axis direction and the photographing processing of the camera section are earlier than the synthesis processing, there is no difference in the processing time compared to the case where all the images including the added range are photographed again. It can be said that taking all the images again is rather desirable since they are photographed by one movement of the camera section, and a change in specimen is thus small.

Figure 39:
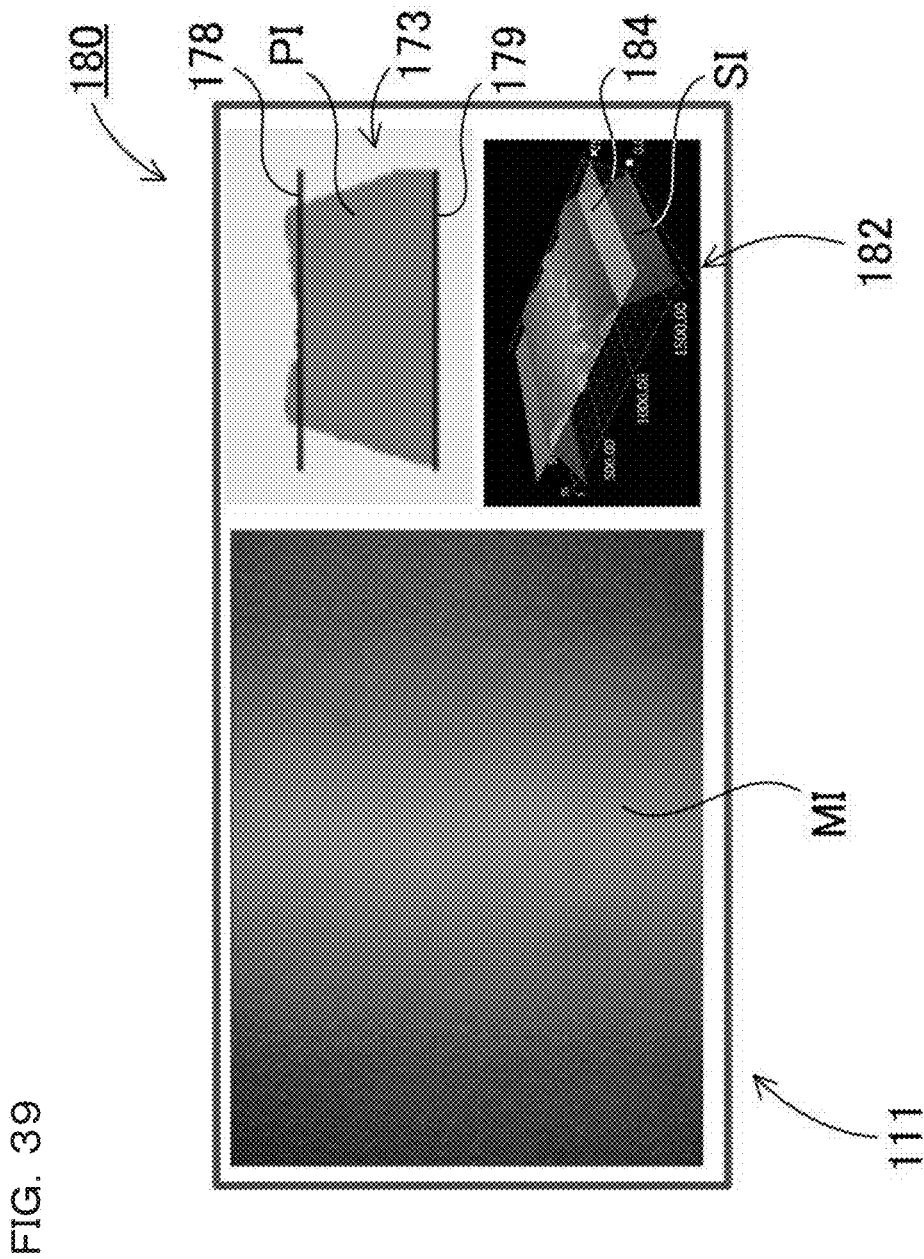
FIG. 39 is an image view showing a user interface screen of a manual additional photographing setting screen.

FIG. 39 shows an example of a manual additional photographing setting screen 180 for performing such manual additional photographing. On the manual additional photographing setting screen 180, the image display region 111 for displaying the depth synthetic image MI is provided on the left side of the screen, a height graph display field 173 for displaying a height graph projection diagram PI is provided on the upper stage of the right side of the screen, and a 3D image display field 182 for displaying a 3D image SI is provided on the lower stage of the right side of the screen. In the height graph display field 173, when the upper limit bar 178 or the lower limit bar 179 superimposed and displayed on the height graph is operated, the height range changes in accordance with this operation, and hence the height range for performing additional imaging can be specified. Further, in accordance with the setting in the height graph display field 173, the position of a boundary plane 184 displayed in the 3D image display field 182 also changes. In this example, the boundary plane 184 shows the upper limit of the height range, and is interlocked with the upper limit bar 178 in the height graph display field 173. That is, when the upper limit bar 178 is vertically moved in the height graph display field 173, the position of the boundary plane 184 in the 3D image display field 182 interlockingly moves. In contrast, when the position of the boundary plane 184 in the 3D image display field 182 is vertically moved, in accordance with this, the upper limit bar 178 in the height graph display field 173 is interlockingly moved. This allows the user to visually specify the range for performing additional photographing with reference to the height graph PI and the 3D image SI. Especially in the 3D image display field 182, the combination of the 3D image SI and the boundary plane 184 facilitates three-dimensional and visual checking of a portion beyond the height range.

A magnifying observation apparatus, a magnified image observing method, a magnified image observing program, and a computer-readable recording medium according to the present invention can be preferably used for a microscope, a digital microscope of a reflection type, a transmission type or the like, a digital camera, or the like. Further, in the case of applying the present technique to a fluorescence microscope, reflected light or transmitted light from an observation target with respect to illumination light can be replaced with excitation light.

What is claimed is:

1. A magnifying observation apparatus comprising:
 a placement stage having a placement surface for placing an object;
 a camera configured to acquire an observation image of the object placed on the placement surface, the camera configured to sequentially acquire the observation images in response to starting an asynchronous process as performing a first process;
 a microscope lens optically coupled to the camera;
 a z-axis stage lift configured to change a relative height between the microscope lens and the placement surface along a first direction orthogonal to the placement surface or in parallel with the optical axis, the z-axis stage lift configured to automatically change the relative height from a first relative height to a second relative height so as to sequentially acquire the observation images at the different relative heights in response to starting the asynchronous process as performing a second process, the first process and the second process being synchronously or asynchronously performed as a moving acquiring process;
 an xy-axis movable coupler configured to change a relative position between the placement stage and the microscope lens along a second direction in parallel with the placement surface;
 a display configured to display an image with respect to the observation image;
 a buffering memory configured to store the observation image, the buffering memory configured to sequentially receive the observation images sequentially acquired at the different relative heights by the camera in the asynchronous process; and
 a controller operably coupled to the camera, the display and the buffering memory, configured to:
 sequentially synthesize the observation images read from the buffering memory in response to starting the asynchronous process as performing an image synthesis process, the observation images being sequentially acquired at the different relative heights, and
 generate a synthetic image, as the image with respect to the observation image, by sequentially synthesizing the observation images;
 wherein the image synthesis process by the controller and the moving acquiring process by the camera and the z-axis stage lift are asynchronously performed in parallel and simultaneously.

2. The magnifying observation apparatus according to claim 1, further comprising:
 a height range setting unit configured to set a height range of the relative height,
 wherein the z-axis stage lift changes the relative height in a range beyond the height range set by the height range setting unit during acquiring the images by the camera.

3. The magnifying observation apparatus according to claim 2, wherein
 the z-axis stage lift changes the relative height beyond the height range set by the height range setting unit, to allow acquiring an additional observation image in a range beyond the height range, and
 the controller is configured to sequentially synthesize the additional observation image as the observation images in the image synthesis process.

4. The magnifying observation apparatus according to claim 3, wherein the controller is configured to sequentially synthesize the additional observation image as the observation images in the image synthesis process in a case where the additional observation image achieves quality beyond a predetermined criteria.

5. The magnifying observation apparatus according to claim 3, wherein the controller is configured to sequentially synthesize the additional observation image as the observation images in the image synthesis process in a case where the number of in-focus pixels in the additional observation image goes beyond a predetermined threshold.

6. The magnifying observation apparatus according to claim 2, wherein the z-axis stage lift changes the relative height in the height range from a shorter relative distance between the microscope lens and the placement surface toward a longer relative distance between the microscope lens and the placement surface.

7. The magnifying observation apparatus according to claim 1, wherein
the microscope lens and the camera integrally constitute a head section, and
the z-axis stage lift changes the head section so as to change the relative height between the microscope lens and the placement surface.

8. The magnifying observation apparatus according to claim 2, wherein the height range setting unit automatically sets the height range based on information associated with a depth of focus of the microscope lens.

9. The magnifying observation apparatus according to claim 2, wherein the height range setting unit arbitrarily adjusts the height range.

10. The magnifying observation apparatus according to claim 2, wherein the z-axis stage lift starts changing the relative height from a position beyond the height range set by the height range setting unit toward a position within the height range.

11. The magnifying observation apparatus according to claim 1, further comprising:
an illumination unit coupled to the microscope lens, and configured to irradiate the object with an illumination light.

12. A magnified image observing method for displaying an observation image via a magnified image apparatus comprising a placement stage having a placement surface, a camera, a microscope lens optically coupled to the camera, a buffering memory, and a controller operably coupled to the camera and the buffering memory, the method comprising:
sequentially acquiring, via the camera, an observation image of an object placed on the placement surface in response to starting an asynchronous process as a first process;
automatically changing a relative height between the microscope lens and the placement surface along a first direction orthogonal to the placement surface or in parallel with the optical axis from a first relative height to a second relative height so as to sequentially acquire the observation images at the different relative heights in response to starting the asynchronous process as performing a second process, the first process and the second process being synchronously or asynchronously performed as a moving acquiring process;
sequentially receive, via the buffering memory, the observation images sequentially acquired at the different relative heights by the camera in the asynchronous process;
sequentially synthesizing the observation images read from the buffering memory in response to starting the asynchronous process as performing an image synthesis process, the observation images being sequentially acquired at the different relative heights;
generating a synthetic image by the sequentially synthesizing the observation images; and
displaying the synthetic image;
wherein the image synthesis process and the moving acquiring process are asynchronously performed in parallel and simultaneously.

13. The magnified image observing method according to claim 12, further comprising:
setting a height range of the relative height,
wherein changing the relative height in a range beyond the height range during acquiring the images by the camera is performed in the moving acquiring process.

14. The magnified image observing method according to claim 12, further comprising:
setting a height range of the relative height based on a depth of focus of the microscope lens included in the microscope lens.

15. The magnified image observing method according to claim 12, further comprising:
setting a height range of the relative height,
wherein changing the relative height based on the height range during acquiring the images by the camera is performed in the moving acquiring process;
re-setting the height range;
performing the moving acquiring process during acquiring the observation images by the camera based on the height range re-setted;
performing the image synthesis process including synthesizing the observation images acquired at the different relative heights in the moving acquiring process during acquiring the observation images by the camera based on the height range re-setted so as to generate a synthetic image.

16. A non-transitory computer-readable recording medium or a recording device, in which a program for displaying an observation image via a magnified image apparatus comprising a placement stage having a placement surface, a camera, a microscope lens optically coupled to the camera, a buffering memory, and a controller operably coupled to the camera and the buffering memory, the program causing a computer to realize functions of:
sequentially acquiring, via the camera, an observation image of an object placed on the placement surface in response to starting an asynchronous process as a first process;
automatically changing a relative height between the microscope lens and the placement surface along a first direction orthogonal to the placement surface or in parallel with the optical axis from a first relative height to a second relative height so as to sequentially acquire the observation images at the different relative heights in response to starting the asynchronous process as performing a second process, the first process and the second process being synchronously or asynchronously performed as a moving acquiring process;
sequentially receive, via the buffering memory, the observation images sequentially acquired at the different relative heights by the camera in the asynchronous process;
sequentially synthesizing the observation images read from the buffering memory in response to starting the asynchronous process as performing an image synthesis process, the observation images being sequentially acquired at the different relative heights;
generating a synthetic image by the sequentially synthesizing the observation images; and
displaying the synthetic image;

wherein the image synthesis process and the moving acquiring process are asynchronously performed in parallel and simultaneously.

* * * * *